US012761608B2

(12) United States Patent
SayyarRodsari et al.

(10) Patent No.: US 12,761,608 B2
(45) Date of Patent: Oct. 13, 2026

(54) INDUSTRIAL ARTIFICIAL INTELLIGENCE MODEL INTERDEPENDENCY LEARNING AND DEPLOYMENT

(71) Applicant: Rockwell Automation Technologies, Inc., Mayfield Heights, OH (US)

(72) Inventors: Bijan SayyarRodsari, Austin, TX (US); Cyril Perducat, Devens, MA (US); Dan Li, Austin, TX (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 312 days.

(21) Appl. No.: 18/363,133

(22) Filed: Aug. 1, 2023

(65) Prior Publication Data

US 2025/0044746 A1 Feb. 6, 2025

(51) Int. Cl.
*G05B 13/02* (2006.01)
*G05B 19/042* (2006.01)
(Continued)

(52) U.S. Cl.
CPC ....... *G05B 13/0265* (2013.01); *G05B 19/042* (2013.01); *G05B 19/406* (2013.01);
(Continued)

(58) Field of Classification Search
CPC .... G05B 19/042; G05B 19/418; G05B 13/02; G05B 23/02; G05B 19/414; G05B 19/406; G06F 3/048; G06F 11/30; G06F 9/451
(Continued)

(56) References Cited

U.S. PATENT DOCUMENTS 5,485,620 A 1/1996 Sadre et al.
5,495,571 A 2/1996 Corrie, Jr. et al.
(Continued)

FOREIGN PATENT DOCUMENTS

EP 2 500 853 A2 9/2012
EP 3 696 622 A1 8/2020
(Continued)

OTHER PUBLICATIONS

Extended European Search Report received for EP Patent Application Serial No. 24184624.5 dated Mar. 14, 2025, 15 pages.
(Continued)

*Primary Examiner* — Ronald D Hartman, Jr.
(74) *Attorney, Agent, or Firm* — Amin, Turocy & Watson, LLP

(57) ABSTRACT

Various systems and methods are presented regarding monitoring and controlling operation of a process. A visual representation of the process can be created based on a supermodel comprising models (representing one or more devices) and nodes (representing respective device variables and constraints). Further, the process can be represented by levels, wherein devices at each level can be self-aware and have onboard artificial intelligence, such that a device at any level can auto-configure itself in accordance with a requirement placed upon it. Field-level devices (IFLDs) can be smart devices which auto-configure based upon a requirement from a higher-level device. Accordingly, system awareness can be incorporated across all levels of the process enabling overall and device-specific optimization of the process. IFLDs can auto-configure to collect and transmit data in accordance with an instruction from a higher-level device, leading to efficient data collection, reduced data bandwidth/processing, and expedited system optimization.

20 Claims, 25 Drawing Sheets

(51) Int. Cl.
*G05B 19/406* (2006.01)
*G05B 19/414* (2006.01)
*G05B 19/418* (2006.01)
*G06F 3/048* (2013.01)
*G06F 9/451* (2018.01)
*G06F 11/30* (2006.01)

(52) U.S. Cl.
CPC ......... *G05B 19/414* (2013.01); *G05B 19/418* (2013.01); *G06F 3/048* (2013.01); *G06F 9/451* (2018.02); *G06F 11/30* (2013.01)

(58) Field of Classification Search
USPC ........................................................ 700/47, 17
See application file for complete search history.

(56) References Cited

U.S. PATENT DOCUMENTS

| | | | |
|---|---|---|---|
| 5,980,078 | A | 11/1999 | Krivoshein et al. |
| 6,834,370 | B1 | 12/2004 | Brandl et al. |
| 6,853,867 | B1 * | 2/2005 | Klindt .................. G05B 19/056 700/83 |
| 6,854,111 | B1 | 2/2005 | Havner et al. |
| 7,505,817 | B2 | 3/2009 | McDaniel et al. |
| 7,962,472 | B2 | 6/2011 | Erickson et al. |
| 8,060,834 | B2 * | 11/2011 | Lucas .................... G06Q 10/06 717/109 |
| 8,874,242 | B2 | 10/2014 | Smith et al. |
| 8,897,900 | B2 | 11/2014 | Smith et al. |
| 8,947,437 | B2 | 2/2015 | Garr et al. |
| 9,599,982 | B2 * | 3/2017 | Tran ................... G05B 23/0272 |
| 9,904,263 | B2 | 2/2018 | Blevins et al. |
| 10,101,194 | B2 | 10/2018 | Gonzaga et al. |
| 10,205,345 | B2 | 2/2019 | Tuerk et al. |
| 10,496,061 | B2 | 12/2019 | Strohmenger et al. |
| 11,734,803 | B2 * | 8/2023 | Rao ........................ G06V 20/63 345/619 |
| 11,843,248 | B1 | 12/2023 | Hess et al. |
| 11,948,232 | B2 | 4/2024 | Sivalingam et al. |
| 2002/0123864 | A1 | 9/2002 | Eryurek et al. |
| 2004/0133853 | A1 * | 7/2004 | Poerner ..................... G06F 8/38 715/205 |
| 2004/0153171 | A1 | 8/2004 | Brandt et al. |
| 2004/0260408 | A1 | 12/2004 | Scott et al. |
| 2005/0034023 | A1 | 2/2005 | Maturana et al. |
| 2005/0149209 | A1 * | 7/2005 | Wojsznis ............... G05B 11/32 700/52 |
| 2008/0255682 | A1 | 10/2008 | Zhao et al. |
| 2009/0261857 | A1 | 10/2009 | Marshall, Jr. |
| 2010/0079488 | A1 | 4/2010 | McGreevy et al. |
| 2010/0306692 | A1 * | 12/2010 | Baier ................... G05B 19/409 715/777 |
| 2012/0173006 | A1 | 7/2012 | McGreevy et al. |
| 2012/0239164 | A1 | 9/2012 | Smith et al. |
| 2013/0073062 | A1 | 3/2013 | Smith et al. |
| 2013/0211546 | A1 | 8/2013 | Lawson et al. |
| 2013/0304235 | A1 | 11/2013 | Ji et al. |
| 2014/0225895 | A1 | 8/2014 | Farchmin et al. |
| 2014/0277620 | A1 | 9/2014 | Nixon et al. |
| 2015/0293503 | A1 | 10/2015 | Wall et al. |
| 2016/0018796 | A1 | 1/2016 | Lu |
| 2016/0274558 | A1 | 9/2016 | Strohmenger et al. |
| 2017/0293418 | A1 | 10/2017 | Hams et al. |
| 2017/0336947 | A1 | 11/2017 | Bliss et al. |
| 2018/0181112 | A1 | 6/2018 | Wang et al. |
| 2018/0367320 | A1 | 12/2018 | Montalvo |
| 2019/0113909 | A1 | 4/2019 | Paunonen et al. |
| 2019/0121307 | A1 * | 4/2019 | Martinez Canedo ........................ G06F 9/5044 |
| 2020/0150628 | A1 | 5/2020 | Vance et al. |
| 2020/0174462 | A1 | 6/2020 | Sirohi et al. |
| 2020/0265329 | A1 | 8/2020 | Thomsen et al. |
| 2021/0096542 | A1 | 4/2021 | Stump et al. |
| 2021/0349453 | A1 | 11/2021 | Schlake et al. |
| 2021/0397171 | A1 | 12/2021 | Sayyarrodsari et al. |
| 2022/0075330 | A1 | 3/2022 | Miller et al. |
| 2022/0224698 | A1 * | 7/2022 | Homan ............... H04L 63/0428 |
| 2023/0113281 | A1 | 4/2023 | Meyer et al. |
| 2023/0122732 | A1 | 4/2023 | Levert et al. |
| 2024/0142344 | A1 | 5/2024 | Yuan et al. |
| 2025/0044762 | A1 | 2/2025 | Sayyarrodsari et al. |

FOREIGN PATENT DOCUMENTS

| | | | |
|---|---|---|---|
| EP | 3 929 685 | A1 | 12/2021 |
| EP | 4 064 144 | A1 | 9/2022 |
| EP | 4 089 489 | A1 | 11/2022 |

OTHER PUBLICATIONS

Arraño-Vargas et al. ,"Modular Design and Real-Time Simulators Toward Power System Digital Twins Implementation", IEEE Transactions on Industrial Informatics, vol. 19, Issue 1, Jan. 2023, 10 pages.
Kollner et al., "Designing a Graphical Domain-specific Modelling Language Targeting a Filter-based Data Analysis Framework", 2010 13th IEEE International Symposium on Object/Component/Service-Oriented Real-Time Distributed Computing Workshops, 2010, 6 pages.
Extended European Search Report received for EP Patent Application Serial No. 24189732.1 dated Jan. 8, 2025, 9 pages.
Partial European Search Report received for EP Patent Application Serial No. 24184624.5 dated Dec. 11, 2024, 11 pages.
Non-Final Office Action received for U.S. Appl. No. 18/363,177 dated Jan. 16, 2026, 18 pages.
Non-Final Office Action received for U.S. Appl. No. 18/363,154 dated Mar. 10, 2026, 14 pages.
Non-Final Office Action received for U.S. Appl. No. 18/363,291 dated Feb. 6, 2026, 22 pages.
Liu et al., "A Cost-effective Manufacturing Process Recognition Approach Based On Deep Transfer Learning for CPS Enabled Shop-floor", Robotics and Computer-integrated Manufacturing, vol. 70, No. 102128, 2021, 13 pages.
Non-Final Office Action received for U.S. Appl. No. 18/363,138 dated Mar. 23, 2026, 20 pages.
Notice of Allowance received for U.S. Appl. No. 18/363,197 dated Feb. 2, 2026, 8 pages.
Feiler, Peter H., "Configuration Management Models In Commercial Environments", Technical Report, CMU/SEI-91-TR-7, ESD-9-TR-7, Software Engineering Institute, Mar. 1991, 59 pages.
Morariu et al., "Machine Learning for Predictive Scheduling and Resource Allocation in Large Scale Manufacturing Systems", Computers in Industry, vol. 120, No. 103244, 2020, 13 pages.
Conradi et al., "Version Models for Software Configuration Management", ACM Computing Surveys (CSUR), vol. 30, Issue 2, Jun. 1, 1998, pp. 232-282.
Essien et al., "A Deep Learning Model for Smart Manufacturing Using Convolutional LSTM Neural Network Autoencoders", IEEE Transactions on Industrial Informatics, vol. 16, No. 9, Sep. 2020, pp. 6069-6078.
Wang et al., "A Tutorial on Deep Learning-based Data Analytics in Manufacturing Through A Welding Case Study", Journal of Manufacturing Processes, vol. 63, 2021, pp. 2-13.
Jiewu et al., "Digital Twin-driven Rapid Reconfiguration of the Automated Manufacturing System Via an Open Architecture Model", Robotics and Computer-integrated Manufacturing, vol. 63, No. 101895, 2020, 12 pages.
Notice of Allowance received for U.S. Appl. No. 18/359,341 dated Mar. 11, 2026, 9 pages.
Non-Final Office Action received for U.S. Appl. No. 18/359,341 dated Oct. 29, 2025, 20 pages.
Didier et al., "Converged Plantwide Ethernet (CPwE) Design and Implementation Guide", Rockwell Automation, Sep. 2011, 564 pages.
Non-Final Office Action received for U.S. Appl. No. 18/363,197 dated Oct. 1, 2025, 39 pages.

(56) References Cited

OTHER PUBLICATIONS

Non-Final Office Action received for U.S. Appl. No. 18/363,186 dated Jul. 30, 2026, 44 pages.
Notice of Allowance received for U.S. Appl. No. 18/363,138 dated Jul. 28, 2026, 09 pages.
Notice of Allowance received for U.S. Appl. No. 18/363,154 dated Jul. 29, 2026, 07 pages.
Communication pursuant to Article 94(3) EPC received for EP Patent Application Serial No. 24189732.1 dated Jun. 30, 2026, 5 pages.

* cited by examiner

INDUSTRIAL ARTIFICIAL INTELLIGENCE MODEL INTERDEPENDENCY LEARNING AND DEPLOYMENT

TECHNICAL FIELD

This application relates to techniques facilitating at least one of representation, monitoring, or controlling operation of a process.

BACKGROUND

Traditional approaches for optimizing an enterprise-wide system typically involves complex, and potentially tedious, mathematical programming that can become daunting, if not impracticable, as the scale/scope of the enterprise system (e.g., a manufacturing plant) increases. Hence, the ability for a conventional enterprise system to meet one or more objectives and/or requirements can be problematic in itself, even to the point of being unachievable. A problem with conventional enterprise systems (e.g., an automation system) is the enterprise system can be highly dependent on complex metadata models utilizing data from disparate sources that oftentimes result in a non-explainable highly complex model(s). Further, the sheer volume of data being generated, transmitted, and/or processed across an automated process can be unwieldy (e.g., the volume of sensor data generated during operation of a die-casting plant comprising furnace/melting equipment, molten metal delivery equipment, die cast machine, molten metal injection system, die-clamping equipment, casting ejection and extraction equipment, die spraying equipment, and the like) and can place a significant operational burden on the devices/systems operating in the higher levels of the enterprise model (e.g., programmable logic controllers (PLCs) responding to the received sensor data). Further, in a conventional system, the plethora of data is largely useless until it has been processed by the higher-level devices. Furthermore, the data may not include data of interest to a higher-level component in the enterprise system, the data may not be in a format for use by a higher-level system, and suchlike. Accordingly, the structure and complexity of conventional enterprise systems render a response to a simple requirement (e.g., reduce scrap) to be potentially unachievable by the very model designed and configured to achieve the requirement.

The above-described background is merely intended to provide a contextual overview of some current issues and is not intended to be exhaustive. Other contextual information may become further apparent upon review of the following detailed description.

SUMMARY

The following presents a summary to provide a basic understanding of one or more embodiments described herein. This summary is not intended to identify key or critical elements, or delineate any scope of the different embodiments and/or any scope of the claims. The sole purpose of the summary is to present some concepts in a simplified form as a prelude to the more detailed description presented herein.

The system can comprise a memory that stores computer executable components and a processor that executes the computer executable components stored in the memory. The computer executable components can comprise a configuration component configured to construct a graphical representation of an industrial process. In an embodiment, the graphical representation can comprise a first model representing a first configuration of a first device in the industrial process, the first model having a first output, and a second model representing a first configuration of a second device in the industrial process, the second model having a first input, whereby the first model and second model are connected by a node representing the first output connected to the first input. The computer executable components can further comprise a visualization component configured to present the graphical representation of the process on a human-machine interface (HMI).

In another embodiment, the configuration component can be further configured to detect a change in operating condition of the first device, wherein the first device can be operating with a second configuration, and update the first model to represent the first device operating with the second configuration. Further, the visualization component can be further configured to present the graphical representation with the updated first model. In another embodiment, the configuration component can be further configured to determine whether the second configuration of the first device has caused a change in the first output of the first device and, in response to determining a change has occurred, update representation of the node in the graphical representation to reflect the change. Further, the visualization component can be further configured to present the graphical representation with the updated representation of the node. In an embodiment, the first configuration of the first device can generate a first parameter and the second configuration of the first device can generate a second parameter, and updating of the node representation comprises replacing the first parameter with the second parameter. In another embodiment, the configuration component can be further configured to determine that a third model has a greater level of accuracy in representing operation of the first device with the second configuration than is represented by the first model and further replace the first model with the third model in the graphical representation.

In a further embodiment, first device can be a device configured to at least one of monitor or control operation of first equipment in the industrial process, and further transmit operational data from the first equipment to the second device. In an embodiment, first device can be a field-level device such as a sensor, an actuator, a valve, an industrial controller, a motor drive, a sensor, a telemetry device, a meter, a device configured to monitor operation of a component/equipment included in the process, or a device configured to control operation of a component/equipment included in the process. In another embodiment, the second device can be a control-level device, such as a programmable logic controller (PLC).

In another embodiment, the configuration component can be further configured to (a) receive an objective regarding operation of the first device, (b) determine a third configuration for operation of the first device that satisfies objective, and (c) determine a third model that represents the third configuration for operation of the first device. In a further embodiment, the configuration component can be further configured to instruct the first device to operate with the third configuration and further replace the first model with the third model in the graphical representation.

In other embodiments, elements described in connection with the disclosed systems can be embodied in different forms such as computer-implemented methods, computer program products, or other forms. For example, in an embodiment, a computer-implemented method can be utilized to construct a graphical representation of the industrial process. In an embodiment, the graphical representation can comprise a first model representing a first configuration of a first device in the industrial process, the first model having a first output, and a second model representing a first configuration of a second device in the industrial process, the second model having a first input. In an embodiment, the first model and second model can be connected by a node representing the first output connected to the first input. In a further embodiment, the computer-implemented method can further comprise presenting the graphical representation of the industrial process on a HMI. In an embodiment, the first device can be a device configured to at least one of monitor or control operation of first equipment in the process, and further configured to transmit operational data from the first equipment to the second device.

In another embodiment, the computer-implemented method can further comprise detecting a change in operating condition of the first device, wherein the first device is operating with a second configuration and updating the first model to represent the first device operating with the second configuration. Further, the graphical representation on the HMI can be presented with the updated first model.

In another embodiment, the computer-implemented method can further comprise determining whether the second configuration of the first device has caused a change in the first output of the first device and, in response to determining a change has occurred, updating representation of the node in the graphical representation to reflect the change. Further, the graphical representation presented on the HMI can be updated with the updated representation of the node. In an embodiment, the first configuration of the first device can generate a first parameter and the second configuration of the first device can generate a second parameter, and updating of the node representation can comprises replacing the first parameter with the second parameter.

In another embodiment, the computer-implemented method can further comprise determining that a third model has a greater level of accuracy in representing operation of the first device with the second configuration than is represented by the first model, and further replacing the first model with the third model in the graphical representation.

In another embodiment, a computer program product can comprise a computer readable storage medium having program instructions embodied therewith, the program instructions can be executable by a processor, causing the processor to construct a graphical representation of an industrial process, wherein the graphical representation can comprise a first model representing a first configuration of a first device in the industrial process, the first model can have a first output, and a second model representing a first configuration of a second device in the industrial process, the second model can have a first input, whereby the first model and second model are connected by a node representing the first output connected to the first input. In an embodiment, the graphical representation of the process can be presented on a HMI. In a further embodiment, the first device can be a smart sensor and the second device can be a PLC.

In another embodiment, the program instructions can be further executable by the processor to cause the processor to (a) detect a change in operating condition of the first device, wherein the first device is operating with a second configuration, (b) update the first model to represent the first device operating with the second configuration, and (c) present, on the HMI, the graphical representation with the updated first model.

In another embodiment, the program instructions can be further executable by the processor to cause the processor to determine whether the second configuration of the first device has caused a change in the first output of the first device and, in response to determining a change has occurred, update representation of the node in the graphical representation to reflect the change. In another embodiment, the program instructions can be further executable by the processor to cause the processor to present, on the HMI, the graphical representation with the updated representation of the node.

An advantage of the one or more systems, computer-implemented methods and/or computer program products can be utilizing a system to monitor various components in an industrial to determine their respective operation and configuration, and further implement a graphical representation representing the components, etc., as interconnected models, enabling the process to be modelled to readily capture updates and/or interactions across the process.

DESCRIPTION OF THE DRAWINGS

One or more embodiments are described below in the Detailed Description section with reference to the following drawings.

DETAILED DESCRIPTION

Figure 1:
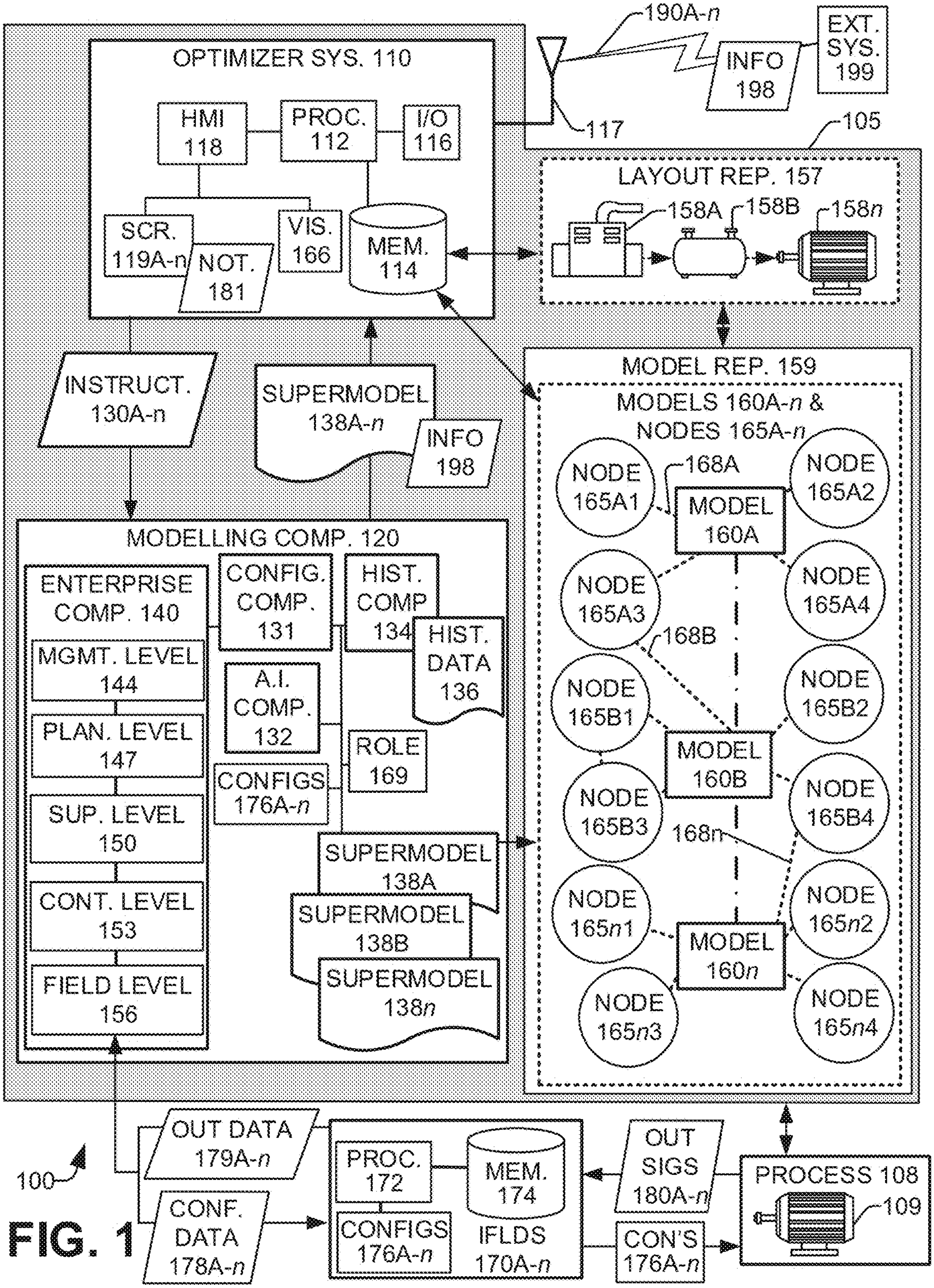
FIG. 1 illustrates a system that can be utilized to represent one or more operations in a process by a supermodel, in accordance with one or more embodiments.

The following detailed description is merely illustrative and is not intended to limit embodiments and/or application or uses of embodiments. Furthermore, there is no intention to be bound by any expressed and/or implied information presented in any of the preceding Background section, Summary section, and/or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that when an element is referred to as being "coupled" to another element, it can describe one or more different types of coupling including, but not limited to, chemical coupling, communicative coupling, electrical coupling, electromagnetic coupling, operative coupling, optical coupling, physical coupling, thermal coupling, and/or another type of coupling. Likewise, it is to be understood that when an element is referred to as being "connected" to another element, it can describe one or more different types of connecting including, but not limited to, electrical connecting, electromagnetic connecting, operative connecting, optical connecting, physical connecting, thermal connecting, and/or another type of connecting.

Terminology

To aid readability, the following terms are utilized:

Instruction: an objective, a requirement, a goal, a concern, an element, an aspect, and suchlike, as applied to a process, or generated by at least one device incorporated into the process.

Model: a representation of a device, equipment, etc. In an embodiment, the representation can be a mathematical representation of an operation being performed, e.g., to satisfy an operational requirement. In another embodiment, the representation can be a graphical representation of all the respective features that are associated with the device, a collection of devices, equipment, etc. As the various levels of a representation of a process are navigated, one or more models can be reviewed with underlying models (sub-models) exposed. In an embodiment, a collection of devices, etc., pertaining to a function/theme can be represented as a component block, wherein a model can be utilized to represent the component block. Models can be constructed by a user (e.g., a modeling expert) or automatically generated by an on-board system (e.g., as a computer-generated model).

Node: a representation of one or more features pertaining to operation of a device. A node can describe any of an input into a device, an output of a device, wherein, a requirement applied to a configuration of a device can be represented by a change in a node. A node can be applied to one or more models to describe functionality of the one or more devices associated with a respective model. Further, where a model represents a group of devices (e.g., the model is acting as a component block, block of components), a node can indicate an input of the component block, an output of the component block, and suchlike, where the output can be a combination of the respective features of the devices in the component block, while an input can be a combination of the respective features to be inputted into a component (e.g., a combination of the respective inputs of the devices in the component block). Further, a node can represent an intersection of an output of a first model with an input of a second model, such that, for example, a parameter X being an output of the first model and received as an input of the second model can be represented by the node.

Supermodel: a collection of one or more models combined to enable representation of a process. In an embodiment, where the supermodel is a single model representing a process, the one or more models can be considered as sub-models to the supermodel. The models included in a supermodel can further comprise one or more nodes.

As used herein, "data" can comprise metadata. Further, ranges A-n are utilized herein to indicate a respective plurality of devices, components, signals etc., where n is any positive integer.

The various embodiments presented herein relate to construction and operation of one or more enterprise systems which can be configured to control and monitor operation of an enterprise and/or an enterprise process comprising, for example, an industrial process, a manufacturing operation being performed at one or more facilities, an oil refinery, a power plant, a die casting manufacturer, and suchlike. The respective equipment in the process may operate in an independent manner or the equipment may operate with various interdependencies existing across the whole process. For example, where the process is an energy production facility, electrical energy may be generated by one component (e.g., steam being generated by a boiler 109B) but operation of that component is dependent upon operation of another component (e.g., capacity of pumps delivering the water to be turned into steam). Generally, the more complex the process, the greater the complexity of modeling the process (e.g., to capture all of the interdependencies) and, accordingly, the level of accuracy required of the modeling to enable automated operation and control of the process with a high level of confidence versus a process entailing a high degree of human interaction/input.

A representation of the process can comprise various models and nodes relating to operation of respective equipment in the process, wherein the over-arching process can be represented as a supermodel comprising the various models and nodes. The scope of each model, node, and supermodel can be a function of the focus of interest in the process, e.g., modeling to enable operation and control of a single piece of equipment in the process, modeling of a collection of devices comprising a portion of the overall process, modeling the entire process, and suchlike. In an embodiment, the models and nodes can be individually configured and interchangeable in a plug-and-play approach, and pertain to one or more requirements/objectives of operation of the equipment in the enterprise process.

As further described herein, a tier-based/level-based representation of the enterprise process can be implemented, for example, comprising any of:

(i) a management level, including, for example, enterprise resource planning (ERP) systems, production scheduling systems, and suchlike, (ii) a planning level, including, for example, manufacturing execution systems (MES), production systems and concerns, production targets and concerns, and suchlike, (iii) a supervisory level, including, for example, supervisory control and data acquisition (SCADA) systems and software, data historians and software, human-machine interfaces (HMIs), and suchlike, concerned with supervision of processes and included equipment, (iv) a control level, including, for example, programmable logic controllers (PLCs), proportional, integral, and derivate controller (PIDs), distributed control systems (DCS), and suchlike, and/or (v) a field level, including, for example, devices, components, sensors, actuators, valves, and suchlike, developed to control and monitor operation of the process equipment.

For the sake of understanding, the field level is referenced herein as the lowest of the tier-based representations, with the respective tiers stacked thereon, with the management level being the highest level.

AI techniques (e.g., algorithms, solvers, fuzzy logic, heuristic analysis, rule-based reasoning, and suchlike) can be utilized across all levels of representation of the enterprise process (e.g., across the supermodel) to enable one or more requirements to be met across the process while constraints of the process operation are navigated and complied with (e.g., cooling capacity constraints of an energy plant, allowable emission constraints, solidification rates for a diecasting casting alloy over a given dimension, and suchlike). Further, any suitable techniques can be utilized regarding representation of equipment and devices included in a process, and their respective operation(s), as a user-interactive graphical representation/visualization on a HMI. For example, an AI technique can utilize parametric hybrid modeling using linear (e.g., single value) parameters or nonlinear (e.g., kinetic parameters that vary, for example, with measured energy) variables. The AI can implement empirical modeling (construction through observation and experiment) wherein the modeling can be a function of real-time values being received as well as observations borne from analysis of historical data; parametric modeling (construction through statistical observation) utilizing parametric first-principles modeling as a steady-state or a dynamic model; and suchlike. The various embodiments presented herein can utilize graphical representation techniques and AI modeling as disclosed in U.S. Pat. Nos. 8,874,242 B2 and 8,897,900 B2, which are hereby incorporated by reference in their entirety.

In an embodiment, a process can be concurrently represented as a process-layout representation presenting the process as a series of icons, images, etc., as a mapping representing the various equipment of interest, as well as a modeling representation wherein the various features and operations of the process equipment can be represented by the models and nodes which can be interconnected (e.g., forming a network of models creating the supermodel representing plant-wide, enterprise-wide operation). Accordingly, the visualization of a process as both a process-layout representation and as a model representation enables interaction with the representations (e.g., plug and play inclusion/removal of equipment and models) as well as highly granular presentation of information regarding operation of equipment. In an embodiment, "smart devices" can be utilized at every tier of operation, which, in conjunction with mathematical modeling, operation of specific equipment can be reviewed, as well as operational interdependencies determined for all, or a sub-set, of the devices included in the process. The models can be utilized to reflect current operation of a process, prior operation, as well as a prediction(s) of future operation (e.g., in response to application of a requirement, incorporation of new equipment, and suchlike) enabling current and future control adjustments to be determined for the process. Accordingly, operation and control of process equipment can be optimized in an interactive and understandable manner that is unachievable with a conventional system.

As mentioned, in one or more embodiments, the various devices and components included in the process, and at any of the levels of the process, can be smart devices. The term smart device is used herein to describe any device, equipment, etc., having on-board/built-in technology (e.g., comprising a processor coupled to a memory, wherein the memory can be configured to store executable instructions that can be executed by the processor, including AI algorithms, device configurations, and suchlike) enabling the devices to operate in an intelligent, self-aware manner. In an embodiment, smart devices can be utilized at the field level, wherein the field level devices, actuators, sensors, and the like, can operate in an intelligent manner. In an example operation of use, a smart device at the field level can intelligently determine data content and format to be transmitted to other devices at the field level as well as higher-level devices (e.g., devices in the control level, in the supervisory level, etc.). Such operation is contrary to a conventional system where each and every measurement/bit of data is transmitted by a field-level sensor (e.g., a temperature sensor continuously transmits data to higher level devices via a PLC), while a smart temperature sensor can be configured to only transmit information that is of use to/requested by the other devices.

A smart device can be configured based on requirements, etc., as defined by a node in a model. In an example application, an instruction applied to a node configuration of a temperature sensor concerns measurement deviation from a base value (e.g., a calculated average value, a manually entered setting, a setting determined by one or more of the AI-based models described herein, and suchlike). Hence, rather than the temperature sensor continually transmitting the raw temperature measurements for subsequent processing at a higher level (e.g., at the control level) per a conventional operation, the temperature sensor can perform data processing at the sensor itself and only transmits a value indicating the deviation from the base value, wherein the transmitted data can be a value indicating a degree of departure from the base value, an "acceptable deviation" notification, an "unacceptable deviation" notification, and the like.

In a conventional system, the plethora of data generated and transmitted across a manufacturing enterprise (e.g., a die-casting plant) can place a significant operational burden on the devices operating at the higher levels (e.g., PLCs processing and responding to the received measurements). Further, in a conventional system, the plethora of data is largely useless until it has been processed by the higher-level devices. However, per the various embodiments presented herein, by utilizing smart devices at the field level, the smart devices can be configured to perform any of receiving/capturing data, measuring data, processing data, transmitting data, and suchlike, in accordance with a received instruction (e.g., one or more requirements of another device), and specific, model-driven data can be generated and subsequently transmitted by the smart device to at least one other device (e.g., at the same level, at a higher level, at a lower level, and suchlike).

Extending the concept further, in an embodiment, a higher-level device can be further configured to process the data received from a lower-level device and forward the processed data to a further higher-level device. For example, a PLC (in the control-level) can be configured to receive the data from a field-level device (wherein the data was processed by the field-level device in accordance with a requirement of the PLC (as defined in the model/node pertaining to the PLC)), the PLC is a smart PLC and further processes the data in accordance with a requirement of a higher-level device (e.g., a SCADA at the supervisory level, as defined in the model/node pertaining to the SCADA). And so on, throughout the various levels of the enterprise process. Similarly, a higher-level device can be configured based upon a requirement of a lower-level device. Hence, by generating "intelligent" data at all levels of the enterprise process, a high degree of intelligence and interoperability can be enabled across the enterprise, wherein the intelligence/interoperability enables an enterprise to be configured using various models and nodes at respective levels that can be combined/adjusted to enable an enterprise objective to be achieved, e.g., reduction of scrap in a diecasting operation to less than X %. Further, utilizing smart devices at all levels enables a level of transparency across the process that is unattainable by a conventional system utilizing field level devices that simply generate and transmit streams of non-contextual data.

Regarding models and nodes, nodes can be utilized to represent parameters, variables, tags, inputs into a model, outputs from a model, and suchlike, enabling operational constraints of a particular device, or a collection of devices, to be identified, for example, when implementing various models during optimization of the process. In an embodiment, the respective parameters, variables, tags, etc., can pertain to one or more operating conditions of equipment, devices, etc., implemented, previously implemented, and/or to be implemented on a process. Hence, by utilizing a model representation of a process (e.g., a parametric model), the respective input and output parameters pertaining to the model can be isolated and their respective values can be displayed on the model representation. Accordingly, by utilizing smart devices at the field level, the inputs (e.g., operating signals from a device that the field-level smart device is monitoring) and the outputs (e.g., data comprising processed operating signals) can be determined as they pertain to various models across the process. In an embodiment, the term "model" can relate to depiction of a modeling operation (e.g., parametric modeling) with various inputs and outputs for one or more components pertaining to the model (e.g., as depicted by nodes). In another embodiment, the term model can relate to the depiction of particular equipment in the process, with one or more operational states/configurations being applied to the equipment (e.g., as depicted by nodes). A field-level device (e.g., a sensor) can be represented at the field-level by one or more nodes in a model having one or more inputs and one or more outputs. A sensor can be configured with a first input and a first output (e.g., raw temperature value recorded every 1 minute) per a node configuration. Subsequently, a determination can be made that rather than using a raw value recorded every minute, a value representing a temperature deviation from a set/baseline value better reflects operation of the device being monitored by the sensor, accordingly the node can be reconfigured with a second output being "report deviation in temperature from the set value every 5 minutes". Alternatively, the model can be reconfigured such that a first node configuration with a first input and a first output configuration of "raw temperature value recorded every 1 minute" is replaced in the model with a second node configuration with the first input and a second output configuration of "report deviation in temperature from the set value every 5 minutes". In an embodiment, a variety of models can be utilized to respectively represent operation of a single device, or a collection of devices, wherein an output of a first model type can be incorporated into an input of a second model type, hence, even where models may be of different types/structures, the various models can be aggregated/combined to form a graphical representation of the process, and equipment operating therein. Hence, a first model, representing operation of a first device may be a parametric hybrid model, the second model, representing operation of a second device may be a cost function analysis model, wherein the output of the first model is the input of the second model. Further, an input of a third model (representing operation of a third device) can be attached to an output of the second model.

It is to be appreciated that while various embodiments are described with reference to operation of field-level smart devices (e.g., IFLDs 170A-n, as further described), the embodiments are not so limited, and are equally applicable to any devices, components, systems, etc., at any level of operation in the process (e.g., process 108, such as an industrial process, as further described) being configured with on-board operational intelligence (e.g., having an on-board configuration component, AI component, etc.), such that devices and systems across the whole process can be self-aware and auto-configure as necessary to enable one or more objectives of the process to be met, as further described herein.

Turning now to the drawings, FIG. 1 illustrates a system 100 that can be utilized to monitor and/or control various aspects of an enterprise (e.g., a manufacturing process/operation), in accordance with one or more embodiments. System 100 comprises an enterprise system 105, where, per various embodiments presented herein, the enterprise system 105 can be monitoring and/or controlling operations, performance, and suchlike of respective tier-level devices in a process 108 (e.g., an enterprise operation comprising a manufacturing process) in accordance with various requirements and/or objectives. In an embodiment, the process 108 can further include a variety of devices, components, equipment (e.g., equipment 109A-n, devices 170A-n. PLCs 254A-n, data historians 252, etc.) e.g., pump 109P, configured to perform one or more operations in the process 108 (e.g., pump 109P is configured to pump cooling water, pump spray solution).

Various components and functionality can be incorporated into the enterprise system 105, such as an optimizer system (OS) 110, wherein the OS 110 can be utilized to provide overall operational control, monitoring, and/or modeling of the process 108. The OS 110 can be coupled to a modeling component 120, wherein the modeling component 120 (and its respective sub-components) can be configured to generate, configure, modify, and/or control various components (e.g., computer models 160A-n and nodes 165A-n) to facilitate generation of a supermodel 138A-n, wherein a supermodel 138A-n can be a computer-representation of a process 108 and the various devices/equipment in process 108, as further described. The modeling component 120 (and its respective sub-components) can be configured to also monitor operation of devices, equipment, etc., (e.g., equipment 109A-n, devices 170A-n, PLCs 254A-n, data historians 252, etc.) across the process 108, identify a current operating condition (e.g., a first configuration 176A), determine how the respective device, etc., can meet an objective of the process 108, and forward a requirement to the device enabling reconfiguration (e.g., with a second configuration 176B) of the device to meet the process objective.

As further described, the modeling component 120 can receive various instructions 130A-n from the OS 110, wherein the instructions 130A-n can include requirements, objectives, goals, concerns, and the like, pertaining to operation of a process 108. The granularity of information contained in an instruction 130A-n can depend upon the origination of the instruction 130A-n. For example, an instruction generated by a high-level system in process 108 (e.g., at the management level) can be "reduce scrap to <X %". "reduce operational overhead to X amount", "reduce production time", "reduce supply chain cost", "reduce human oversight required for an operation", "reduce operational cost of equipment X", and suchlike. While at a control level, an instruction 130A-n can comprise "provide data in format X", "determine a baseline shift in operation", and suchlike. Accordingly, as further described, instructions can be generated by the various devices operating at every level of process 108, as well as being received externally (e.g., via a remote system, a user command input via a HMI, and suchlike). A first device can generate and transmit an instruction to a second device, wherein the second device has the capacity (e.g., is a smart device) to analyze the instruction and (a) generate data in accord with the instruction. (b) auto-configure in accordance with a requirement(s) in the instruction, and suchlike. Accordingly, as further described, device configurations and their representation can be in a continual/real-time or near real-time state of configuration fluidity to enable the ever-changing requirements of a process to be met.

Figure 2:
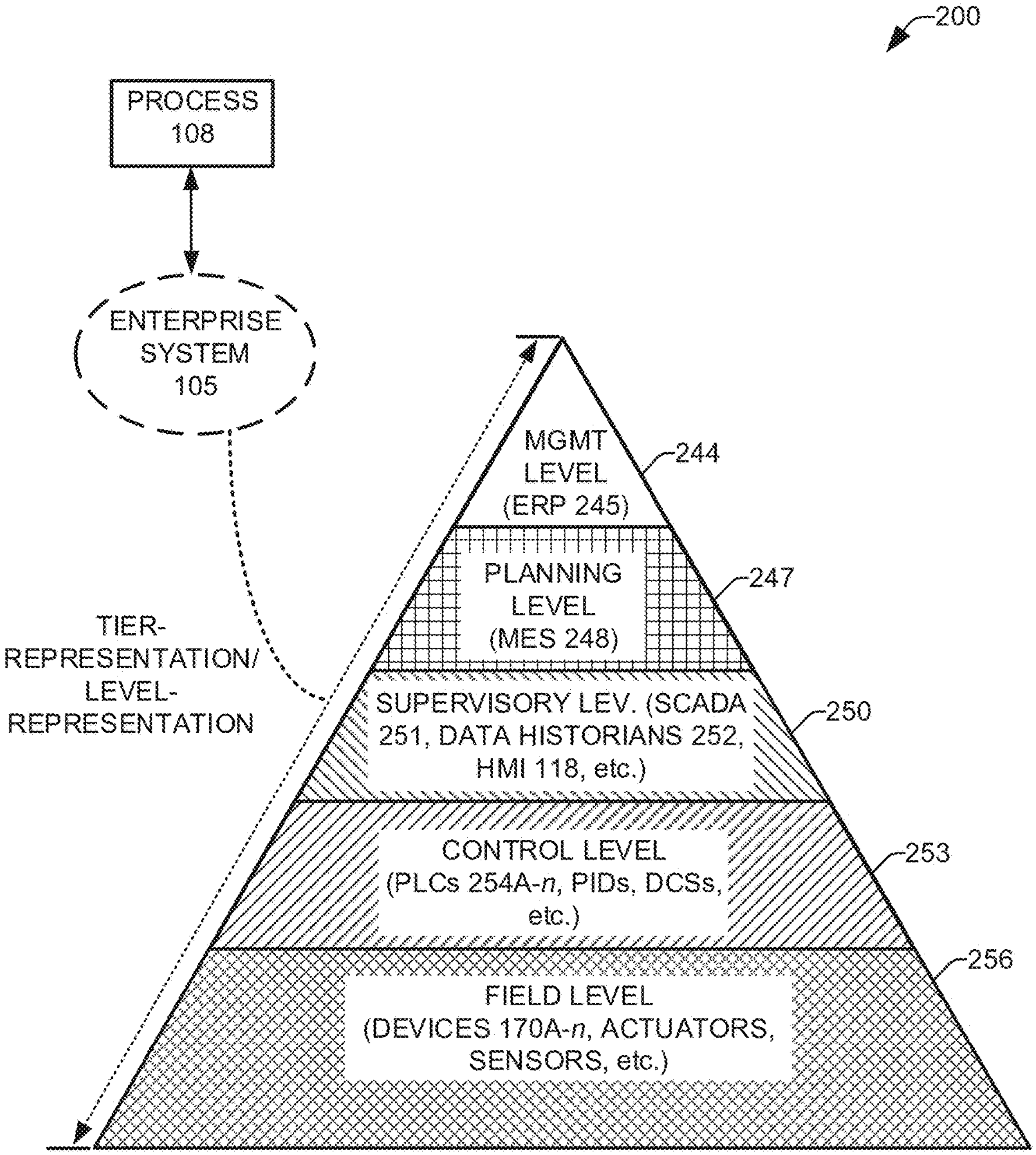
FIG. 2 presents a visual representation of a process by an enterprise system 105, wherein the process is separated into/represented by various tiers/levels, according to at least one embodiment.

The modeling component 120 can further comprise an enterprise component 140, wherein the enterprise component 140 can include various components configured to control, monitor, and/or model operation of various devices and systems operating at various levels across process 108. Viewing FIG. 1 in conjunction with FIG. 2. FIG. 2 presents a visual representation 200 of an enterprise system 105 and the process 108 being separated into/represented by various tiers/levels, wherein operations, features, considerations, constraints, and suchlike, pertaining to a particular level in representation 200 can be defined, programmed, adjusted, stored, incorporated, and suchlike, into respective level components 144, 147, 150, 153, and/or 157 incorporated into the enterprise component 140.

Accordingly, a management level component 144 can be configured to perform functions and activities pertaining to management level 244 of the process 108 (e.g., ERP 245); a planning level component 147 can be configured to perform functions and activities pertaining to planning level 247 of the process 108 (e.g., MES 248); a supervisory level component 150 can be configured to perform functions and activities pertaining to supervisory level 250 of the process 108 (e.g., SCADA 251 activities, data historian 252 activities, interfacing with external inputs via HMI 118, etc.); a control level component 153 can be configured to perform functions and activities pertaining to control level 253 of the process 108 (e.g., operations pertaining to PLCs 254A-n, PIDs, DCSs, and suchlike); and a field level component 156 can be configured to perform functions and activities pertaining to field level 256 of the process 108 (e.g., operations pertaining to devices (IFLDs 170A-n), sensors, actuators, and suchlike). Further, as previously mentioned, any of the devices and equipment in process 108 can be smart devices, any functions and activities pertaining to devices at a respective level (e.g., at any of the respective level components 144, 147, 150, 153, and/or 157) can similarly be stored locally at the device. As mentioned, instructions 130A-n can be directed towards one of more of the smart devices, with the one or more instructions, potential operations and configurations to satisfy the instruction can be determined and stored at the smart device. Further, the instructions, operations, configurations, etc., can also be stored at any of the components 144, 147, 150, 153, and 156, thereby enabling a device to function in process 108 while the behavior of the device is modeled and configured in an offline operation by the modeling component 120.

As previously mentioned, various representations can be utilized to enable interaction and/or control of process 108, wherein the various representations can be presented in a concurrent manner, e.g., either side-by-side on a HMI or presented as overlays, wherein access to a respective representation can be role-based, as further described. As shown in FIG. 1, the process 108 can be graphically presented as a layout representation 157, with various devices/ components/equipment 109A-n in process 108 (e.g., communicatively coupled to enterprise system 105) represented by various icons 158A-n, e.g., icon 158A can be a chiller 109C operating with a boiler 109B, represented as icon 158B, further operating with a motor 109M, represented as an icon 158*n*.

The modeling component 120 can utilize various models 160A-n and nodes 165A-n to generate one or more supermodels 138A-n, wherein a supermodel (e.g., supermodel 138A) can be constructed by the modeling component 120 (or subcomponents included therein) to (a) represent a current, past, future, and/or potential operational state of process 108, (b) illustrate achievement of and/or how to achieve one or more requirements conveyed in instructions 130A-n as applied to one or more devices in process 108, (c) to control configuration and/or operation of the various devices in process 108, and suchlike, as further described herein. As further shown in FIG. 1, the process 108 can be presented as a mathematical model representation 159, wherein, in an example representation, a supermodel 138A-n can include a model (e.g., model 160A) generated based on one or more nodes (e.g., one or more nodes 165A1-A4). Respective nodes can be associated with respective models via connectors 168A-n. For example, in an example modeling technique, connector 168B connects node 165A3 to models 160A and 160B, wherein a parameter(s) pertaining to node 165A3 can function as an output(s) of model 160A and an input(s) to model 160B. The supermodels 138A-n, models 160A-n, nodes 165A-n can be computer-generated mathematical models or user-generated models (e.g., by a modeling expert), wherein after being initially generated/constructed, the supermodels, etc., can be automatically updated by one or more components included in the enterprise system 105, as well as based on user input/adjustment.

As mentioned, the models and nodes can be generated and utilized in a plug-and-play manner, e.g., a current, first model can be reconfigured by a user (e.g., a modeling expert) with the reconfigured, second model plugged into a supermodel to determine an effect of implementing the configuration of the second model in process 108. It is to be appreciated that while FIG. 1 illustrates models 160A-n respectively comprising nodes 165A1-A4, 165B1-B4, and 165*n*1-*n*4, any number of nodes can be utilized to form a model, and further, any number of models can be utilized to form a supermodel. Also, models can be connected to other models, and nodes can be shared between more than one model. As further described, the models 160A-n and their respective nodes 165A-n can be configured for a particular level in an enterprise representation. In an embodiment, a first requirement placed upon and/or generated by a first component at a first level (e.g., at the management level 244) can be the same, similar, or different to a second requirement placed upon and/or generated by a second component at a second level (e.g., at the control level 253).

As previously mentioned, process 108 can be of any scale, scope, etc., e.g., any of, in a non-limiting list, a global manufacturing operation comprising numerous facilities, supply pipe-lines, supply chains, distribution networks, etc., a manufacturing facility, a manufacturing operation performed within a manufacturing facility, a banking system, a retail system, etc. Process 108 is not limited to a manufacturing endeavor(s) but can be any operation whereby components and devices at the lowest level (e.g., comparable to the field level 256) can be configured to generate data in an intelligent manner, thereby enabling configuration of higher level components (e.g., operating at any of levels 244, 247, 250, and/or 253), to enable a supermodel 138A-n to be generated and executed that accurately represents the process 108 in a manner unachievable with a conventional system.

Conventional systems oftentimes do not have knowledge of how lower-level components will behave, and consequently application of high-level objectives may not be viable given the lack of information regarding lower-level behavior. Enterprise system 105 enables high-level requirements (e.g., in an instruction 130A-n) to be implemented given the high degree of knowledge at the field-level and an according high level of confidence in the underlying downstream behavior of the lower-level components. Hence, an instruction can be applied at the management level 244 and its effect on the underlying levels (e.g., levels 256, 253, 250, and/or 247) and the components associated with those underlying levels can be readily determined. For example, a user (e.g., a process engineer) can implement a requirement at the management level 244 in a supermodel representation of the process and then "zoom" in on devices (e.g., IFLDs 170A-n) operating at the field level 256 to identify a configuration (e.g., an existing configuration, an amended configuration, a new configuration) that could be implemented at the respective field-level device to satisfy the requirement. Further, the representation of the IFLD (e.g., via respective models 160A-n and nodes 165A-n) can indicate whether equipment associated with the IFLD (e.g., a pump) has the required capacity, whether there is a conflict in operation of the equipment regarding operation of other equipment, and suchlike. An advantage of enterprise system 105 (and its automated decision making/implementation) is the mitigation of substantial manual intervention that can be required with a conventional system(s) to tune operations and configurations to account for unexpected behavior/conflicts of underlying systems. Accordingly, enterprise system 105 can save considerable time and associated costs as compared to a conventional system(s) monitoring and/or controlling process 108.

Modeling component 120 can further comprise a configuration component 131 wherein the configuration component 131 can be configured to generate the various models 160A-n, nodes 165A-n, and supermodels 138A-n, and further combine them, as required, to meet an objective and/or optimize operation of a process. As mentioned, the modeling component 120 can receive instructions 130A-n, wherein the instructions 130A-n can include requirements, objectives, etc.

In an embodiment, a variety of models 160A-n can be utilized to represent operation of a device, component, etc., in process 108. During an optimizing operation, the configuration component 131 can determine which model 160A-n to utilize that best represents operation of the device for a given objective (e.g., in instruction 130A-n), and subsequently incorporate the selected model 160A-n into a supermodel 138A-n. Accordingly, the supermodel 138A-n can be compiled from a collection of models 160A-n that best represent operation of the devices in process 108 regarding meeting the objective. When a new objective is received, or, e.g., operation of a device in process 108 is determined to not be operating as anticipated, the configuration component 131 can further review available models 160A-n (e.g., to find a "best available" solution to the objective) which can be represent operation of the one or more devices in process 108 to satisfy the objective/required operating condition, select the model 160A-n that best represents the objective/operating condition, incorporate the best model 160A-n into a supermodel 138A-n and further, if required, implement a configuration associated with the model 160A-n on the one or more devices requiring adjustment to meet a requirement/operating condition.

In another embodiment, a node 165A-n can represent a particular feature of operation/functionality of a device (as represented by a model 160A-n) in process 108, wherein an IFLD 170A-n can be utilized to achieve a requirement or objective imposed upon the node 165A-n. For example, node 165S can be created to satisfy an objective of "measure the temperature of a furnace" in process 108. Accordingly, an IFLD 170T can be an immersion probe, IFLD 170I can be an infrared probe, IFLD 170P can be a pyrometer, and the like, respectively configured to measure the temperature of the molten diecasting alloy. The configuration component 131 can review the respective technical specification(s) of IFLD 170T. IFLD 170I, and IFLD 170P to assess viability of the respective IFLD to monitor the furnace temperature (e.g., operating range of the IFLD, measurement sensitivity of the IFLD, and suchlike) in accordance with the objective applied to the node 165S. The configuration component 131 can select the IFLD that satisfies the objective(s) placed upon the node 165S and, with the potential for node 165S to be satisfied, a supermodel 138A-n can be generated based on the selected IFLD and the node 165S.

In another embodiment, the configuration component 131 can be configured to review technical specifications of respective IFLDs 170A-n currently being utilized in a process 108 in view of the various objectives and determine whether a particular IFLD 170A-n is configured to meet the objective(s) and in response to determining that the particular IFLD 170A-n cannot meet an objective, the configuration component 131 can recommend an IFLD 170A-n to replace the particular IFLD 170A-n. For example, a currently operating pump may not be able to meet a requirement, accordingly, other available pumps (e.g., currently in storage) can be reviewed, and the pump that can satisfy the requirement can be swapped-in for the currently used pump.

In a further embodiment, configuration component 131 can be configured to parse any of instructions 130A-n regarding a requirement, a decision, etc., that may be included in the instruction 130A-n. In an embodiment, the configuration component 131 can be configured to parse the requirement, etc., and generate a mathematical representation of the requirement. Accordingly, artificial intelligence and machine learning technologies, as further described, can be utilized (e.g., configuration component 131, artificial component 132, historian component 134, etc., as further described) to enable the requirement to be compared with existing/historic configurations, and further, the respective existing/historic configurations can be utilized/implemented to enable the requirement to be met.

Figure 9A:
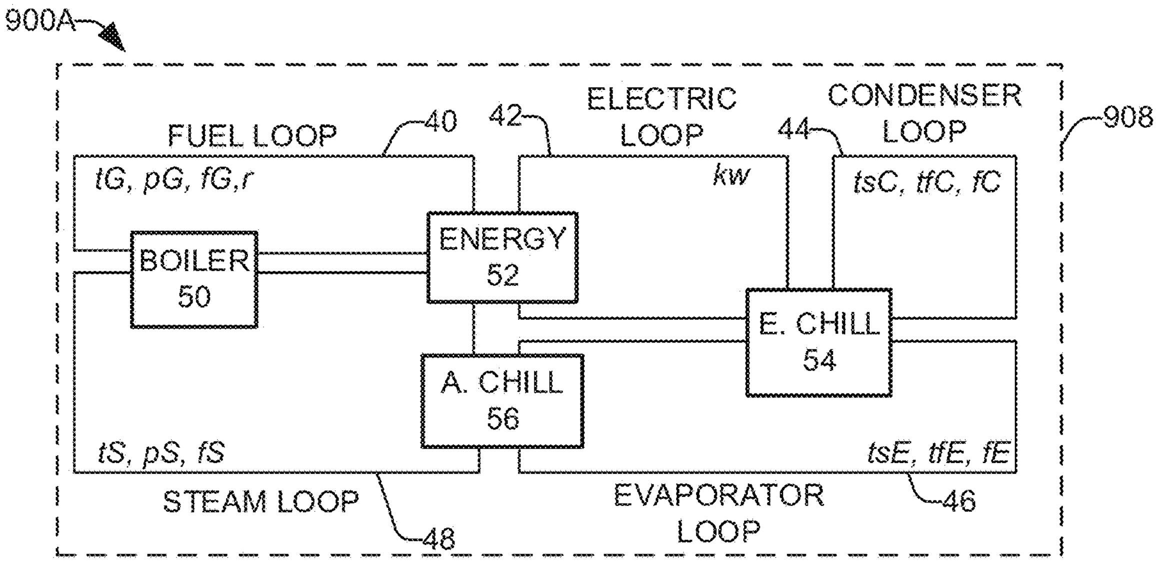
FIG. 9A (Prior Art)
FIGS. 9A, 9B, and 9C are schematics depicting use of a parametric hybrid model to model at least a portion of a process, in accordance with one or more embodiments presented herein.
Figure 9B:
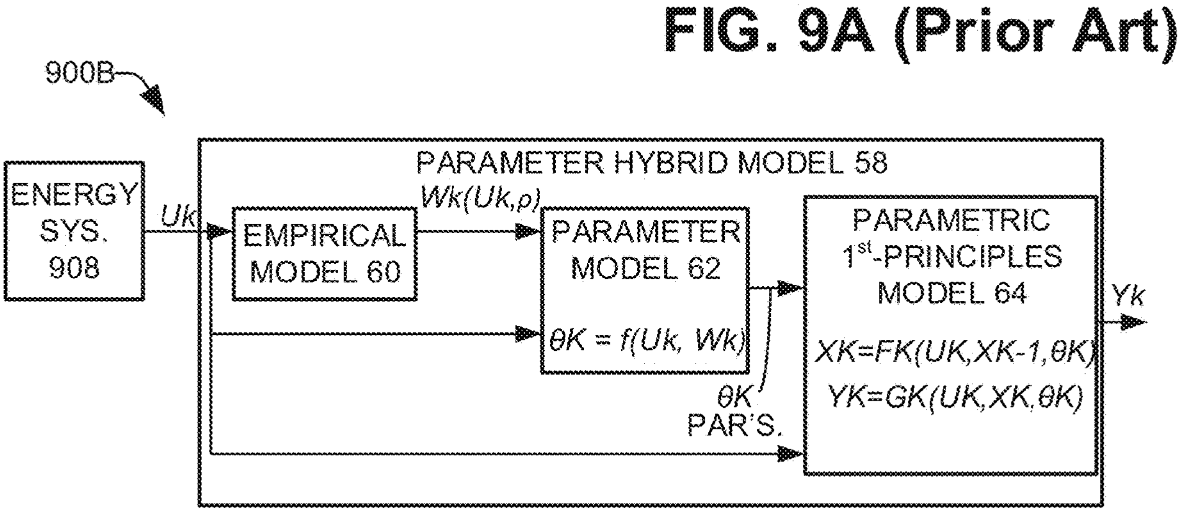
FIG. 9B (Prior Art)
Figure 9C:
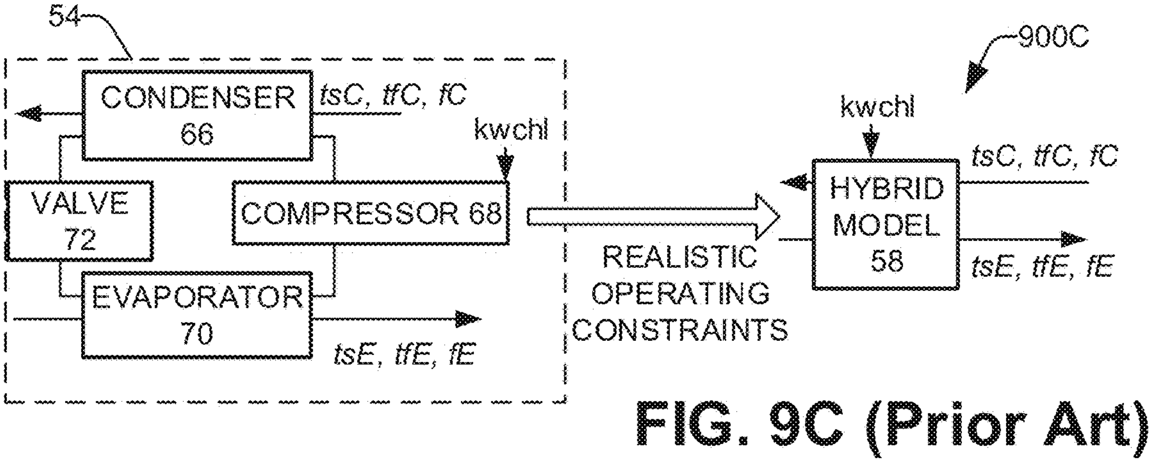
FIG. 9C (Prior Art)

Modeling component 120 can further comprise an artificial intelligence (AI) component 132, wherein the AI component 132 can be configured to apply respective data analysis techniques, algorithms, solvers, etc., as required to derive required intelligence regarding operation of the process 108, enable readily understandable graphical representation of process 108, enable rapid and low cost function achievement of a requirement(s) placed upon the process 108, and suchlike, as further described herein. In an embodiment, AI component 132 can utilize parametric hybrid modeling to optimize process 108, wherein FIGS. 9A-9C present an example scenario of such implementation, with reference made to U.S. Pat. No. 8,874,242 B2 and U.S. Pat. No. 8,897,900 B2, which are incorporated herein by reference in their entirety. Given the relatedness of operations, AI component 132 and configuration component 131 can operate in conjunction, as well as any operation being performed by one component can be performed by the other, e.g., both AI component 132 and configuration component 131 can generate configurations 176A-n, construct supermodels 138A-n, and suchlike.

Modeling component 120 can further include a historian component 134 and historical data 136, wherein the historian component 134 can be configured to review historical data 136. Historical data 136 can be compiled and stored at any suitable device, (e.g., in memory 114, local memory 174 at a field-level device, at a higher-level memory device, etc.), wherein the historical data 136 can be collected regarding any operation, function, feature, etc., performed by any device during operation of the process 108. Further, the historical data 136 can be received from an external system, wherein the historical data 136 can be operational data obtained from comparable equipment or equipment of interest operating in another process, wherein the historical data 136 received from the other process can be reviewed to assist in achieving a requirement applied to process 108. In another embodiment, the historical data 136 can be specification data. The historian component 134 can be configured to operate in conjunction with the AI component 132, wherein the historical component 134 can have intelligence to identify information in the historical data 136 that pertains to one or more computations/analysis being performed by the AI component 132.

The enterprise system 105 can further include a role component 169 configured to control interaction with the respective supermodels 138A-n, models 160A-n, nodes 165A-n, layout representation 157, model representation 159, the devices represented by the foregoing, etc., based on user role/authorization. For example, authentication of a user accessing the enterprise system 105 enables their role to be established (e.g., by role component 169) and access is granted based thereon, e.g., as a modeling expert, process engineer, quality control manager, process manager, and suchlike, as further described. Role component 169 can be further configured to determine whether a user/device is authorized to implement a change (e.g., implement a model 160D, that has been reviewed in an offline graphical representation, in a real-time graphical representation of process 108.

As shown, enterprise system 105 can be coupled to one or more intelligent field devices (IFLDs) 170A-n. As previously mentioned, an IFLD (e.g., any of IFLDs 170A-n) can be a smart device configured with on-board/built-in technology enabling an IFLD to be configured to perform various intelligent operations at the IFLD. In a non-limiting list, an IFLD (e.g., any of IFLDs 170A-n) can be configured (e.g., by any of configurations 176A-n) to (a) monitor and/or capture particular data (e.g., output signals, process data), (b) process captured data in accordance with a requirement (e.g., in instruction 130A) for subsequent processing/operation by a higher-level component, (c) determine what data to transmit to other devices, parse an instruction to determine output data 179 to transmit, wherein the output data 179 is a subset of output signals (e.g., output signals 180) received from equipment being monitored by, e.g., IFLD 170H, (d) instruct operation of other IFLDs or other equipment/systems at any level in process 108, and suchlike. In an embodiment, the IFLDs 170A-n can have built-in intelligence such that the IFLDs 170A-n can auto-configure/self-configure themselves to satisfy a requirement. In another embodiment, the IFLDs 170A-n can be configured based upon a configuration instruction received from the configuration component 131. In another embodiment, an IFLDs 170A-n can generate and transmit an instruction 130C to another IFLD, wherein the other IFLD can auto-configure based upon the received instruction 130C. Configurations 176A-n can be stored locally at an IFLD 170A-n as well as in enterprise system 105 (e.g., in memory 114) for selection, implementation, review, construction, etc., by configuration device 131, AI component 132, etc.

In an example operation, PLC 254A is processing output data 179A received from IFLD 170A, wherein IFLD 170A is operating with a first configuration 176A which requires IFLD 170A to receive output signals 180A from pump 109P, format the output signals 180A (e.g., parse into a subset from the total signals received, reformat, and suchlike) into output data 179A and transmit the output data 179A to the PLC 254A. Subsequently, PLC 254A determines that it requires the output data in a different format. Hence, PLC 254A can generate an instruction 130B which can be received and parsed by configuration component 131, wherein the instruction 130B includes the requirement to reformat the output signals. The configuration component 131 can forward the instruction 130B to IFLD 170A, wherein the requirement forms configuration data 178B. The IFLD 170A implements the configuration data 178B such that IFLD 170A ceases operation with configuration 176A and implements configuration 176B for formatting output signals 180A, and now transmits a second set of output data 179B to the PLC 254A.

In another example operation, IFLD 170A has a baseline setting configured thereon to monitor operation of the pump 109P. IFLD 170A has previously implemented a configuration 176H for controlling operation of the pump 109P in accordance with the baseline setting. During operation of pump 109P, the IFLD 170A determines that the output signals 180H are no longer within an acceptable range of operation from the baseline setting. To address the issue, the IFLD 170A can further implement a second configuration 176J to control operation of the pump 109P, such that the second configuration 176J causes the pump 109P to now generate output signals 180H that are in accordance with the baseline configuration. In another example, PLC 254A could make the determination regarding operation of the pump 109P is straying from the baseline setting and sends and instruction 130J to the IFLD 170A to implement a configuration 176J on pump 109P. The foregoing are non-limiting examples of the range of interactions and configurations that can be implemented by enterprise 105 and the various components comprising and/or monitoring process 108.

In an embodiment, to enable the IFLDs 170A-n to operate in an efficient and smart manner, the IFLDs can utilize in-memory databases (IMDBs, aka main memory database system (MMDB) or memory resident database), wherein the IMBDs can reside on local memory (e.g., memory 174, as further described). Accordingly, a CPU 172 located on the IFLD 170A-n, can, in conjunction with the local memory 174, execute process algorithms and data queries at the IFLD which can enhance performance at the local level (e.g., the field level 256). Further, interaction between the CPU and the IMDB can be optimized to minimize data access times, etc., and accordingly, decision-making operations at the IFLD can be performed faster and more efficiently than a conventional situation where a system one or more levels above the field level is controlling operation of the IFLDs, alleviating issues with data transmission latency, and further, operations at the CPU local to the IFLD can be highly focused and responsive to real-time data being received at the IFLD, rather than being controlled by global operations operating in a higher level system. Accordingly, the ILFDs 170A-n can be highly responsive to local changes in operation of the process 108, and further, the IFLDs 170A-n can rapidly implement a change in operation of the process 108.

In a further embodiment, the IFLDs 170A-n can be configured to communicate amongst themselves and accordingly, respectively configure themselves to enable data to be collected to satisfy one or more requirements (e.g., in instructions 130A-n) to enable successful operation of the one or more supermodels 138A-n, models 160A-n and/or nodes 165A-n. For example, a first IFLD (e.g., IFLD 170A) is taking readings that are not in alignment with anticipated measurements (e.g., furnace temperature) based on operation of other IFLDs in a model (e.g., per a model 160T). Accordingly, the first IFLD can make a determination that the IFLD has a calibration issue and while awaiting calibration/review, various functions configured to be performed at the first IFLD can be transferred to a second IFLD (e.g., IFLD 170B). In another embodiment, an IFLD (e.g., IFLD 170D) can be considered a node (e.g., node 165B5) in a model (e.g., in model 160F) and can be configured to perform a task (e.g., as defined in the configuration of node 165B5). Owing to the IFLD being a smart device, the IFLD can run internal diagnostics to determine whether measurements/data generated by the IFLD are as anticipated, and in response to determining the measurements/data are not as expected, the IFLD can transmit a notification to a higher-level device that the measurements/data may not be correct in conjunction with an analysis by the IFLD as to why the measurements/data may be suspect. Accordingly, the one or more IFLDs 170A-n can have intelligence to notify higher level devices that the respective IFLD, or data generated therefrom, may be suspect. Hence, rather than a higher-level device having to determine (e.g., with an according time delay inherent to the operation) that an IFLD is operating in a suspect manner, the IFLD can instigate adjustment/re-configuration of an associated configuration (e.g., of node 165B5) or model (e.g., model 160F), thereby, enabling flagging of the suspect data, proactive response by a higher-level device, and such like. In a further embodiment, the IFLD 170A-n can have sufficient on-board intelligence to enable the IFLD 170A-n to self-diagnose one or more operations occurring at the IFLD and take corrective measures (e.g., implement a configuration 176A) to address an issue at the IFLD, as detected by the IFLD, or apply a configuration to equipment communicatively coupled to the IFLD (e.g., a pump being monitored/controlled by IFLD 176A). Furthermore, an IFLD 170A-n can self-diagnose in response to an instruction 130A-n received from another device (e.g., a PLC 254A) instructing the IFLD to address an issue detected by the other device.

As shown in FIG. 1, the OS 110 can further include a processor 112 and a memory 114, wherein the processor 112 can execute the various computer-executable components, functions, operations, etc., presented herein. The memory 114 can be utilized to store the various computer-executable components, functions, code, etc., as well as instructions 130A-n, models 160A-n, nodes 165A-n, supermodels 138A-n, information 198, output data 179, and suchlike (as further described herein).

Similarly, as shown in FIG. 1, an IFLD (e.g., any of IFLDs 170A-n) can respectively include a processor 172 and a memory 174, wherein the processor 172 can utilize and execute various on-board logic such as various computer-executable components, functions, operations, etc., presented herein, e.g., configuration data 178. The memory 174 can be utilized to store the various computer-executable components, functions, code, etc., as well as instructions 130A-n, configuration data 178, output data 179, information regarding any of models 160A-n, nodes 165A-n, supermodels 138A-n, etc., measurements recorded by the IFLD (e.g., furnace temperature), and suchlike (as further described herein).

Per the various embodiments presented herein, data and/or information storage is not limited to memory devices in enterprise system 105 or at IFLDs 170A-n, but can occur at any level with memory devices available at devices and systems available at any of the levels 244, 247, 250, 253, and/or 256. By implementing data/information storage across the various levels of process 108 in conjunction with optimization of data traffic volume and transmission enables expansion of resource availability and focused analysis to enable efficient, accurate and targeted action in connection with achieving plant operation goals.

As further shown, the OS 110 can include an input/output (I/O) component 116, wherein the I/O component 116 can be a transceiver configured to enable transmission/receipt of information 198 (e.g., information generated by supermodels 138A-n, information (e.g., configuration information) pertaining to any of supermodels 138A-n, models 160A-n, nodes 165A-n, IFLDs 170A-n, configuration data 178, output data 179, and suchlike) between the OS 110 and any external system(s) 199. External system(s) 199 can include, in a non-limiting list, an enterprise system operating at a remote location (e.g., a manufacturing plant across the globe), a process co-located with process 108, but not incorporated into a supermodels 138A-n, and suchlike. I/O component 116 can be communicatively coupled, via an antenna 117, to the remotely located devices and systems (e.g., external system 199). Transmission of data and information (e.g., information 198, and suchlike) between the enterprise system 105 (e.g., via antenna 117 and I/O) component 116) and the remotely located devices and systems can be via signals 190A-n. Any suitable technology can be utilized to enable the various embodiments presented herein, regarding transmission and receiving of signals 190A-n. Suitable technologies include BLUETOOTH®, cellular technology (e.g., 3G, 4G, 5G), internet technology, ethernet technology, ultra-wideband (UWB), DECAWAVE®, IEEE 802.15.4a standard-based technology, Wi-Fi technology, Radio Frequency Identification (RFID). Near Field Communication (NFC) radio technology, and the like. Alternatively, the enterprise system 105 can communicate with a remotely located system/device via hardwired communication technology, e.g., via a business-wide local area network (LAN). In an embodiment, enterprise system 105 and/or external system 199 can be located "in the cloud", with data transmission therebetween conducted via any suitable technology.

In an embodiment, as previously mentioned, the OS 110 can further include a HMI 118 (e.g., a display, a graphical-user interface (GUI)) which can be configured to present various information (e.g., layout representation 157, model representation 159, data libraries, component libraries, and suchlike) including imagery of/information regarding any of supermodels 138A-n, models 160A-n, nodes 165A-n, information received from external systems and devices, etc., per the various embodiments presented herein. The HMI 118 can include an interactive system configured to present the various information via various screens 119A-n presented thereon, and further configured to facilitate input of information/settings/selections, etc., regarding operation of process 108, wherein presentation of information on screens 119A-n can be performed by visualization component 166 (e.g., various representations of process 108, as further described). One or more notifications 181 can be presented on screens 119A-n, wherein the notifications 181 can include warnings, information, data, a dialog box, etc.

Figure 3A:
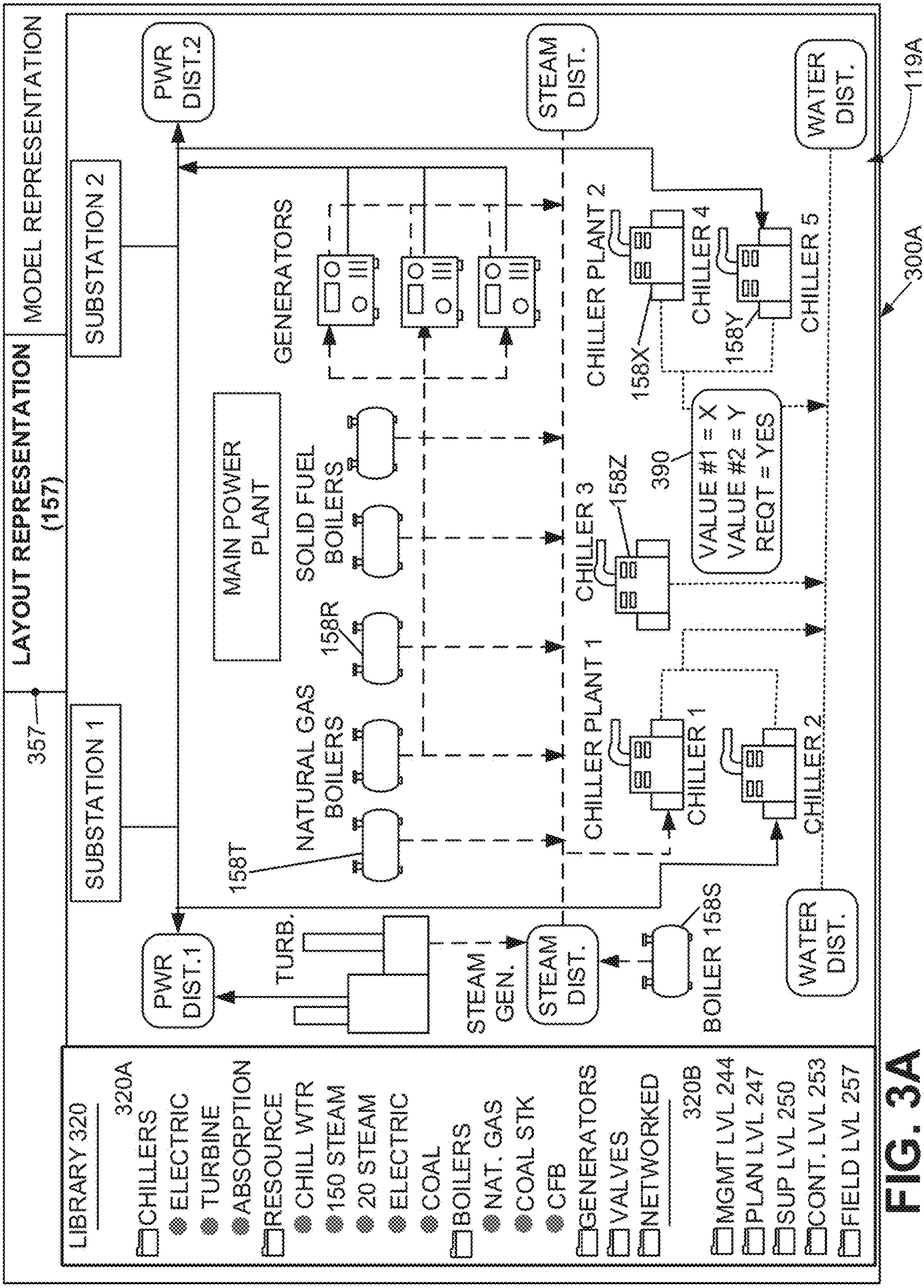
FIG. 3A presents a process visualization in the form of a layout representation of the process, in accordance with various embodiments presented herein.
Figure 3B:
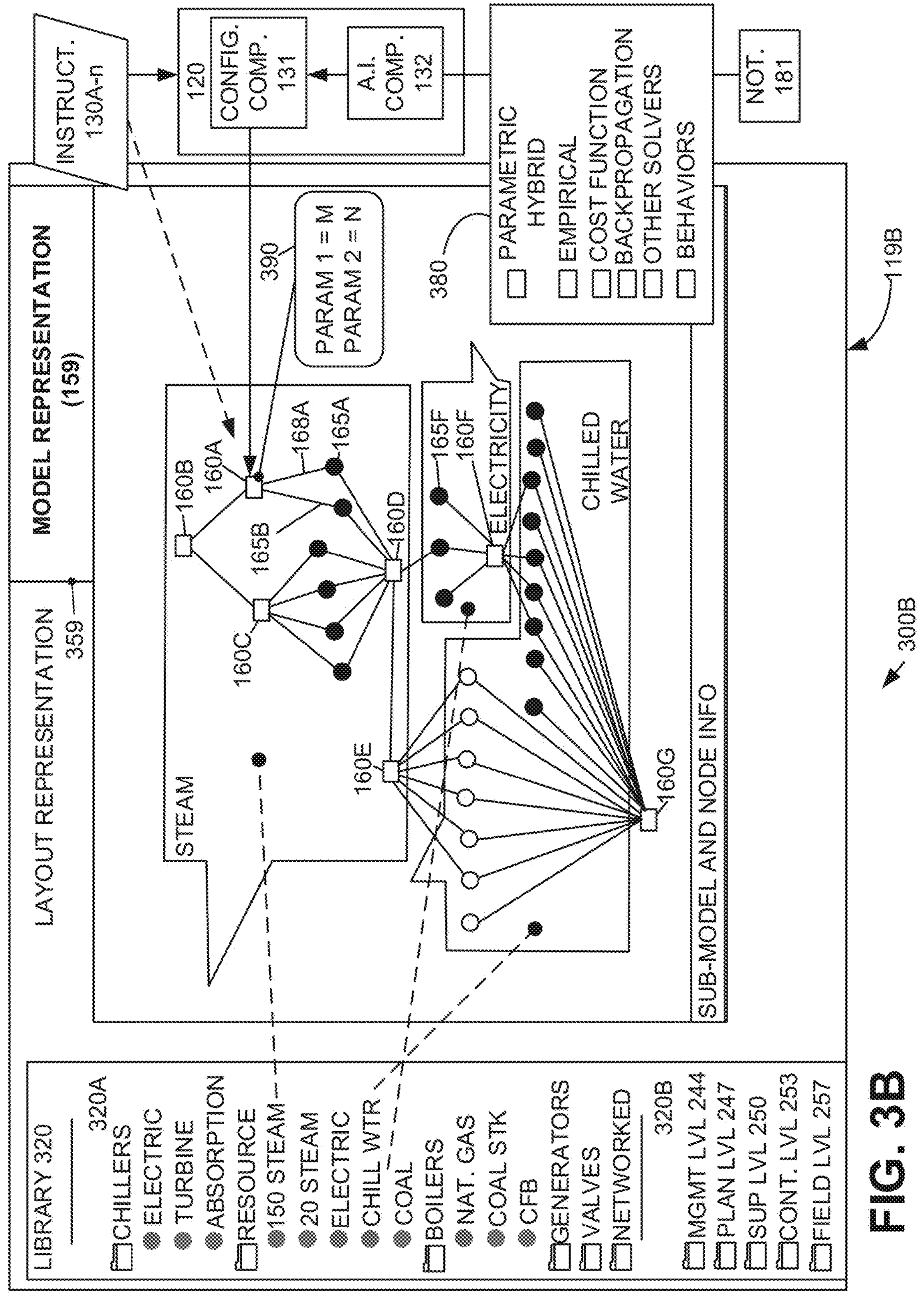
FIG. 3B presents a process visualization in the form of a model representation of the process, in accordance with various embodiments presented herein.

Turning to FIGS. 3A and 3B, respective representations 300A and 300B are presented regarding a process 108 in accordance with various embodiments presented herein. As previously mentioned, the process 108 can be graphically represented (e.g., as a visualization) simultaneously both as a layout representation 157 and a model representation 159 (e.g., via a graphical modeling tool, e.g., visualization component 166 operating in conjunction with configuration component 131). In the example representation 300A, presented in FIG. 3A, the layout representation 157 (presented on screen 119A) can comprise the various equipment, devices, etc., that are incorporated into a power plant process 108 represented as icons 158A-n and their interconnections across the process 108. The example representation 300B, presented in FIG. 3B, the model representation 159 (presented on screen 119B) can depict the various equipment and their respective underlying operations and functionality expressed in a mathematical manner as models 160A-n and nodes 165A-n, wherein the equipment can be presented in any meaningful manner, e.g., equipment and operations associated by theme, e.g., steam generation/operation, electricity generation, and equipment cooling (e.g., chillers) in process 108. In an embodiment, selection of which representation is presented can be facilitated by selection of layout representation 157 via selection of region 357 with model representation 159 be presented via selection of region 359 of screens 119A-B. As further described, which representation a user can view and the degree of interaction with the representation can depend on the role/access level of the user (e.g., process engineer vs. modeling expert).

The example representations 300A and 300B further include the layout representation 157 and model representation 159 being presented in conjunction with a library 320 comprising a first library 320A with the various equipment, systems, devices, etc., (e.g., any of equipment 109A-n, devices 170A-n. PLCs 254A-n, etc.) grouped by equipment-type, and a second library 320B having equipment, systems, devices, etc., (e.g., any of equipment 109A-n, devices 170A-n, PLCs 254A-n, etc.) grouped by respective operational levels (e.g., as depicted in FIG. 2) such as the management level 244, the planning level 247, the supervisory level 250, the control level 253, and/or the field level 256. Libraries can be based on any desired criteria/theme/subject matter, e.g., equipment 109A-n grouped according to function, such as equipment 109A-n in a plant associated with a first portion of process 108, e.g., steam generation in an energy-producing plant, a second portion of a process 108, e.g., chilling in an energy-producing plant (e.g., as depicted in FIGS. 9A-9C). Hence, the process 108 can be represented in any meaningful manner, whereby, for example, a user can easily toggle between viewing information pertaining to the IFLDs 170A-n included in a process 108 for particular equipment 109A-n and viewing information pertaining to the PLCs 254A-n that are associated with the respective IFLDs 170A-n. Interaction with the representations 300A and 300B can be via any suitable approach. For example, the interaction can be via selection of specific equipment 109A-n presented on the screen 119A-n (e.g., via icons 158A-n). In another example, interaction can be via selection of one or more pieces of equipment 109A-n ascribed to a particular operation/function (e.g., via models 160A-n), e.g., chillers 109C, resources, boilers 109B, etc., wherein the content of library 320 can respectively update as a user navigates up or down through the process 108 and the equipment 109A-n contained therein. For example, upon selecting a turbine chiller 109C, the library 320 can be updated to present the respective subcomponents of the turbine chiller 109C, and the respective models 160A-n and nodes 165A-n that are associated with a given subcomponent.

As shown in FIG. 3B, the model representation 159 on screen 119B can be configured by configuration component 131 and AI component 132. Further, as previously described, an instruction 130A-n can be received at the modeling component 120, wherein configuration component 131 and AI component 132 can configure one or more models 160A-n and nodes 165A-n. In the example presented in FIG. 3B, an instruction is being applied to a steam operation, and in particular a model 160A representing equipment in process 108 (e.g., a boiler 109B on layout representation 157). As previously mentioned, a variety of mathematical models and suchlike can be utilized, wherein as a function of operation of configuration component 131 and AI component 132, a requirement of instruction 130A-n can be reviewed and based thereon, a repository 380 (e.g., in memory 114) configured to store various supermodels 138A-n, models 160A-n, nodes 165A-n (e.g., any of parametric models, empirical models, cost function analysis methods, backpropagation, solvers, and suchlike) representing the various devices, etc., in process 108 can be reviewed from which one or more supermodels 138A-n, models 160A-n, nodes 165A-n can be selected in an attempt to meet the requirement. As well as the repository 380 being configured to store the various supermodels 138A-n, models 160A-n, nodes 165A-n, the repository 380 can also store information pertaining to the various devices and equipment (e.g., any of equipment 109A-n, devices 170A-n, PLCs 254A-n, etc.), such as features, behaviors, classes, etc., as utilized in data analysis such as object orientated-based analysis (as further described), wherein the repository 380 can function as an object-orientated database (OOD). The repository 380 can be included in memory 114, e.g., as part of the historical data 136, or one or more entries in the repository 380 can be stored elsewhere, e.g., at any device in levels 244, 247, 250, 253, 256, and suchlike. Accordingly, the configuration component 131 can automatically implement the mathematical model selected by the AI component 132 at model 160A, wherein, the success of the selected model in meeting the instruction 130A-n can be assessed. In another embodiment, the screen 119 can be a touch screen, and a user (e.g., a mathematical modeling expert) can select (via dragging in a plug and play manner on the touch screen) a mathematical model that they wish to implement as model 160A.

Furthering the example, the user can apply an instruction 130C to a PLC 254C, wherein the instruction 130C relates to processing of data 179 received from a IFLD 170C. The on-board intelligence at PLC 254C can respond to the instruction 130C by generating a further instruction 130D that is applied to the IFLD 170C, wherein the on-board logic of IFLD 170C can be configured to determine collection and/or processing of data 179 to satisfy the requirement or PLC 254C and the instructions 130C and 130D. Application of the instruction 130D on the IFLD 170C can result in a model (e.g., model 160C) representing operation of the IFLD 170C, or equipment associated therewith, being re-configured in accordance with IFLD 170C responding to/meeting the requirement in instruction 130D. An indication can be presented on the screen 119 that model 160C has undergone re-configuration (e.g., the model or the associated icon changes color), whereby, the user can select model 160C and further zoom into the model 160C to reveal/determine which parameters, variables, inputs, outputs, predicted measurements (e.g., flow rates, energy output, energy input), etc., associated with IFLD 170C have changed and their effect upon the model 160C representing IFLD 170C and also other models 160A-n affected by the reconfiguration of model 160C. The parameters, etc., can be presented on screen as a dialog box 390, wherein the information can be as complex or as sparse as required to enable interaction with the representations 157 and 159. For example, information provided in a dialog box 390 to a modeling expert adjusting the model(s) can be of a different nature/content to information provided to a process engineer adjusting operation to meet a requirement to reduce scrap levels. As shown in FIG. 3A, layout representation 157, selection of a device, equipment, etc., (e.g., via selecting an icon 158A-n) can cause a dialog box 390 to be presented, wherein the dialog box 390 can provide details of, in a non-limiting list, parameter values, measurements, settings, a requirement is being met, etc. As shown in FIG. 3B, model representation 159, selection of a model 160A-n, a node 165A-n device, equipment, etc., (e.g., via selecting the respective model/node on the screen 119A-n) can cause a dialog box 390 to be presented, wherein the dialog box 390 can provide details of, in a non-limiting list, parameter values, measurements, settings, a requirement is being met, a value being output from a model, a value being input to a model, node values, etc. In another embodiment, the respective parameter values, etc., presented in dialog boxes 390 can be continually presented/updated on the screen 119A-n to enable expedited interaction with the graphical representations 157 and 159, the devices, supermodels, models, nodes, etc., regarding operation of the process 108. Hence, a user can readily view and interact with operation of the process 108 presented in a graphical representation 157/159.

In another embodiment, a user can also utilize the dialog boxes 390 to interact with the respective graphical representations 157/159, e.g., to adjust a device setting, adjust a device configuration, change a parameter range, change parameters of interest, adjust an objective, and suchlike. Hence, while a model 160A-n and/or node 165A-n, can be configured offline and subsequently added to a supermodel (e.g., in the plug and play approach), the respective model and/or node can be adjusted (e.g., as further described in FIG. 5) and added to a real-time implementation.

Further, at any level of interaction with the representations 157 and 159, e.g., at a high level presenting a layout of the devices and/or models, or zoomed in to the granular level of representation, data can be extracted for further review. For example, a user has zoomed into the model representation 159 with various parameters, interactions, data, etc., revealed. The user can select the information (e.g., as a snapshot) which can be extracted/saved, e.g., by configuration component 131 in memory 114, wherein selection can be by the user selecting the information on the screen, using a mouse/cursor, selecting via one or more dialog boxes 390A-n, and suchlike.

Hence, it is possible for a user to zoom into the representation of process 108 enabling presentment at a highly granular level, e.g., raw data being (e.g., an output signal) obtained by any of the IFLDs 170A-n, and accordingly, a high level of equipment monitoring/control can be achieved in process 108 that is not possible in a conventional system where a sensor is simply transmitting every measurement.

During interaction with a representation (e.g., either of representations 157 and 159), the modeling component 120 can review the connections (e.g., connectors 168A-n) implemented to incorporate a first model 160A-n or node 165A-n in the representation and determine any new connections required to incorporate a second model 160A-n or node 165A-n into the representation, wherein the interaction can be user interaction and/or interaction resulting from the configuration component 131 automatically implementing a model 160A-n or node 165A-n into the representation, e.g., as function of meeting a requirement in an instruction 130A-n.

Returning to FIG. 2, various concepts are further expanded regarding the various levels, devices, functions, etc. As mentioned, the various embodiments presented herein can leverage enhanced capabilities of devices across and between the various layers, where such capabilities include, in a non-limiting list, auto-configuration, self-monitoring, reporting, prognostics, diagnostics, data transfer, inter-device communications, and cooperation among respective devices to maximize operational efficiency, etc., of process 108, e.g., by aggregating data with minimal to zero loss of relevant data. The various level components 144, 147, 150, 153, and 156 can have functionality that pertains to requirements, operations, etc., specific to equipment or systems associated with the respective level of operation as identified in FIG. 2. For example, field-level component 156 can be concerned with operations pertaining to IFLDs 170A-n while component 150 can be concerned with operations pertaining to SCADA systems 251. Hence, as automation and system knowledge further evolves regarding operation of process 108, the respective level components can be updated to capture the evolving nature of process monitoring and control. Thus, when a new approach to data processing/analysis is released to the marketplace, the respective level components can be updated to operate in accordance with the constructs of the new approach such that the level components 144, 147, 150, 153, and 156 are knowledgeable of the new approach and can interact with any new devices/configurations incorporated into process 108.

Field Level Component 156 and Tier 256

As mentioned, the various embodiments presented herein can leverage the field-level component 156 and enhanced capabilities of devices at the field level, e.g., IFLDs 170A-n at field level 256, e.g., auto-configuration, self-monitoring, cooperation among respective IFLDs 170A-n, etc., for example, to aggregate data with minimal to zero loss of data for subsequent processing/analysis. Configuration of IFLDs 170A-n in such a manner renders conventional communication of raw sensor data unnecessary. For example, where IFLD 170P is a pressure sensor, a conventional pressure sensor would output most if not all raw pressure data via an input/output (I/O) interface to a PLC 254A-n for processing of the data. Such conventional architecture can consume large volumes of network bandwidth, memory, and processing resources in order to glean small amounts of meaningful and relevant information when compared to the vast corpus of data collected and processed. Utilizing IFLD 170P with built-in processing capabilities (e.g., comparable to and/or available with AI component 132), IFLD 170P can be configured to (a) process its own raw pressure data with respect to baseline measurements, (b) determine and output deviations from the baseline or other events, (c) utilize sensor-level algorithms that can identify and report faults or events (e.g., IFLDs 170A-n can self-diagnose), and suchlike. Hence, utilizing IFLDs 170A-n can alleviate system-level resource allocation issues which enables creation of an enterprise system 105 having an operational efficiency far exceeding that obtainable from a conventional enterprise system utilizing conventional sensors, aka "dumb sensors". As the complexity of the enterprise process 108 increases with an associated increase in the number of IFLDs 170A-n running into the tens, hundreds, thousands, or higher, the operational gains achievable by utilizing enterprise system 105 in conjunction with IFLDs 170A-n can achieve system level optimization that is overly complex, if not unachievable, for a conventional system regarding consumption, processing, and transmission/receival of raw data.

Further, the IFLDs 170A-n can be self- and context-aware, e.g., as enabled by incorporation of AI systems and processes on-board the IFLDs 170A-n. Accordingly, system optimization at sensor-level, sensor-combination-level, system-level, etc., can leverage self- and context-awareness to make, for example, highly accurate probabilistic-based inferences and perform utility-based analysis (e.g., factoring cost of making an incorrect decision relative to benefit of making a correct decision) in connection with performing automated action at most any level within a framework of process 108. Utilizing IFLDs 170A-n in conjunction with various components in enterprise system 105 enables highly efficient organization and movement of data throughout the system as well as greater transparency into factory operations since the data transmitted from IFLDs 170A-n can be contextualized, which enables incorporation of domain expertise (e.g., available from a user or as acquired/programmed into AI component 132) relative to data sets in order to enable translation of data to meaningful information that can be acted on in a deliberate manner. Accordingly, the various embodiments presented herein enable a holistic approach to operations across process 108 and automatically (e.g., via the onboard logic of the IFLDs 170A-n) converts captured data (e.g., equipment output signals) having minimal context into relevant actionable information across the process 108 with scalable transparency at every level, as presented in FIG. 2.

In a further embodiment, the configuration component 131 can monitor operation of the process 108 and operation of the devices included in the process 108. The configuration component 131 (e.g., in conjunction with the artificial intelligence component 132, the field-level component 156, the historian component 134, etc.) can identify a first configuration 176A applied to a device (e.g., to an IFLD 170A-n), determine an adjustment to the device to improve operation of the device, meet an objective of the process, etc., and based thereon, generate a second configuration 176B to be applied to a device. The configuration component 131 can transmit an instruction 130A-n to the device, wherein the instruction 130A-n includes a requirement for the device to implement the second configuration 176B at the device. The on-board intelligence of the device (e.g., at IFLD 170A) can be configured to parse the instruction 130A-n, identify the second configuration 176B, and automatically reconfigure (auto-configure) itself by replacing a current configuration of operation (e.g., the first configuration 176A) with the configuration (e.g., the second configuration 176B) received in the instruction 130A-n. In another embodiment, the configuration component 131 can transmit an instruction 130A-n comprising sufficient information that while the instruction 130A-n does not include a specifically defined configuration, the information is sufficient to enable the device (e.g., IFLD 170B) to utilize on-board intelligence (e.g., in memory 174) to determine a configuration to satisfy the information.

Control Level Component 153 and Tier 253

With further reference to FIG. 2, control level devices (e.g., PLCS 254A-n) at the control level 253 and control level component 153 can have analytical and process logic capabilities incorporated therein enabling analysis of data generated by IFLDs 170A-n to identify sensor information, and processing thereof, to benefit operation of the lower-level operations. AI systems and processes can be incorporated at the control level (e.g., in PLCS 254A-n) to detect production anomalies, generate operating condition alerts, recommend alternative configurations, etc., wherein such on-board logic can replace the expertise that traditionally required interaction with a domain expert. A conventional monitoring and control system typically requires an individual (e.g., process engineer) with extensive knowledge and expertise regarding a domain (e.g., a manufacturing process) to build a process model utilizing data available from a PLC. However, per the various embodiments presented herein, the respective sub-models (e.g., models 160A-n) can be utilized (e.g., by configuration component 131, AI component 132 at PLCS 254A-n) to automate construction of the models 160A-n and, accordingly, super-models 138A-n having an aggregation of models 160A-n.

Figure 4:
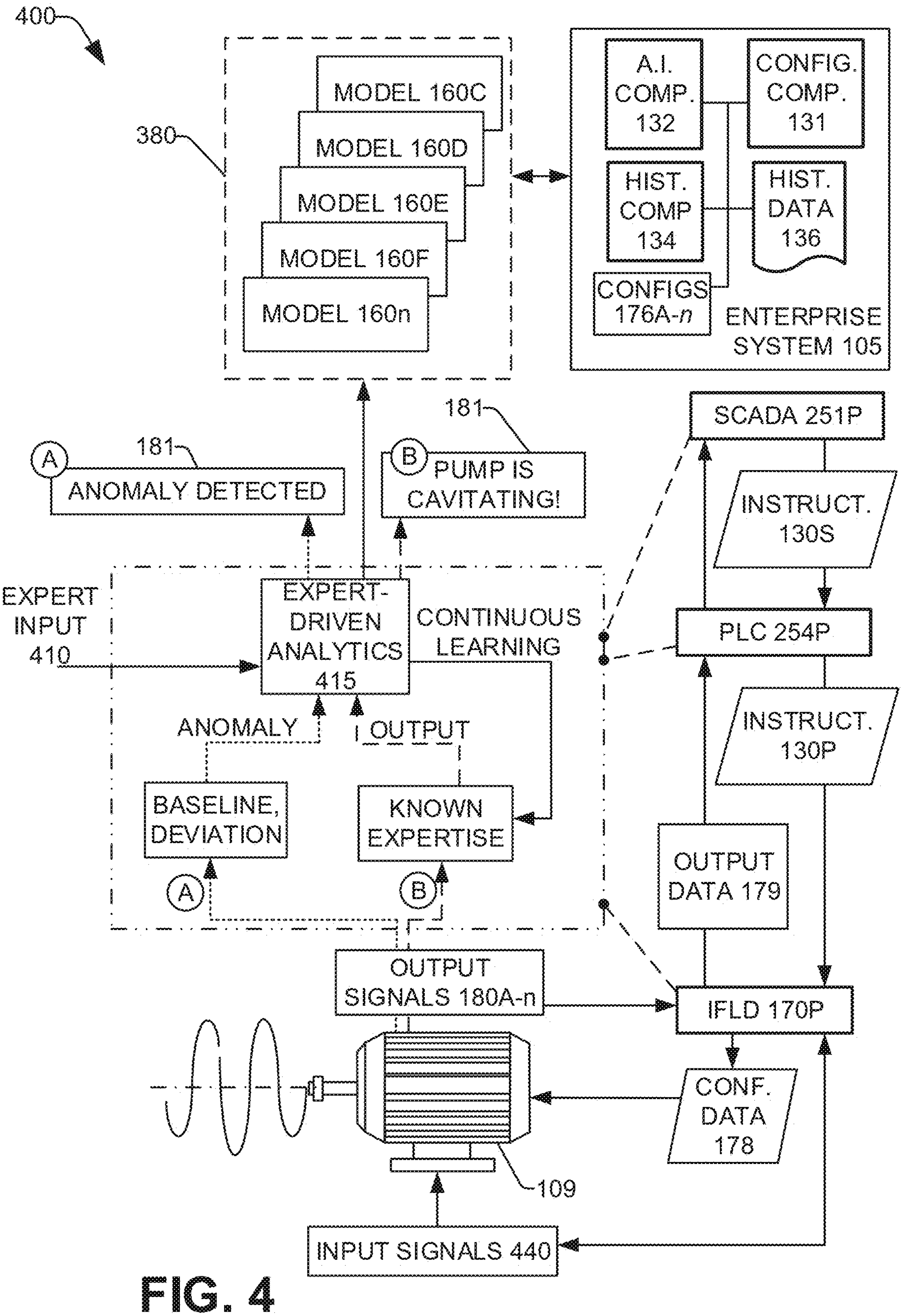
FIG. 4 illustrates various monitoring and control activities being performed regarding operation of equipment in a process, according to one or more embodiments.

Intelligent configuration of the IFLDs 170A-n at the field level 256 can enhance operations performed at higher levels, e.g., the control level 253, the supervisory level 250, and suchlike. Turning to FIG. 4, system 400 illustrates various monitoring and control activities being performed regarding operation of equipment in a process, according to one or more embodiments. System 400 comprises an ILFD 170P coupled to a pump 109P, wherein the IFLD 170P can monitor operation of the pump 109P and the various signals (input signals 440 generated by the IFLD 170P or by other systems, output signals 180 generated by equipment and converted to output data 179 by IFLD 170P) relating to operation of the pump 109P. The IFLD 170P is further connected to a control level device PLC 254P, and a supervisory level component SCADA 251P. As previously mentioned, respective devices across the process 108 can each have on-board intelligence (e.g., a CPU, memory, computer-executable algorithms, etc.) incorporated therein enabling data processing and decision-making (e.g., AI-driven) to be conducted across the entire process 108, with a plethora of operations being respectively performed at any of the IFLD 170P, PLC 254P, and/or SCADA 251P. As illustrated in FIG. 4, the on-board intelligence can include expert-driven analytics wherein, in an embodiment, the on-board intelligence (e.g., pre-programmed, AI-derived, historian derived, and suchlike) can be supplemented by expert input 410 from a user (or remote system 199), as well as continuous learning also being conducted by the respective device IFLD 170P, PLC 254P, and/or SCADA 251P. Further, in the event that a first device makes a determination that pertains to operation of a second device, the first device can forward that determination to the second device. For example, IFLD 170P and PLC 254P are monitoring of the pump 109P, with operational data being shared by the IFLD 170P and PLC 254P. During processing of the operational data, PLC 254P makes a determination that IFLD 170P could improve monitoring and/or control of the pump 109P by implementing a new operating configuration 176C, wherein the IFLD 170P implements the new configuration 176C defined by PLC 254P. e.g., in instruction 130P.

In an embodiment, the plethora of operations can pertain to anomaly detection (indicated by flow A in FIG. 4) in a process 108. Accordingly, to improve the anomaly detection operation(s), the PLC 254P can be self-aware regarding the information PLC 254P requires from the IFLD 170P to perform detection of an anomaly. As part of the analysis performed by the PLC 254P, the PLC 254P determines that output data 179 from IFLD 170P is in a first format, comprises data with a particular sample rate, etc. However, for the anomaly detection to occur, the PLC 254P requires the data to be in a second format, expresses deviation from a desired value, etc. The PLC 254P can generate and transmit an instruction 130P to IFLD 170P, wherein the instruction 130P includes a requirement for IFLD 170P to obtain and transmit output data 179 in accordance with the second format. IFLD 170P can receive and process the instruction 130P, and based thereon, IFLD 170P can auto-configure itself (e.g., with a configuration 176F) to collect and process output signals 180 to form output data 179, and transmit the output data 179 to the PLC 254P in accordance with the instruction 130P. Further, the SCADA 251P can send an instruction 130S to PLC 254P regarding information that SCADA 251P requires to perform any anomaly-related detection operations, wherein the PLC 254P can generate the instruction 130P to satisfy a requirement(s) in instruction 130S and process analysis of SCADA 251P. As shown schematically, any anomaly in baseline deviation can be detected (e.g., by expert-driven analytics 415 (e.g., by user input 410, AI component 132 learning from user input 410, and suchlike, operating at any of IFLD 170P, PLC 254P, and/or SCADA 251P), and based thereon, a notification 181 can be raised indicating an anomaly is occurring. Further, once an anomaly has been detected, the various on-board logic operating across the various devices and systems (e.g., IFLD 170P, PLC 254P, and/or SCADA 251P) can be utilized to respond and address the anomaly (e.g., generate new operation configurations 176A-n to mitigate the effects of the anomaly until the cause of the anomaly can be addressed at the pump 109P). For example, where the anomaly relates to a hazardous condition causing the enterprise system 105 to take remedial action (e.g., via any of IFLD 170P, PLC 254P, and/or SCADA 251P) to remove and/or address the hazardous condition for safety purposes, even though removing and/or addressing the anomaly may be performed at the expense of the efficiency of process 108.

In a similar example (as indicated by B in FIG. 4), respective knowledge at any of IFLD 170P, SCADA 251P, and/or PLC 254P, can be utilized to determine an operating condition (e.g., normal operation, fault detection, and suchlike) of the pump 109P, wherein the signals 180 can be analyzed and an operating condition, e.g., pump is cavitating, can be determined and a notification 181 can be generated. As shown, the respective on-board intelligence can be continually updating in a self-learning manner (e.g., via AI component 132, historical data 136, knowledge locally stored at any of IFLD 170P. SCADA 251P, and/or PLC 254P) as well as information being be provided from an external expert (e.g., a process engineer).

In another example, operational data can be improved by generating a "virtual sensor" at the control level 253, wherein the virtual sensor can be configured to generate a value for a parameter, where the parameter is currently not being measured but the parameter value can be derived from one or more parameters that are currently being measured. To improve the overall monitoring/process control of the process 108, on-board AI at the PLC 254P determines that a parameter needs to be measured, and while it is not possible to measure the parameter in real-time, process analytics performed by AI operations at the PLC 254P can determine that output data 179 generated by an IFLD 170P meeting a particular specification (e.g., having a particular format, sample rate, deviation value, etc.) can enable AI operations at PLC 254P to generate an "virtual sensor" that can function as if an actual sensor existed. For example, it is determined that the moisture content of an item at the time of delivery to a customer is critical for successful subsequent application of the item. At the time of manufacture of the item, it is impossible to directly measure what the moisture content of the item will be at the time of delivery (e.g., 3 weeks later). However, predictive analysis indicates that if the item is manufactured under conditions X, Y, and Z, and has properties M and N at the time of manufacture, then there is an acceptable level of probability that the item will have the required moisture at the later time of delivery. Accordingly, the PLC 254P can generate and transmit an instruction 130P to IFLD 170P, wherein the instruction 130P includes a requirement for IFLD 170P to obtain and transmit output signals 180 in accordance with a particular format to enable PLC 254P to create the virtual sensor (e.g., output data 179 from IFLD 170P become inputs in a model 160A-n at PLC 254P mapping the virtual sensor). IFLD 170P can receive and process the instruction 130P, and based thereon, IFLD 170P can auto-configure itself (e.g., with a configuration 176N) to collect, process, and transmit the output data 179 to the PLC 254P in accordance with the instruction 130P.

As further shown in FIG. 4, knowledge gained, e.g., during the various operations presented in FIG. 4, can be utilized to update and/or reconfigure already existing models as well as create new models. As mentioned, knowledge regarding operation of the process, modeling the process, and suchlike, is generated, for example, based upon analysis of signals generated during operation of the pump 109P, data generated by IFLD 170P, historical data 136, external input(s) (e.g., from a user having expertise regarding the process 108), the known expertise, anomaly detection, fault detection, etc., the derived knowledge can be stored in the enterprise system 105, at a device in process 108 (e.g., the IFLD 170P), and suchlike, wherein the derived knowledge can be reviewed by a component in enterprise system 105, at the IFLD 170P, a PLC 254A-n, and suchlike. In an embodiment, the derived knowledge can be generated by the AI component 132, by the historian component 134, and suchlike, wherein, in an example, the configuration component 131 can generate a new model 160F that can represent a configuration of the pump 109P, wherein the model 160F can be subsequently incorporated into a supermodel (e.g., FIG. 5, supermodel 138A-2) providing a modeling representation of process 108. As shown in FIG. 4, a repository 380 of various models can be generated as models 160A-n are generated, configured, re-configured, and suchlike. In an embodiment, the AI component 132 can monitor how a user (e.g., a modeling expert) interacts with a model and determine what adjustments were made to the model, e.g., in satisfying a requirement, responding to an operation not performing as expected/required, based on identifying a cause for an adjustment to be made, and suchlike. The interactions, initial model state, final model state, etc., can be stored (e.g., in memory 114). Accordingly, over time, the AI component 132 can acquire knowledge of user interaction with supermodels 138A-n, models 160A-n, nodes 165A-n, etc., such that the AI component 132 can replicate/mimic the user interaction, and approach of the user, when making subsequent interactions with supermodels 138A-n, models 160A-n, nodes 165A-n. Further, the AI component 132, upon automatically generating/adjusting any of a supermodel 138A-n, a model 160A-n, a node 165A-n, connecting a first model to a second model (e.g., via an output of the first model to an input of a second model), and suchlike, the AI component 132 can instruct a device associated with the model to transmit configuration information, operating condition information, real-time data recorded/captured by the model, etc., to the AI component 132, enabling the AI component 132 to review operation of the device with the new model applied thereto, to confirm the device is operating as expected. In response to the device not being deemed to be operating as required, the AI component 132 can further adjust the model 160A-n, adjust configuration of the device, and suchlike, until the device and model are operating as required. Hence, if operation of a device strays from an expected operation, e.g., a baseline operation, (either by manual adjustment of the device, setting/process creep, etc.) the AI component 132 and the device can be in continual communication to ensure correct operation of the device.

In the examples regarding anomaly detection, operating condition determination (e.g., fault detection), and a virtual sensor, in an embodiment, the instruction 130P can include sufficient information such that the IFLD 170P can auto-configure itself in accordance with the information in the instruction 130P. For example, PLC 254P may have sufficient knowledge regarding the technical specifications of IFLD 170P such that the PLC 254P can compile and transmit an instruction 130P comprising information regarding how IFLD 170P is to auto-configure itself as necessary to enable the PLC 254P to perform the anomaly detection, virtual sensing, etc. In another embodiment, the instruction 130P may only include information regarding how the output data 179 is to be formatted, its content, etc., and based thereon, the on-board logic on IFLD 170P determines a configuration needed to be applied to itself as it performs an auto-configure operation. Accordingly, per the foregoing, the IFLD 170P has sufficient on-board logic to enable a requirement from a higher-level device to be applied to the IFLD 170P enabling auto-configuration of the IFLD 170P to be performed. While the foregoing has been limited to examples regarding auto-configuration of an IFLD 170P to enable anomaly detection, fault detection, and virtual sensing, the embodiments presented herein are not so limited and can be applied to any application requiring intelligent operation of devices and systems at any of the levels 244, 247, 250, 253, and/or 256, and also any of the level components 144, 147, 150, 153, and 156.

In an embodiment, a PLC 254A-n can be configured to model operation of process 108, or equipment included therein, to achieve a particular target variable (e.g., in response to a requirement in an instruction 130A-n). A PLC 254A-n can include sufficient on-board AI to enable construction of numerous lower level/sub-models (e.g., models 160A-n pertaining to IFLDs 170A-n) and aggregate such sub-models into higher order models, e.g., models 160A compiled at the controller level 253. The on-board AI and/or the control level component 153 can have sufficient on-board logic to modify behavior of a PLC 254A-n to enable improved controller level operation as well as optimize streaming workflow of operation data throughout the process 108, devices included therein, and subsequent monitoring and/or control of process 108.

While the foregoing relates to operations occurring at the PLCS 254A-n, the various operations can be performed at any level, e.g., in conjunction and/or by the control level component 153, other control level devices such as PIDs, DCSs, etc., IFLDs 170A-n, and suchlike.

Supervisory Level Component 150 and Tier 250

At the supervisory level 250, the supervisory level component 150, SCADA 251, etc., (e.g., in combination with the configuration component 131) can be configured to monitor operational activity, operational health, and suchlike, of the various devices and components included in the enterprise system 105 and/or communicatively coupled to the enterprise system 105, wherein, in a non-limiting list, the various devices and components can include IFLDs 170A-n, actuators, machines, motors, pumps, controllers, memory components located throughout system 100, e.g., memory 114, the memory components respectively located on IFLDs 170A-n (e.g., a memory 174 on IFLD 170D), any of the devices and systems operating at the respective levels 244, 247, 250, 253, 256, (e.g., data servers) etc. The various embodiments presented herein can expand plant-wide supervisory level functions by leveraging the various supermodels 138A-n, models 160A-n, nodes 165A-n, etc., to respectively monitor and protect equipment and assets via system-level metrics (e.g., at the field-level 256 or above) concerned with such functionality as monitoring, diagnostics, prognostics, root-cause analysis (e.g., failure analysis), and suchlike, of the devices and equipment. Given the inherent transparency enabled by the supermodels 138A-n, models 160A-n, etc., application of predictive "what-if-analysis" can performed across the entire process 108. For example, root-cause analysis conducted at the supervisory level 250 can utilize contextual output data 179 generated by the IFLDs 170A-n, and further, in the event of an anomaly, the onboard logic at the IFLDs 170A-n can make an intelligent response to the anomaly by collecting and processing of data that enables supervisory-level systems 250 to conduct expedited and focused root-cause analysis. For example, with a conventional system, non-contextual data is generated at the field-device level and transmitted to higher-level systems, such as systems operating at the supervisory level. The supervisory level systems have to then apply some sort of context, patterns, etc., to enable the anomaly to be identified, which can be time-consuming with regard to isolating the cause of the anomaly in the plethora of non-contextual data received at the supervisory-level system(s). Per the various embodiments presented herein, the IFLDs 170A-n can, in the response to a potential anomaly being detected, collect, process, format the data that is pertinent to determination (e.g., as required by the supervisory level systems 250, supervisory level component 150, and suchlike) of the anomaly, thereby enabling expedited and focused analysis unavailable with a conventional system.

While the foregoing relates to operations occurring at the supervisory level devices, the various operations can be performed at any level represented on FIG. 2.

Planning Level Component 147/Tier 247 and Management Level Component 144/Tier 244

At the highest levels 244 and 247, the various embodiments presented herein facilitate plant-level planning (e.g., by MES 248, by planning level component 147) and management (e.g., by ERP 245, by management level component 144). In an embodiment, the planning level component 147 and the management level component 144 can operate in conjunction with the AI component 132 to enable an AI driven system-level optimization approach. For example, a high-level requirement in an instruction 130H can be implemented at an ERP 245, wherein the instruction 130H is parsed, and given the inherent transparency of process 108 enabled by the various embodiments presented herein, the onboard AI of ERP 245 can determine various configurations 176A-n to be applied to the various devices, equipment, systems, incorporated into process 108.

Supermodels 138A-n, Models 160A-n, and Nodes 165A-n.

Per various embodiments presented herein, by utilizing intelligent supermodels 138A-n, models 160A-n, and nodes 165A-n, enterprise system 105 can simplify utilization and/or application of the respective supermodels, etc., to utilize respective model outputs and functionalities that are relevant to and/or/satisfy given requirements and configurations, e.g., in instructions 130A-n. Enterprise system 105 can learn the behavior (e.g., via AI component 132) of each supermodel, etc., (and the devices the supermodels 138A-n, models 160A-n, and nodes 165A-n represent), and can implement the respective functionality of each supermodel, etc., in conjunction with the hierarchy of the models and nodes in view of the requirements to generate a holistic supermodel that optimizes the process 108 in accord with the requirements and configurations. In an embodiment, a collection of models 160A-n can be combined to form a supermodel 138A-n, wherein the functionality of the respective models satisfies one or more requirements in the instruction 130A-n, for which the supermodel 138A-n provides a configuration satisfying the totality of requirements in the instruction 130A-n. As previously mentioned, process 108, as created in view of and/or represented by the supermodels 138A-n, is not operationally hindered by the vast amounts of non-contextual data to be processed per a conventional system, wherein the non-contextual data lacks particular context and process/context relevancy. AI component 132 (or an onboard device having comparable functionality) can be utilized to apply various data-mining techniques to the respective supermodels 138A-n, etc., regarding historical data 136 as well as data 179/180 currently being received and processed in real-time. Further, the modeling component 120 can integrate one or more supermodels, models, and nodes, as required to achieve operational efficiency of process 108.

As previously mentioned, the supermodels 138A-n can be generated based upon various instructions 130A-n received at modeling component 120. In an embodiment, an instruction 130A can include a requirement that a currently available node, e.g., node 165A1, can satisfy. In another embodiment, a current configuration of a node can be amended, e.g., node 165A2 is generated based on amendment of the current configuration of node 165A1, to enable the requirement to be met. In a further embodiment, where no currently existing node is configured to meet or approximate to the requirement, accordingly a new node, e.g., node 165A3, can be generated and configured to satisfy the requirement. Each of the nodes, e.g., currently existing, re-configured, new, and suchlike, can be combined to form a model 160A.

The respective models and nodes can be stored at a very granular level in a database (e.g., in memory 114, memory 174, or located at another device operating at any of the levels presented in FIG. 2) such that when an objective of process 108, or of equipment incorporated into process 108 changes, the modeling component 120 (or similar system level device per FIG. 2) can automatically, and accurately identify and implement a model to achieve the new objective(s). Hence, during implementation of a supermodel 138A-n, models and sub-models 160A-n, nodes 165A-n, etc., any appropriate data, configurations, historical information can be retrieved as required to enable reconfiguration of any of the operations, equipment, devices, workflow and the like, as pertain to process 108, in actual, or near to actual, real-time to enable the new objective(s) to be achieved. Accordingly, where a device is operating with a first configuration 176A (as represented by a model 160X and node 165X) and a requirement (e.g., in instruction 130X) is received, the modeling component 120 can review operation of the device and the current configuration 176A. In response to determining that the current configuration does not meet the current requirement, a second configuration 176B can be applied to the device in conjunction with a new model (e.g., model 160Y) and a respective node (e.g., 165Y) that represents the second configuration 176B. The modeling component 120 can incorporate model 160Y and node 160Y into a supermodel 138X representing the operation of the device with the first configuration, wherein, incorporation of the model 160Y and node 160Y causes the supermodel 138X to be updated to supermodel 138Y. Supermodel 138Y can be subsequently presented by the visualization component 166, replacing supermodel 138X on screens 119A-n.

In an embodiment, representation of the process 108 as a supermodel 138A-n, models 160A-n, and nodes 165A-n enables depiction and interaction using object-orientated programming-like behavior. Object-orientated programming (OOP) enables the devices included in process 108 to be represented with regard to their attribute(s), behavior, class, inheritance, etc. The OOP representation enables a component and its features to be represented in such a manner that models 160A-n and nodes 165A-n can be configured and operational at the field-level 256 such that a requirement can be easily and accurately applied to a process as the operational features of a field-level component are readily discoverable/discernible by other components and systems operating at any level 244, 247, 250, 253, and/or 256, in the process 108. Accordingly, during implementation of a requirement on a process 108, one or more devices can be identified (e.g., by configuration component 131, AI component 132, historian component 134) to which the requirement pertains, and further, the various features pertaining to the respective component can be identified and configured as necessary to enable the requirement to be implemented. In an example, a requirement (e.g., in instruction 130E) can include reducing an emission of a currently operational boiler 109B. A node (e.g., node 165E) associated with emission of the boiler 109B can be identified, and the configuration of node 165E is adjusted (e.g., by configuration component 131) to satisfy the requirement. In an embodiment, the various features of the various components 109A-n/devices 170A-n. PLCs 254A-n, etc., operating in process 108 can be defined based upon OOP principles such that when a requirement is generated, the requirement can be parsed to identify what device attributes, behaviors, classes, etc., are included in the requirement. The identified behaviors, etc., can be compared with a library of behaviors, etc., (e.g., as stored in repository 380) previously defined for the respective devices, and those devices having a behavior comparable to the requirement can be identified for subsequent interaction as required for implementation of the requirement.

In an embodiment, a first collection of supermodels 138A-n, models 160A-n, and nodes 165A-n, or portions thereof, can be functional and presented on the HMI 118, screens 119A-n, etc., such that the first collection represents the devices (e.g., via icons 158A-n) and their respective operations during current operation of the process 108. A second collection of supermodels 138A-n, models 160A-n, and nodes 165A-n, or portions thereof, can be presented to enable interaction with the respective devices to enable one or more potential adjustments (e.g., device configurations) to the process 108. Accordingly, the effect(s) of applying a requirement to the process 108 can be identified before the adjustment is applied. Application of the adjustment can be role based, e.g., a process engineer being authorized to adjust one or more aspects of operation of the process 108. As further described (per FIG. 5, system 500), more than one supermodel 138A-n can be concurrently presented to a user (e.g., a process engineer) such that the user can interact with a representation of the process 108 and implement various choices regarding operation of one or more devices in the process to identify the effect of applying a requirement, applying a configuration, etc., on the process, rather than applying the requirement, etc., directly to the process itself.

In a further embodiment, each node 165A-n can be defined with input/output mapping to capture the role of the device being represented by the node 165A-n in the overall system (e.g., in supermodel 138F). A single node 165S can be configured with a common input(s) but can further have multiple output mappings depending upon the focus of the targeted output (e.g., per one or more models 160A-n), and accordingly, a node configuration can appear in more than one model. For example, depending upon the use case, a boiler 109B in process 108 can be modeled for efficiency or for emissions. Accordingly, the boiler 109B efficiency can be represented in a first model 160E relating to plant efficiency, and the boiler 109B emissions can be represented in a second model 160M relating to boiler 109B emissions. Further, both of the models 160E and 160M can be incorporated into a single supermodel 138M, wherein supermodel 138M can be configured to represent a variety of features, concerns, requirements, etc., pertaining to process 108. In another embodiment, respective supermodels may be configured to represented specific features, etc., e.g., a supermodel 138K can be concerned with plant efficiency and includes model 160E while a supermodel 138J can be concerned with plant emissions and includes model 160M. Each node 165A-n and model 160A-n can be configured and combined to convey a logical hierarchy of the various components in process 108, e.g., field level devices, control level devices, etc. For example, a utility system can comprise of a "chiller operation", "steam operation", and "power operation" nodes. Each node 165A-n further relates detailed unit operation, parameter values, features, associated with the various operations.

As previously mentioned, information regarding the nodes 165A-n, model 160A-n, and supermodels 138A-n can be stored (e.g., in memory 114, in memory 174, etc.) to enable management of the nodes, models, and/or supermodels, the respective connections therebetween, and revisions/updates made to the respective nodes, models, and supermodels, e.g., for current or future implementation of the various embodiments presented herein.

In various embodiments, the structure and compositions of the respective supermodels 138A-n, models 160A-n, and nodes 165A-n, can be learned and maintained in an automated manner (e.g., by AI component 132, configuration component 131), which enables for streaming of data (e.g., real time data in output signals 179, in output signals 180) and also agglomeration of historical data (e.g., historical data 136 by historian component 134). The various embodiments enable first principles reasoning (e.g., by an on-board AI component 132, or local to a device, e.g., an IFLD 170A-n), wherein a supermodel 138A-n and its subcomponent models 160A-n can self-monitor their respective operation further enabling the supermodel 138A-n, etc., to determine operation of the process 108 with regard to one or more constraints applied to the process 108, e.g., in instructions 130A-n, the higher order relevancy of the operations, and the possibility of success in satisfying the instructions 130A-n, and suchlike. For example, the higher order relevancy can pertain to an IFLD 170A-n operating/controlling specific equipment in a process 108 to satisfy an operational requirement placed upon the process 108 at a higher level, e.g., at the planning level 247. As previously mentioned, constraints can be a physical limitation of a process operation (e.g., cooling capacity constraints of an energy plant, allowable emission constraints, solidification rates for a diecasting casting alloy over a given dimension, and suchlike), wherein the physical limitation can be expressed in the models 160A-n as a mathematical representation. Further, the constraints can be mathematical constraints (e.g., equality constraints, inequality constraints, and integer constraints) applied to one or more models 160A-n during optimization of a process 108. Accordingly, an instruction 130A-a can include a requirement, wherein the requirement can be converted from an alphanumeric string (e.g., instruction 130S states "limit scrap to X %") into constraints that can be mathematically expressed and applied to any of a supermodel 138A-n, a model 160A-n, a node 165A-n, and suchlike. Hence, by parsing a requirement, and expressing a constraint mathematically, the constraint can be applied to an output of a model 160A-n such that if the output does not satisfy the constraint, the model 160A-n can be reviewed (e.g., where a device in process 108 is operating correctly but a model 160A-n is not expressing the operation correctly), operation of the device can be adjusted/re-configured (e.g., where the model 160A-n is configured correctly, but the device in process 108 is not operating as expected), and suchlike. Hence, by applying constraints to any of a supermodel 138A-n, a model 160A-n, or a node 165A-n, operation of a computer-representation of a process and/or operation of a model in the process can be easily determined/identified (e.g., as a notification 181 on screens 119A-n), and appropriate correcting action taken (e.g., adjust operation of the device, amend a model, etc.).

In an embodiment, the modeling component 120 can automatically optimize a supermodel 138A-n (and the underlying process 108) in an incremental manner as a function of one or more requirements of instructions 130A-n. In a further embodiment, optimizing in such an automated and incremental manner enables many requirements, etc., to be pursued concurrently (e.g., at the IFLDs 170A-n) while the requirements placed upon the overall operation of process 108 and supermodel 138A-n can be pursued in view of any operational constraints limiting operation of any of the equipment included in process 108. Conventional systems often employ reinforcement learning where vast amounts of iterations are performed in a simulated environment to converge on a given optimization. However, a failing with such approach is that the underlying models and sub-models utilized in a conventional system are inaccurate and thus result in configurations that are sub-optimal and require substantial manual intervention in real-word deployment.

In an embodiment, the use of smart IFLDs 170A-n in conjunction with field level models 160A-n and nodes 165A-n enables real-time data to be captured, processed, and reviewed at the lowest level of operation, enabling rapid review of the success or failure of a first configuration of a model, e.g., model 160E to be determined with regard to operation of equipment associated with model 160E and the one or more nodes 165A-n also pertaining to the equipment being modeled/controlled. In the event of the first configuration 176P of the equipment not matching the requirement, a second configuration 176R can be applied to the model 160E (e.g., by modeling component 120, configuration component 131, and suchlike), wherein operation of the associated equipment is adjusted (e.g., by IFLD 170E) in accordance with the configuration 176R. In the event of the second configuration 176R satisfies the requirement, the configuration of model 160E, the input and output settings of the node 165E, and the respective operational settings of the equipment being controlled can be initially saved at the IFLD 170E and further transmitted to any other device, e.g., to the modeling component 120, to another IFLD, to a device operating at a different level, etc. Accordingly, more than one model/configuration can be being applied and reviewed either singly or concurrently, e.g., depending upon the complexity of the configurations 176A-n and the interrelatedness/interdependencies between one or more pieces of equipment in process 108, as well as the interconnectedness of the one or more models 160A-n and/or nodes 165A-n. Hence, application and review of the models 160A-n and IFLDs 170A-n enables OS 110 to leverage real-time data and/or historical data at granular levels to rapidly converge on optimal or near optimal configurations in view of instructions 130A-n applied to process 108. Accordingly, in view of the various embodiments presented herein, OS 110 can granularly optimize the various devices and equipment in process 108 at the field level, and can further, continually optimize operation of process 108 (e.g., via IFLDs 170A) at the field level and/or optimize up through the hierarchy of levels enabling control and monitoring of process 108 to be undertaken throughout a supermodel 138A-n, whereby the optimization can be seen to be working its way through the supermodel 138A-n (e.g., across model representation 159) in a series of wave-like updates, as a series of connected regions of activity, and suchlike. As mentioned, the adjustment of the models 160A-n and nodes 165A-n can occur by interaction with an off-line representation (e.g., a second supermodel, supermodel 138A-2 of FIG. 5) of an online process 108 (as represented by a first supermodel, supermodel 138A-1 of FIG. 5).

In an embodiment, OS 110 can draw upon deeper functionality of models 160A-n as needed given particular context to data, configurations, etc. For example, in response to a failure condition of a device/equipment in process 108, a higher-level system (e.g., at the supervisory level 250) can request any of the IFLD 170A-n, model 160A-n, and/or nodes 165A-n associated with the failed/failing equipment to transmit whatever information that is stored locally, e.g., at IFLD 170A-n, but may not have been previously shared with the higher-level system, to be transmitted to the higher-level system for review by the higher-level system. Such an embodiment enables exposure of a considerable volume of information (e.g., contextual) regarding operation of the equipment, thereby enabling an informed review of operation of the equipment and well-reasoned/focused corrective action to be invoked by the higher-level system. The bottom to top level optimization approach (e.g., from field level 256 through to management level 244) enabled by the various embodiments presented herein, enables granular functionality to be initiated as needed, which conventional systems that employ a top-down approach or raw data approach cannot achieve, e.g., the top-down approach does not have the granular level of knowledge (particularly at the field level 256) while conventional systems transmitting raw, non-contextualized data are too slow and cumbersome to enable effective and meaningful implementations to be implemented at the higher-levels of process 108, particularly in a manner timely to address real-time issues at process 108, e.g., as detected by IFLDs 170A-n, PLCs 254A-n, and suchlike.

Generation, Interaction, and Adjustment of Supermodels, Models, and Nodes

The various supermodels 138A-n, models 160A-n, and nodes 165A-n can be structured/configured to enable a plug and play approach to their respective construction, for example, combining and/or aggregating object-oriented like behavior (as previously described). The enterprise system 105 can be considered to be a macro-optimizer that integrates and optimizes numerous models 160A-n to create a holistic super-system-level optimization, e.g., supermodels 138A-n. The plug and play approach enables communication between respective models 160A-n to cooperate and interact as an aggregated intelligence across a collection of models 160A-n. The nodes 165A-n and the models 160A-n can be considered to be building blocks that can be assembled in a variety of ways (e.g., at any tier level 244, 247, 250, 253, and/or 256) and further customized for specific vertical applications/requirements (e.g., vertically across the various tiers). Depending upon how the respective models 160A-n and nodes 165A-n are deployed between a modeling representation of process 108 (e.g., in supermodel 138A-2 of FIG. 5) and an operation representation of process 108 (e.g., FIG. 5, supermodel 138A-1), distributed and asynchronous validation and/or modification of the deployed model can be achieved.

The nodes 165A-n and models 160A-n can have their own respective hierarchies. For example, two nodes 165M and 165N are associated with a locking mechanism of a die casting machine, wherein node 165M pertains to the duration of die locking and node 165N pertains to the locking force to be applied when the die halves are locked together. Accordingly, node 165M can be higher in the hierarchy than node 165N as without a die locking operation taking place there is no locking force to be applied or for how long. Alternatively, node 165N may be higher in the hierarchy than node 165M such that there is a duration of die locking that enables the die locking pressure to be achieved.

The enterprise system 105 can be configured to optimize a respective configuration of the respective nodes 165A-n to meet a requirement (e.g., in instructions 130A-n) at the tier level (e.g., at respective levels 256, 253, 250, 247, 244) while also being configured to review requirements as they pertain to higher and lower-levels (e.g., upstream and downstream across the enterprise process 108) across the enterprise process 108 to orchestrate optimization of the nodes 165A-n (and the tier level models 160A-n generated therefrom) so as to optimize an overall network of nodes 165A-n across the enterprise process 108 in the respective supermodels 138A-n, e.g., across a manufacturing facility.

As mentioned, the nodes 165A-n can represent parameters, factors, and other variables, that can indicate an output of a first operation (e.g., a model 160A-n representing operation of a pump 109P, a collection of equipment associated with a first portion of process 108, and suchlike), wherein the output values can function as an input into another model 160A-n representing a second operation (e.g., a model 160A-n representing operation of a second pump, a collection of equipment associated with a second portion of process 108, and suchlike). In an embodiment, the respective inputs and outputs can be prioritized regarding optimizing of process 108 such that a feature that is critical to the process is given a higher priority than a feature that has lesser impact on the process 108. Hence, by prioritizing such features, a first model can be selected that better represents the effect of a first feature over a second model that prioritizes a second feature. Further, a model 160A-n can be selected (e.g., by historical component 134 utilizing historical data 136, models 160A-n in repository 380, etc.) that best models a prior operation of process 108, e.g., in accordance with meeting the respective priority of inputs and outputs to optimize current/future operation of process 108.

User selection of any information presented on screens 119A-n and HMI 118 can be via any suitable method, such as interaction via a touch screen, selection via clicking with a mouse/cursor, voice commands, and suchlike, wherein selectable information includes, in a non-limiting list, any representation 157 and/or 159, any content provided in a representation, any model(s) 160A-n, node(s) 165A-n, node parameters (per FIGS. 9A-9C), icons 158A-n, information in repository 380, and suchlike.

Conflict Resolution of Nodes 165A-n and Models 160A-n.

The configuration component 131 can be configured (e.g., have built-in logic) to identify and parse conflicts between various models 160A-n, nodes 165A-n and their associated components. In a further embodiment, the configuration component 131 can further prevent any improper configurations from being created, e.g., wherein a first node 165B is associated with a heating component (e.g., a boiler 109B output) and a second node 165C is associated with a cooling component (e.g., a chiller output). The configuration component 131 can review the respective nodes 165A-n and reject any invalid connections between the nodes, e.g., as represented by connections 168A-n. Alternatively, any positive or acceptable configurations can be accepted by the configuration component 131, e.g., a first node 165M representing a motor can be combined with a second node 165P representing a pump can be combined to create a motor-pump model. Further, detailed review can be performed by the configuration component 131 regarding the model 160A-n generated by the one or more nodes 165A-n. For example, upon reviewing a motor model 160M being generated based upon nodes 165M and 165P in response to an instruction 130A-n, the configuration component 131 can make a determination that the selected motor model 160M is under-sized for the pump represented by node 165P, accordingly there is a conflict regarding the motor being able to operate the pump and the combination of nodes 165M and 165P is rejected. In the event of the rejection of the nodes 165M and 165P, the configuration component 131 can review further nodes to satisfactorily generate the model 160M, e.g., using a different motor, pump, etc.

In another embodiment, the configuration component 131 can be configured to take into account information that limits or enables specific combinations of nodes 165A-n in generating a model 160M. Per an example regarding a warranty, if equipment associated with a first node 165X has a warranty requirement that the equipment can only be integrated (e.g., as represented by a model 160S) with a specific brand(s) of other equipment, the configuration component 131 can be configured to reject any prospective nodes 165A-n that void the warranty and only accept integration with the nodes 165A-n that satisfy the warranty. In another example, the respective energy inputs/outputs can be utilized by the configuration component 131 to enable or reject a potential combination of nodes 165A-n. For example, the energy type (e.g., electricity, fuel, steam, pressure, temperature, flow, and suchlike) associated with inputs and outputs of respective devices and equipment represented by nodes 165A-n can be utilized by the configuration component 131 to combine nodes 165A-n and/or models 160A-n based upon the potential node combinations.

It is to be appreciated that the foregoing are a few of the many examples of criteria which can be utilized by the configuration component 131 to review, accept, and/or reject respective combinations of nodes 165A-n, models 160A-n, and the various devices and equipment represented by the nodes and/or models.

Artificial Intelligence (AI) and AI Component 132

The various embodiments presented herein enable AI-driven optimization of the nodes 165A-n, models 160A-n, and/or supermodels 138A-n, to optimize operation of process 108, wherein the nodes, etc., can be augmented, replaced, etc., based upon one or more operations performed by the AI component 132 or AI operations performed on-board respective devices (e.g., on IFLDs 170A-n), wherein such operations can include mathematical programming, algorithm implementation, application of solvers, incremental optimization, large language models (LLMs), and suchlike. As previously mentioned, AI component 132 can be configured (e.g., in conjunction with historian component 134) to review/mine historical data (e.g., historical data 136) regarding operation of supermodels 138A-n to identify patterns, implementations, etc., of models 160A-n and/or nodes 165A-n to identify potential solutions to address a requirement, etc., in instructions 130A-n. In an embodiment, information generated by the AI component 132 (e.g., in conjunction with configuration component 131) can be utilized as a foundation for a mathematical optimization of the process. For example, as further described (e.g., per FIG. 8B), information included in/represented by a piping and instrumentation diagram drawing can be utilized by the AI component 132 as a foundation/precursor to creation of a supermodel 138A-n, model 160A-n, etc. Hence, an instruction 130A-n can be received that includes a requirement (e.g., minimize energy usage, minimize scrap, etc.), the AI component 132 can utilize prior piping and instrumentation diagrams to assist in construction of the supermodel 138A-n, etc. As further described, per the various embodiments presented herein, knowledge regarding any aspect of the process 108 can be utilized (e.g., by the application of AI and machine learning available with AI component 132 in conjunction with historical and current data) to develop/generate/construct a process 108 in response to/accordance with an instruction 130A-n.

In an embodiment where a model 160A-n pertains to a computer-model representation of equipment in process 108, model validation can be achieved utilizing embedded logic (e.g., at modelling component 120, at configuration component 131, at an IFLD 170A-n) for data filtering and algorithms for parameter identification (e.g., as a closed-form solution in a parametric model) and optimization of properties, e.g., in a deployed parametric hybrid model.

In an embodiment, the respective models 160A-n can be directed towards achieving requirements/goals (e.g., in instructions 130A-n). For example, a first model (e.g., model 160A) can be directed towards achieving a first goal, a second model (e.g., model 160B) can be directed towards achieving a second goal. Hence, any of equipment 109A-n, devices 170A-n, PLCs 254A-n, etc., can be respectively represented by a first model 160A that enables the first goal to be achieved, the same equipment 109A-n, etc., can be concurrently depicted by a second model 160B that can be configured to enable a second goal to be achieved. Hence, the respective models 160A and 160B can function concurrently without conflict. In another embodiment, as described herein, a respective model 160A-n configured to represent and/or control operation of any of equipment 109A-n, devices 170A-n, PLCs 254A-n, etc., can be selected based on the ability for the respective model to most closely satisfy the requirement of instruction 130A-n. Accordingly, AI component 132 is configured with AI and machine learning technology/toolkits that enables a requirement of instruction 130A-n to be classified/captured and one or more models 160A-n to be selected for representing/controlling operation of the associated equipment 109A-n, devices 170A-n, etc., that best satisfy the requirement of instruction 130A-n, e.g., model 160A is selected to represent/control equipment 109A, model 160B is selected to represent/control equipment 109B, etc.

In another embodiment, a collection of solutions (e.g., different models 160A-n) can be utilized and reviewed prior to implementation, such that the respective solutions can be assigned respective quality measures indicating the respective performance of each of the solutions. In an example scenario, a first model, model 160E, meets an objective (e.g., as applied in instruction 130E) but implementation of model 160E has the possibility of deleteriously affecting another segment of process 108, while a second model, model 160F, is determined to only satisfy 90% of the objective, but implementation of model 160F does not affect the performance of any other part of process 108. Any suitable metric can be utilized to determine an effect of implementing a particular model and/or configuration upon satisfying a requirement/objective, as well as the degree of effect on the process performance.

In another embodiment, AI component 132 can implement cost function analysis to determine a cost of implementation of an instruction 130A-n on the process 108 via a supermodel 138A-n constructed to achieve the implementation. The AI component 132 can be configured to review prior operations (e.g., patterns of operation in historical data 136) to identify a configuration (e.g., of nodes 165A-n, models 160A-n) to minimize a targeted cost function associated with the instruction 130A-n (e.g., through the application of such analysis as regression cost function, binary classification cost functions, multi-class classification cost functions, and suchlike), wherein the AI component 132 can be configured to minimize the loss function at a particular device/specific training data in process 108, or the cost function across a group of devices/process-wide dataset(s) in the process 108.

Per the various embodiments presented herein, application of AI with the operational intelligence (e.g., upstream and downstream knowledge across a process) engendered with enterprise system 105, enables solutions to operational problems (e.g., mixed integer non-linear programming (MINLP) problems and applications) to be achieved in a manner that is less computationally expensive than encountered while attempting to improve operation of a conventional process. In an embodiment, the AI component 132 can be configured to identify an initial feasible solution (e.g., when representing process 108 as a mathematical problem) and subsequently adjust various variables (e.g., various operational states of one or more devices, components, etc., included in process 108) as represented by nodes 165A-n and models 160A-n to iteratively find a solution (e.g., move the decisions variables to a computationally lower cost solution) to the instruction 130A-n.

In an embodiment, AI component 132 can employ a data-driven digital twin representation of the process 108 (per FIG. 5) to ensure a robustness and optimization of changes/moves in device configurations, structure of supermodels 138A-n, etc. In an embodiment, the AI component 132 can be configured to examine the robustness of the optimal moves against potential disturbances, model inaccuracies, etc. Robust optimization across a conventional system (e.g., not comprising smart device IFLDs 170A-n) can be computationally expensive. In an embodiment, the AI component 132 can be configured to superimpose a robustness impact of optimal moves onto a graphical representation (e.g., a supermodel in supermodels 138A-n) of the process 108 to simplify identification of the potential optimizations (e.g., for viewing on HMI 118 and screen 119 by an engineer or suchlike tasked with improving operation of process 108). In an embodiment, the various changes in device configurations can be compiled and presented in a recommendation for implementation, wherein, in the event of more than one model/configuration being available for implementation, the respective models/configurations can be ranked (e.g., by configuration component 131. AI component 132, and suchlike) according to success in achieving the objective, degree of disturbance to operation of process 108, etc. In another embodiment, the various changes in device configuration can be implemented in real-time and written to the respective device undergoing optimization, whereby, such changes can occur in response to a prior authorization being established, e.g., operation of the IFLDs 170A-n can be adjusted in real-time without human intervention.

As mentioned, numerous interdependencies and independencies can exist between the nodes 165A-n within a particular model 160A-n and/or supermodels 138A-n as well as across combinations of models 160A-n and their respective nodes 165A-n. The AI component 132 can be configured to learn such interdependencies and independencies, and based thereon, can factor changes in the respective interdependencies and independencies as various nodes 165A-n are re-ordered (e.g., in terms of operation in a sequence of node operations) or re-configured (e.g., nodes are re-configured to satisfy a requirement). Accordingly, the AI component 132 can be configured to continuously monitor operation of process 108 in conjunction with supermodels 138A-n, models 160A-n, and nodes 165A-n, to learn from the effects of one or more changes implemented on process 108 (e.g., a configuration change to IFLDs 170A-n) and adapt to any requirements in instructions 130A-n as well as operational conditions of the ever-changing environment encountered in the enterprise process 108.

In an embodiment, enterprise system 105 can genericize learned supermodels 138A-n and/or models 160A-n and combinations of such models such that a generic architecture can initially be deployed for process 108, where, for example, process 108 is being newly-constructed. The generic or base models (e.g., an initial model 160A), e.g., for sensors, actuators, devices, controllers etc., can be configured based on the plant layout, wherein the configuration operation(s) can include the IFLDs 170A-n auto-detecting/determining the plant layout through various self-awareness operations. For example, a first IFLD 170A transmits configuration information pertaining to IFLD 170A to a second IFLD 170B such that IFLD 170B can identify the location, operation, etc., of the IFLD 170A, such that, in the event of IFLD 170B undergoes a configuration change that impacts operation of IFLD 170A, IFLD 170B can establish communication with IFLD 170A to update configuration of IFLD 170A, as needed (e.g., with an updated model 160A or a new model 160B). Hence, as requirements, etc., of the process 105 are implemented/customized (e.g., by operations management of process 105) and as various operational nuances of process 105 are revealed, enterprise system 105 can customize the various supermodels 138A-n, models 160A-n, and/or nodes 165A-n, in conjunction with the devices they represent to enable optimization of the new process 108, as well as the respective devices included in process 108 imparting knowledge across the process 108.

In an embodiment, the AI component 132 can utilize deep learning techniques which can be utilized in conjunction with historical component 134 and historical data 136, wherein the historical data 136 can be a compilation of observations (e.g., over many hours, months, years) regarding operation of a particular device included in process 108 or a part of process 108 that comprises a group of devices operating in consort. The enterprise system 105 can leverage such proprietary AI and extract high-level transforms that simply the respective AI operations given relevance of such device/system to a supermodel representation of the process 108. In other words, AI processes operating at a device/system/level may be too cumbersome given relevance to a higher-order system, and the subject system can simplify (or transform) the proprietary AI with a corresponding model that factors context and relevancy of the particular device/system relative to higher order objectives and configurations, e.g., via constrained learning.

In an embodiment, techniques and algorithms such as backpropagation (e.g., static backpropagation, recurrent backpropagation, gradient computation, chain rule, etc.) can be utilized (e.g., by AI component 132), wherein error determination of the output(s) of a first model 160A and/or a first node 165A can be applied to the input(s) of a second model 160B and/or nodes 165B, with iterations occurring to reduce the subsequent output errors. Backpropagation can minimize the cost function of driving an output to a desired value by adjusting weights and biases of the representation (e.g., across supermodel(s) 138A-n, models 160A-n, nodes 165A-n). In an embodiment, the techniques can utilize real-time/real-world data as captured during operation of process 108. In another embodiment, closed loop analysis can be performed (e.g., by AI component 132) on the supermodels 138A-n, models 160A-n, etc.

Closed-loop techniques can be utilized (e.g., by AI component 132) for concerns such as anomaly detection, resolution automation, requirement processing, requirement compliance, and the like. In an embodiment, historical data 136 can be utilized to train and validate (e.g., via AI component 132 operating in conjunction with historian component 134) a closed-loop based supermodel 138A-n, a model 160A-n, nodes 165A-n, etc. As with all prospective supermodels, models, nodes, etc., the closed-loop based supermodels, etc., can be further trained and validated with real-time operating data 179 obtained from process 108, and once the supermodel has a desired operational state (e.g., ability to meet one or more requirements in instructions 130A-n), the supermodel can be deployed.

Given the IFLDs 170A-n are operating local to equipment included in process 108, AI techniques such as backpropagation, cost function analysis, parametric modeling, and suchlike, can occur virtually instantaneously rather than experiencing process delays inherent in a conventional system where data is captured, transmitted, processed, formatted, etc., remote from the monitoring devices operating locally at the equipment.

Historians 134 and Historical Data 136

As well as making determinations based upon the real-time operation of process 108 and the included components thereof, a historian component 134 can be utilized to review historical operation of process 108 as a function of any supermodels 138A-n, models 160A-n, and nodes 165A-n previously utilized to monitor/control process 108. The previously used supermodels 138A-n, models 160A-n, nodes 165A-n, and data generated during their utilization can be stored as the historical data 136 (e.g., in repository 380).

In an example scenario, if an objective of the operation of process 108 changes (e.g., achieve a casting having a mass of X kilograms (kgs.) in an effort to reduce casting porosity) the historical data 136 can be reviewed to determine what prior operations, if any, previously achieved the objective.

Accordingly, the historian component 134 can be configured to review the historical data 136, and based thereon, identifies a prior operating condition comprising any of injection speed, metal temperature, injection pressure, dwell time, etc., that achieved the required mass. The historian component 134 can compile the respective portion(s) of the supermodel 138A-n, models 160A-n, nodes 165A-n, etc., that was being utilized during the prior operation and, in an embodiment, the historian component 134 can be further configured to identify any differences between the supermodel 138A-n previously utilized and the supermodel 138A-n currently being utilized. Any identified differences, e.g., model 160H and/or node 165H was previously being utilized while model 160P and/or node 165P is currently being utilized, can be reported to the configuration component 131. Furthering the example, the configuration component 131 can be configured to determine whether the currently utilized model 160P and/or node 165P should be replaced with model 160H and/or node 165H. Further, a determination can be made (e.g., by configuration component 131) whether the models and/or nodes can even be interchanged, for example, a component (e.g., a pump) that was utilized during application of model 160H is no longer available, with model 160P being configured for operation with the current pump. The configuration component 131 can review the model 160P to determine whether model 160P can meet the new objective of process 108, wherein, the model 160P can be applied in its current state, model 160P can be amended to meet the objective, a new model 160R can be configured to meet the requirement, a recommendation made that a different IFLD 170A-n (e.g., flow meter) be utilized, a new component (e.g., a different pump) be utilized, and suchlike. Accordingly, per the various examples and embodiments presented herein, respective supermodels 138A-n and models 160A-n can be generated/configured that are responsive to a new objective being applied/about to be applied to the process 108, wherein nodes 165A-n. IFLDs 170A-n, and information generated therefrom, can be utilized to construct the respective supermodels 138A-n and models 160A-n. Hence, by utilizing models 160A-n and nodes 165A-n in conjunction with IFLDs 170A-n, unlike conventional approaches, the field level 256 representation of process 108 can provide an intelligent foundation to the higher levels 253, 250, 247, 244. As shown in foregoing example, application of an objective from a higher level can be readily accommodated/complied with based upon the malleable nature of the IFLDs 170A-n included in field level 256, and the wealth of data (e.g., in output signals 179) that they can provide.

Visual & Graphical Representation of Models, Operating Conditions, and Data

As previously mentioned, any of the supermodels 138A-n, models 160A-n, nodes 165A-n, the devices and/or equipment they represent, instructions 130A-n, any information associated therewith, etc., can be presented on HMI 118 and one or more screens 119A-n, e.g., as layout representation 157, model representation 159, and suchlike. The foregoing can be presented with visualizations that can be zoomed in and out as needed to provide a level of information, operation, context, etc., as required to enable review of the process 108, the supermodels 138A-n, structure of models 160A-n and/or nodes 165A-n, the respective components included across process 108, the effect of implementing a requirement, a device configuration, and suchlike, on the process 108, etc. In an embodiment, the configuration component 131 (e.g., in conjunction with AI component 132, historian component 134, and suchlike) can generate respective structures of various graphical representations (e.g., layout representation 157, model representation 159) and further update the graphical representations in accordance with devices in process 108/models 160A-n being adjusted, removed, replaced, etc., with visualization component 166 being configured to present the respective graphical representations on a screen 119A-n. The visualization component 166 can further respond to user interaction detected/occurring at a screen 119A-n to enable zooming in and out of respective layers of model representations 159, device representations (e.g., a sub-layer to a model representation), tier levels (e.g., levels 244, 247, 250, 253, 256), and suchlike, enabling a user to navigate vertically through a process. The visualization component 166 can be further configured to detect a user interacting with the screen 119A-n, and in response to a user selecting information presented on the screen (e.g., via touch, mouse cursor), the visualization component 166 can be configured to initiate a data extraction/storage operation, wherein the information can be stored (e.g., as historical data 136, as data/information/settings/configurations/etc. in repository 380, for further interaction with by, for example, the modeling component 120, print out, transmission to an external system 199, etc.).

Figure 5:
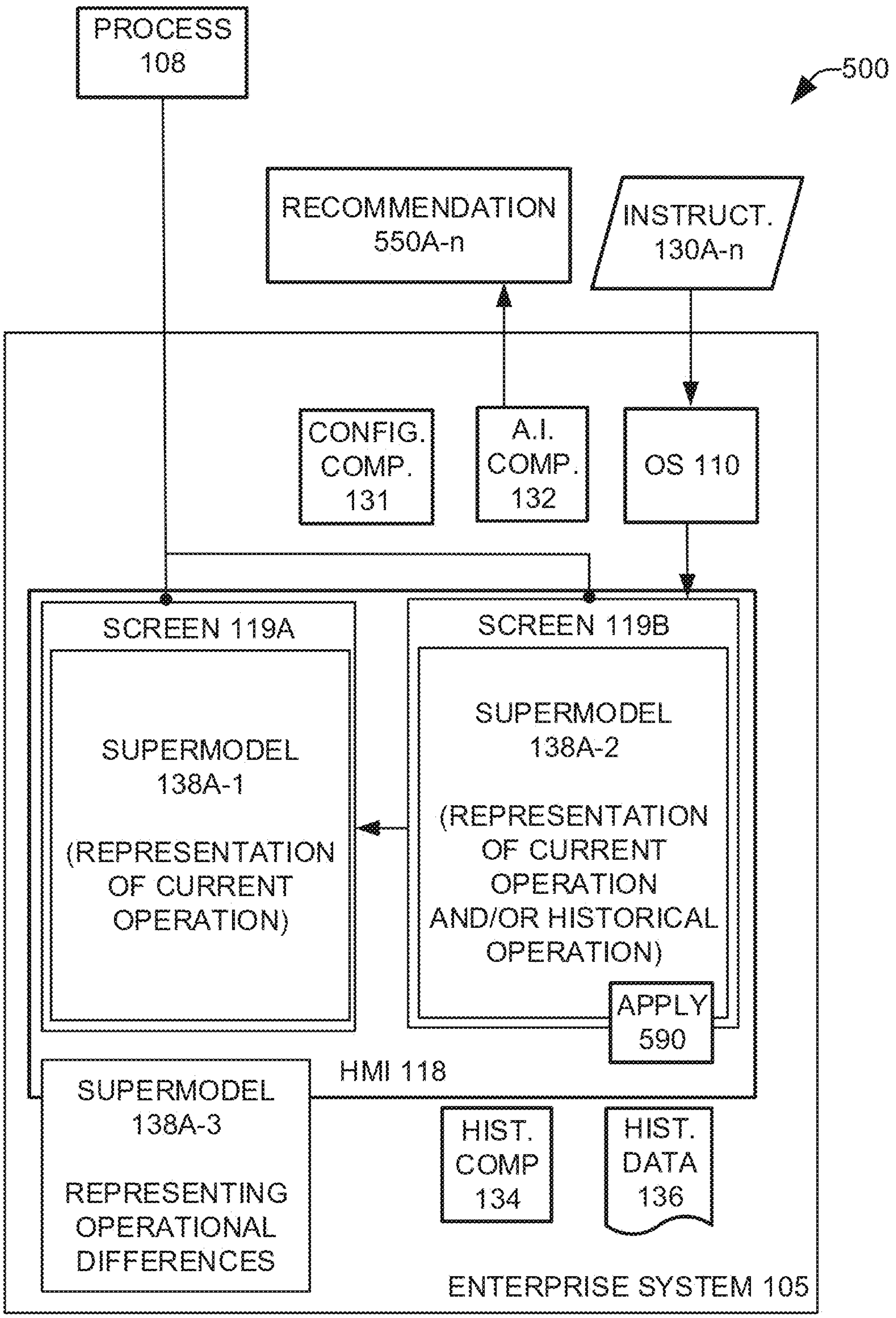
FIG. 5 presents a system illustrating various versions of a supermodel being presented, in accordance with one or more embodiments.

FIG. 5, system 500 illustrates various versions of a supermodel being presented in accordance with one or more embodiments. In an embodiment, a first supermodel 138A-1 (including its constituent models 160A-n and nodes 165A-n, or portions thereof) can be presented on screen 119A of HMI 118, wherein, first supermodel 138A-1 provides an in-operation representation of the real-time operation of process 108. Further, a second supermodel 138A-2 (including its constituent models 160A-n and nodes 165A-n, or portions thereof) can be presented on screen 119B of HMI 118, wherein supermodel 138A-2 provides a modeling representation of process 108 comprising any of a depiction of the real-time operation of process 108, a depiction of the historical operation of process 108 (e.g., as generated from historical data 136), a depiction of effects and configurations in response to an instruction 130A (or altering a node configuration, and suchlike), or a combination of any of the real-time operation of process 108 or a portion thereof, historical operation of process 108 or a portion thereof, and/or representation of the effect of applying an instruction 130A-n. Supermodel 138A-2 as presented in FIG. 5 can be considered an off-line representation, while supermodel 138A-1 can be considered an on-line representation. In another embodiment, a supermodel 138A-3 can be presented indicating differences between the operating conditions and/or configurations of the current process 108 (e.g., supermodel 138A-1) and adjustment of the process (e.g., supermodel 138A-2) as various configurations, requirements, etc., are being applied, e.g., to supermodel 138A-2. As previously described, supermodels 138A-1, 138A-2, and 138A-3 can be presented in both layout representation 157 format and model representation format 159, hence, per the digital twin approach, any of the supermodels can be reviewed and interacted with in terms of what devices and systems are represented in the supermodel and further, how the devices and systems are represented, monitored, and/or controlled with regard to mathematical modeling.

The digital twin approach to representing a process 108 both in current operation and in a representation that enables interaction prior to implementation of changes facilitates application of one or more potential adjustments (e.g., device configurations) to the process 108. Accordingly, by utilizing the dual approach of depicting current real-time operation (supermodel 138A-1) along with a real-time operation/historical operation, the effect(s) of applying a requirement to the process 108 can be identified in supermodel 138A-2 before the adjustment is applied to supermodel 138A-1. Application of an adjustment conducted at the offline representation (per supermodel 138A-2) to the real-time operation of process 108 (per supermodel 138A-1) can be facilitated by a user selecting the apply button 590, wherein, upon selection, a model, configuration, etc., can be applied to real-time operation (e.g., a configuration 176X is applied to an IFLD 170X). As further described, application of the adjustment(s) can be role based, e.g., a process engineer being authorized to adjust one or more aspects of operation of the process 108. Further, as one or more interactions occur (e.g., with supermodel 138A-2), various recommendations 550A-n can be generated (e.g., by AI component 132) and presented to a user (e.g., a process engineer, a modeling expert, and suchlike) for implementation into operation of the supermodel 138A-1. The recommendations 550A-n can be generated in response to the user interacting with the supermodel 138A-2. The recommendations 550A-n can also be generated in response to any interactions with supermodel 138A-2 by the AI component 132, the IFLDs 170A-n, and suchlike, as the various devices and equipment in process 108 auto-configure in response to an instruction 130A-n being applied to the process 108, update in response to newly-received real-time data (e.g., output signals 180, output signals 179, and suchlike).

Figure 6:
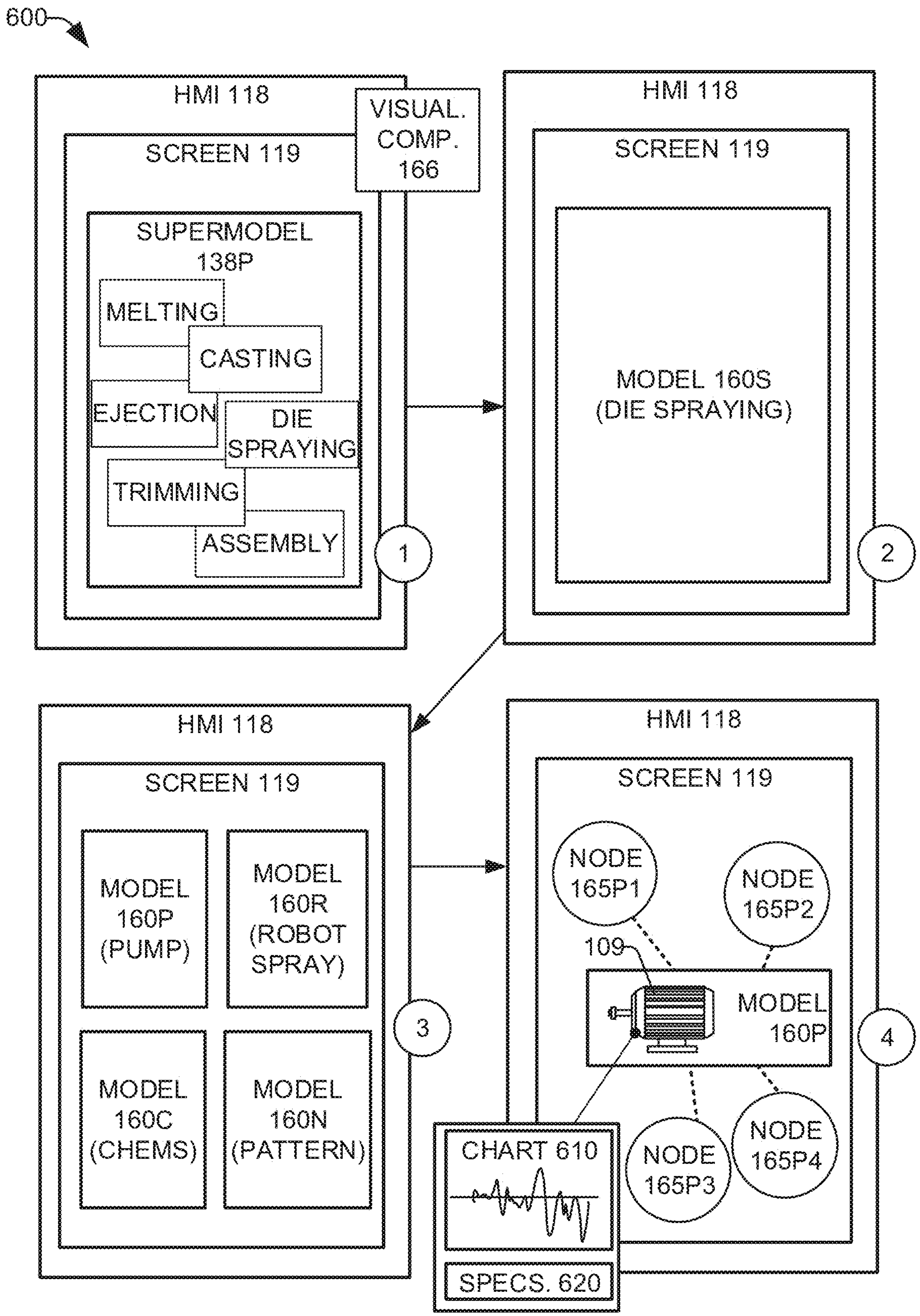
FIG. 6 is a schematic providing a depiction of a zoom operation being conducted on a supermodel, in accordance with one or more embodiments.

Turning to FIG. 6, system 600 provides a depiction of a zoom operation being conducted on a supermodel, in accordance with one or more embodiments. As shown, in FIG. 6, information presented on a screen 119 can be adjusted (here depicted as four different stages (1)-(4)) as graphical representations (e.g., supermodel 138P as a layout representation 157, as model representation 159) of a process 108. For example, the supermodel 138P can be a representation of a die casting process comprising various operations such as ingot melting, casting, ejection, die spraying, casting trimming, and assembly, as depicted in FIG. 600-(1). A user interacting with the HMI 118 and screen 119, can select an operation, and the graphical representation zooms in to a model 160S (e.g., as a model representation 159) representing the die spraying operation, as depicted FIG. 600-(2), wherein model 160S can be a component block comprising a group of components. The user may have a concern with operation of one or more items of equipment included in the die spraying operation depicted in model 160S, where the equipment can include a pump (model 160P), a robot sprayer (model 160R), chemicals (model 160C) such as die release agent, water, and suchlike (model 160C), and a pattern of motion of the die sprayer during spraying of the die (model 160N), as depicted in FIG. 600-(3). As further shown, the user may have a concern with a pump 109P providing the die spray, hence, as depicted in FIG. 600-(4), the user has zoomed in on the pump model 160P, wherein the pump 109P is also depicted with various nodes 165P1-4 related to one or more features of operation of the pump 109P. In response to selecting the pump model 160P, further information can be presented regarding the pump 109P. e.g., operating parameters/functions, data values, a chart 610 presenting a plot of parameter measurements, specifications 620 for the pump, and suchlike. Accordingly, the ability to zoom in and out (e.g., per the various embodiments presented in FIGS. 3A-B, 5, and 6), enables the natural hierarchy of a manufacturing operation (e.g., process 108) to be captured and represented in a meaningful manner regarding high-level overview (per FIG. 600-(1)) to the granular level (per FIG. 600-(4)), as well as measurements, etc., obtained at the granular level.

Regarding chart 610, in an embodiment, any data, e.g., real-time data (e.g., output signals 180, output data 179) currently being obtained as well as historical data 136 can be presented in various charts, plots, etc., to enable visual review of the data, such as pump rate, cooling rate, heating rate, etc. Further, the various charts 610, etc., and the data they present can undergo mathematical review to identify conditions and features of interest in the historical data 136 and the real time data 180/179. For example, a plot of data can be zoomed/scrolled (e.g., by a process engineer) to enable a condition to be identified, and upon selection of the condition (e.g., by selection of a time line segment that includes the condition of interest), further analysis of the condition can be undertaken (e.g., by AI component 132, historian component 134, and the like). In a similar embodiment, review of the charted data can be initiated by one or more components in the modeling component 120 (e.g., by the AI component 132), wherein events and conditions in the data that pertain to a user entry of parameters can be identified by the OS 110, as well as data being presented (e.g., a portion of a historical data chart) that indicates an anomaly operating condition, and suchlike.

Graphical representation of the process 108 (e.g., via layout representation 157) and the underlying, complex model structures (e.g., in model representation 159) can be configured to be highly glanceable and even role-based (e.g., a process engineer working on the factory floor focused on satisfactory operation of the process 108, IFLDs 170A-n, the equipment being monitored, and the like, versus a quality control engineer focused on assessing whether the process 108 is meeting a production requirement in instructions 130A-n, e.g., are maximum scrap levels being achieved, versus a modeling expert interacting with the models 160A-n and nodes 165A-n). The transition from a higher-order representation (e.g., layout representation 157) to a detailed mathematical analysis (e.g., via model representation 159) provides a highly glanceable, deterministic framework for understanding, configuring and modifying a system and sub-system in a rich visual manner that provides easily understandable system behavior to a user. For example, by combining multiple chillers, output of the chiller configuration can be viewed to determine if desired temperature is achieved. Thus, every mapping within the system is a mapping of a physical quantity to another physical quantity in a highly accurate manner, e.g., an output quantity (e.g., node 165J) of a first model (e.g., model 160J) can be represented as an input quantity (e.g., node 165K) of a second model (e.g., model 160K), where, as previously mentioned, the first model and second model can respectively model operation of respective single devices, operation of a collection of devices (e.g., as a component block), and combination thereof.

As mentioned, information presented on the screens 119A-n (e.g., representations 157 and/or 159) can be defined and/or restricted based upon a user role. Examples of role-based use include limiting what information is presented on screens 119A-n and whether that information can be accessed. For example, a user can be a manager-level operator that only has access to a subset of features represented, wherein the manager-level operator is limited to application of one or more instructions 130A-n and determination of whether the instructions can be satisfied and/or their effect on process 108. In another example, a user can be a process engineer, and accordingly is presented with various representations (e.g., layout representations 157) pertaining to operation of respective equipment included in process 108, with their role preventing access to the underlying models 160A-n. In a further example, a user can be a modeling expert and is thus granted access to enable programming of the respective underlying models 160A-n and nodes 165A-n, per model representation 159. Further, the graphical representations (e.g., layout representation 157, model representation 159, supermodels 138A-n, etc.) can be concurrently displayed across a plurality of systems (e.g., concurrently at a management level system 244, a planning level system 247, a supervisory system 250, a control level system 253, and/or a field-level system 256) enabling distributed access to operation/control process 108. Any suitable approach can be utilized to enable updating of information presented on the graphical representations, e.g., while a first user (e.g., a modeling expert) is interacting with a model or node in a model representation 159, the associated model or node in a layout representation 157 is not accessible to a second user (e.g., a process engineer) until the first user has completed their interaction with the model or node.

Further, authorization can be limited to control implementation of one or more configuration amendments, such as a manager-level role can apply instructions 130A-n to a modeling representation (e.g., FIG. 5, supermodel 138A-2) of the process 108, but requires authorization from an engineer-role operator before the respective instructions 130A-n can be applied to an operating representation (e.g., FIG. 5, supermodel 138A-1) of the process 108.

Further, interconnection of models 160A-n and nodes 165A-n can be manually adjusted/configured by a user interacting with the one or more screens 119A-n. Hence, interaction with the screens 119A-n and the information presented thereon, can be controlled such that a first user, e.g., a modeling expert in charge of the models 160A-n, nodes 165A-n, and their interaction, can have levels restricted to modeling of the process but is unable to implement any of their configurations into the real-time operations (e.g., as represented in supermodel 138A-1). While a second user, e.g., a quality control engineer concerned with reducing scrap generated by process 108 has more limited interaction, and as such can enter instructions 130A-n into a paired representation (e.g., FIG. 5, supermodel 138A-2) of a supermodel to assess whether a requirement can be met by the process 108, and if so, how would the various devices represented by models 160A-n and nodes 165A-n would auto-configure themselves to achieve the requirement. In an example, the second user can swap in/out equipment to process 108, e.g., in a plug and play manner.

The various embodiments presented herein enable more than one user/role to easily understand, configure, and optimize the various levels of operation of the process 108 as depicted in supermodels 138A-n. Accordingly, role-based interaction with a supermodel 138A-n enables adjustment, re-configuration, etc., of the devices and equipment included in process 108 to be conducted both from an algorithmic approach (e.g., by a modeling expert, by modeling component 120) as well as via interaction with a graphical representation of the process 108 (e.g., one or more supermodels 138A-n, models 160A-n, nodes 165A-n, historical data 136, output data 179 from IFLDs 170A-n, and suchlike) as presented on HMI 118 and screens 119A-n. The various embodiments presented herein enable optimization of process 108 via the deep learning perspective (e.g., as enabled by modeling component 120, configuration component 131. AI component 132, and suchlike) but also enable abstraction of the various optimizations as an easily understandable graphical representation on HMI 118, etc. As well as being configured based upon user-role, the graphical representation(s) presented on screens 119A-n (e.g., FIG. 5, supermodels 138A-1, 138A-2, 138A-3) can be presented based upon a given user goal, and compressed or expanded as needed to convey the required level of detail of information.

As previously described, the graphical representations presented in FIGS. 3A and 3B can be available in a multitude of formats. In an example embodiment, a supermodel 138A-n can be presented, wherein, at the highest level the supermodel 138A-n can be segmented into various regions of operation, e.g., when depicting a diecasting process, the various regions of operation can include raw materials, ingot processing and melting, die casting machine operations (e.g., electrical, hydraulic, and suchlike), spray system, injection system, die locking system, die fabrication, extraction robot, sprue trimming, etc. At this high level of representation, information can be presented in a fairly low level of detail. However, by zooming in on respective levels, greater levels of specificity and detail of information can be presented, such that at the greatest level of detail respective models 160A-n can be presented in conjunction with nodes 165A-n combined to form the respective models 160A-n. Selection of a node 165A-n can enable presentment of the various requirements that have been applied to the respective node 165A-n, any devices (e.g., IFLDs 170A-n) associated with the respective node 165A-n, any components the node 165A-n and respective devices is monitoring/measuring operation of (e.g., where the component is a pump supplying coolant to a diecasting die), information as to why the respective node 165A-n was configured, why the IFLD 170A-n was selected for the node 165A-n, and suchlike.

Instructions 130A-n, Requirements, Objectives, Etc.

In an embodiment, the various instructions 130A-n can be assigned a priority, such that in the event of attempting to concurrently implement more than one instruction on a supermodel 138A-n/process 108, priority can be given to a first instruction 130B (e.g., a high priority) over a second instruction 130A (e.g., a low priority), wherein the first instruction 130B can be given priority with regard to adjustment of the process 108. In an example implementation, instruction 130B can include a requirement that prevents implementation of instruction 130A, whereby, a notification such as a warning can be generated (e.g., notification 181 on model representation 159) indicating the conflict. In response to reviewing conflict, a further instruction 130C resolving the conflict can be applied or implementation of instruction 130A can be ignored. In a further example, the first instruction 130B can be implemented, with the second instruction 130A being subsequently implemented.

The various embodiments presented herein enable application of respective AI technologies (e.g., model parametrization) to integrate and optimize respective models at the model-level (e.g., any of models 160A-n) and implementation of a combination of models across a single level or across a plurality of levels (e.g., any combination of models implemented at any of levels 244, 247, 250, 253, and/or 256). Accordingly, the various embodiments presented herein enable accommodation of multi-faceted modeling that can be dynamically organized, reorganized, and/or adapted to achieve real-time goals.

Figure 7:
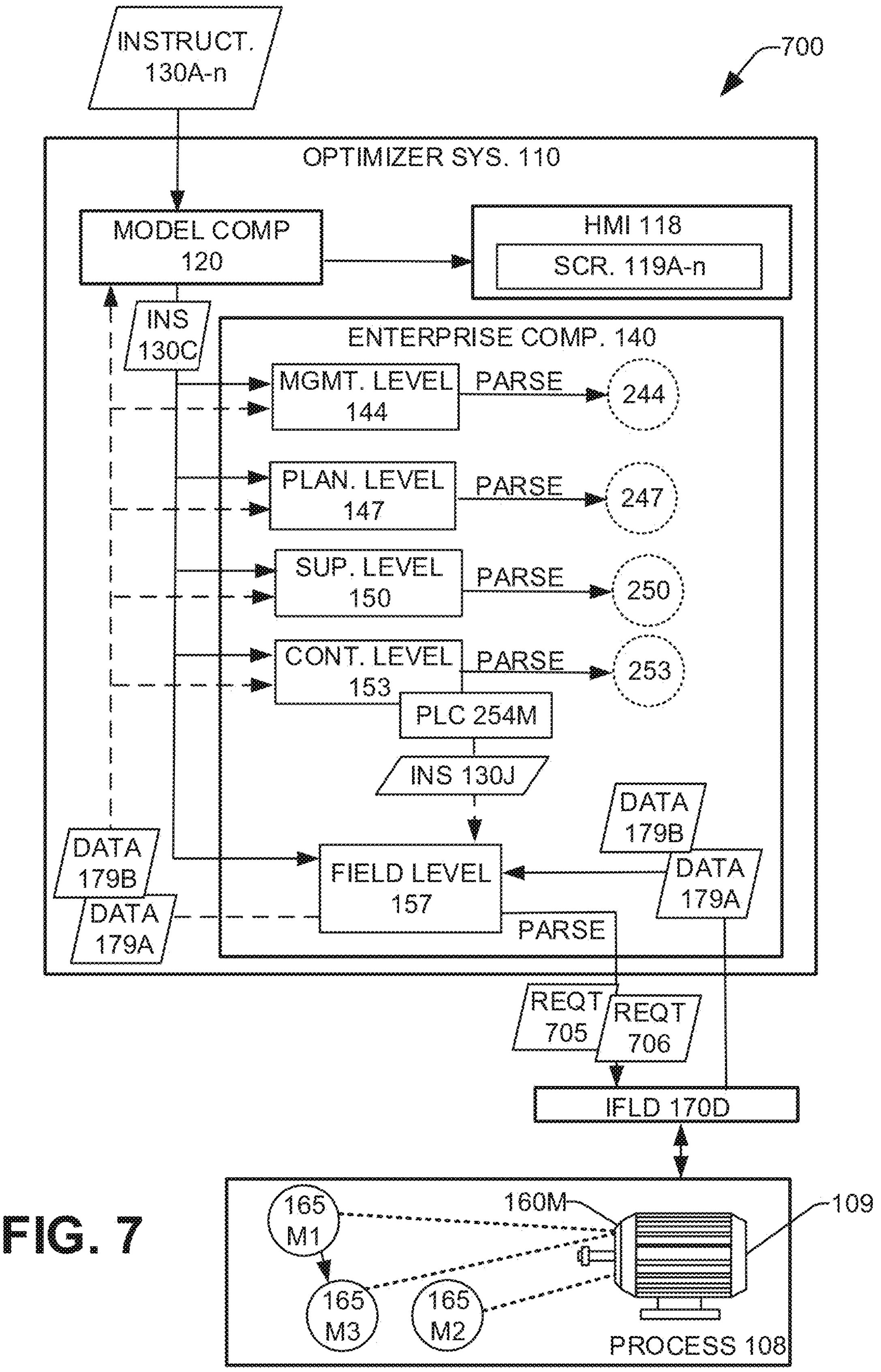
FIG. 7 is a schematic illustrates one or more instructions being parsed for implementation on a system, in accordance with one or more embodiments presented herein.

FIG. 7, system 700, illustrates an example of implementation of one or more embodiments presented herein. As shown, one or more instructions 130A-n can be received at the modeling component 120 at the optimizer system 110. In an embodiment, the one or more instructions 130A-n can be reviewed by the configuration component 131 and subsequently transmitted to any of the respective level components to which the one or more instructions 130A-n pertain. In a further embodiment, the one or more instructions 130A-n can be reviewed/parsed by the configuration component 131 prior to forwarding the instruction to the respective level component, or the entirety of the one or more instructions 130A-n can be forwarded to the level components. In the example scenario presented, an instruction 130C is transmitted from the configuration component 131 to one or more of the management level component 144, the planning level component 147, the supervisory level component 150, the control level component 153, and the field level component 156. Functionality of the various components 144, 147, 150, 153, 157 can be located onboard the optimizer system 110, as well as located at the respective devices and systems operating at the respective levels, e.g., the ERP 245 at the management level 244, the MES 248 at the planning level 247, the SCADA 251 at the supervisory level 250, the PLCs 254A-n at the control level, the IFLDs 170A-n at the field level, and suchlike. As shown in FIG. 7, the instruction 130C can be parsed by any of the configuration component 131 and/or the respective level devices and systems to determine whether the content (e.g., requirements) of the instruction 130C pertains to one or more operations being performed at that particular level. As shown, as a result of the field level component 156 parsing the content of instruction 130C, a requirement 705 is identified that pertains to operation of a pump 109P in the process 108. IFLD 170D is configured to monitor and/or control operation of the pump 109P, wherein, operation of the pump 109P is represented (both graphically and operationally) by model 160M, with nodes 165M1 and 165M2 representing one or more operations, configurations, etc., of the pump 109P and/or the IFLD 170D. Via the model 160M and respective nodes 165M1 and 165M2, one or more elements in the requirement 705 are applied to operation and/or monitoring of the pump 109P. Data 179A is generated (e.g., by IFLD 170D) and transmitted for potential review and/or use by other devices and systems implemented on the optimizer system 110 (and any devices and systems operating at the respective level. e.g., PLCs 254A-n). In an example operation, the data 179A generated by IFLD 170D can be reviewed by a PLC 254M to determine whether the data 179A is of use to PLC 254M, e.g., is data 179A in the correct format for PLC 254M? As previously mentioned. PLCs 254A-n can be smart devices, and accordingly, PLC 254M can make a local determination regarding the suitability of data 179A for one or more operations being performed by PLC 254M. In response to a determination (e.g., by PLC 254M, by control level component 253, a user viewing an output of the supermodel 138M associated with operation of pump 109P, and suchlike) that the data 179A does not match an operational requirement of PLC 254M, PLC 254M can generate a further instruction 130J which places a further requirement 706 on operation of the IFLD 170D. In response to receiving the instruction 130J, the IFLD 170D and/or field level component 156, can update a configuration 176A-n of a node (e.g., node 165M1) pertaining to operation of pump 109P (as represented by model 160M) and such that node 165M3 is generated by the IFLD 170D to monitor and/or control operation of the pump 730 in accordance with the instruction 130J. Subsequent operation results in data 179B being obtained/generated by IFLD 170D. As per the foregoing regarding review of data 179A, data 179B can be reviewed by any devices or systems located across OS 110 and/or process 108.

Figure 8A:
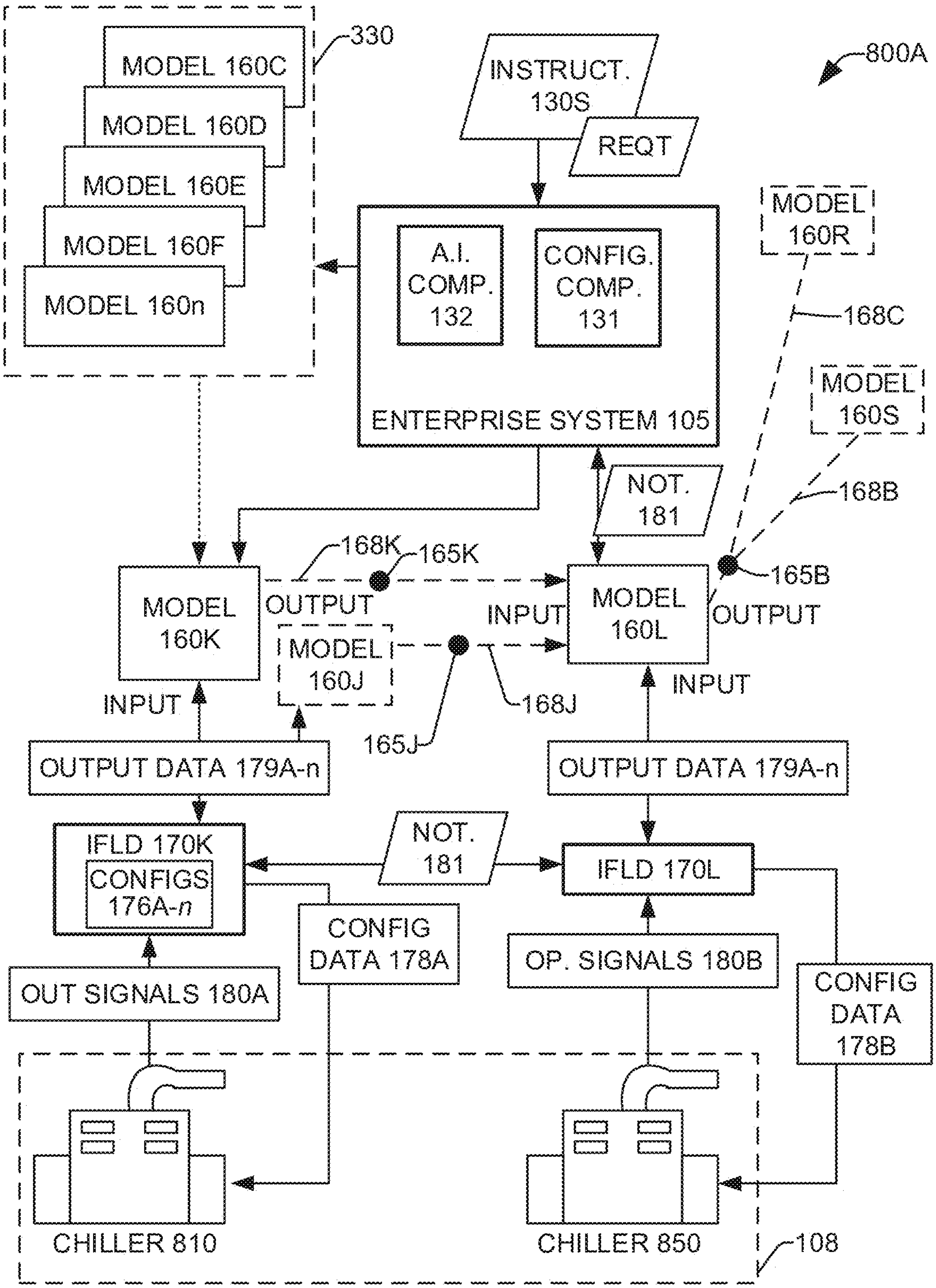
FIG. 8A is a schematic of a model representing equipment in a process being updated to satisfy a requirement being applied to a process, in accordance with at least one embodiment presented herein.

FIG. 8A, system 800A presents an example of a model representing equipment in a process being updated to satisfy a requirement being applied to a process, in accordance with an embodiment. The example scenario presented in FIG. 8A illustrates two pieces of equipment, a first chiller 810 and a second chiller 850 operating as part of a process 108. A first model 160K represents operation of the first chiller 810, wherein first model 160K has a first configuration 176H, and a second model 160L represents operation of the second chiller 850, wherein the second model 160L has a second configuration 176G. IFLD 170K is monitoring operation of chiller 810, wherein signals 180A generated during operation of the chiller 810 are captured by IFLD 170K. IFLD 170K can be operating with a first configuration 176K, wherein, the first configuration 176K may have been applied to the IFLD 170K as part of an auto-autoconfiguration performed in response to a previously received instruction 130S, wherein, for example, the instruction 130S pertained to processing and formatting of output signals 180A into a format suitable for implementation by any of a model, a higher-level device (e.g., a PLC 254A-n), and suchlike, as previously described.

Operation of the second chiller 850 is being monitored by a second IFLD, IFLD 170L, wherein IFLD 170K and IFLD 170L can be communicatively coupled. Operation of chiller 850 can be modeled by model 160L. Model 160L can be connected to other models, e.g., model 160R via node 165B and connector 168C, and model 160S via node 165B and connector 168B, as part of a supermodel 138A-n. As previously mentioned, models 160K and 160L (and all models 160A-n) can be configured such that they have input value(s) and output value(s). As shown in FIG. 8, output data 179 from IFLD 170K can be an input into model 160K, while an output from model 160K can be an input into model 160L (e.g., as represented by node 165K and connector 168K). In an embodiment, model 160L can be configured such that model 160L requires a value obtained from model 160K to have a specific value, be within a range of values, etc. In an example scenario, the output from model 160K does not satisfy a requirement of 160L. Accordingly, a notification 181 can be generated (e.g., by IFLD 170L) and transmitted to IFLD 170K or to other components in system 800 (e.g., configuration component 131, AI component 132, etc., in enterprise system 105). In an embodiment, the configuration component 131 can review the notification 181 to determine what the issue is at model 160L (e.g., the incorrect input value), and in response thereto, the one or more models 160A-n in the model repository 380 can be reviewed to determine whether there is a model that can be utilized to represent operation of the chiller 810. As shown in FIG. 8, the configuration component 131 determines that model 160J might be able to satisfy the input requirement of model 160L, wherein the model 160J can replace model 160K in representing operation of chiller 810. Based upon the output data 179, model 160K generates a value which is inputted into model 160L, per node 165J and connector 168J. In response to determining that the value generated by model 160J satisfies the requirement of model 160L, the model 160J can be applied at IFLD 170K. The model 160J can have an associated configuration 176J regarding operation of the chiller 810, wherein the IFLD 170K can be configured (e.g., via on-board logic) to apply the associated configuration 176J for operation of the chiller 810, wherein the configuration 176J associated with model 160J can be applied as a second configuration to IFLD 170K. As previously mentioned, the implementation of the model 160J configuration can be automatically applied to the IFLD 170K, wherein the IFLD 170K self-configures with the model 160J configuration. Alternatively, the model 160J configuration can be applied to IFLD 170K as part of an adjustment to process 108, wherein the model 160J configuration is presented on the offline model representation (e.g., supermodel 138A-2) and then requires implementation based upon review of the effect of the model 160J configuration on process 108 as depicted in the offline model representation.

In another example scenario of use, the chiller 810 and chiller 850 can have an interdependency (e.g., operating in series), wherein the output of model 160L can be assessed (e.g., by enterprise system 105) to determine whether the combination of chillers 810 and 850 can attain cooling to a desired temperature. In response to the output of model 160L not achieving the desired temperature (e.g., as defined in instruction 130S), model 160K and/or model 160L can be re-assessed to determine why the temperature is not being met and adjustments made accordingly, e.g., application of a model (e.g., model 160D) that achieves the desired condition, implementation of a configuration pertaining to the model (e.g., a configuration 176D associated with model 160D) achieving the desired condition, implementation of equipment that can achieve the condition (e.g., model 160E achieves the condition but requires a new pump (not shown) to be installed in chiller 850). In an embodiment, the respective information relating to model 160L and model 160J can be entered into a parametric hybrid model, wherein the outputs and interdependencies of models 160L and 160J are inputted into the parametric hybrid model, with an output of the parametric hybrid model providing an indication of variation in an output (e.g., energy) as a function of the operation and interdependencies of models 160L and 160J and the equipment they represent.

Example Applications of AI

Figure 8B:
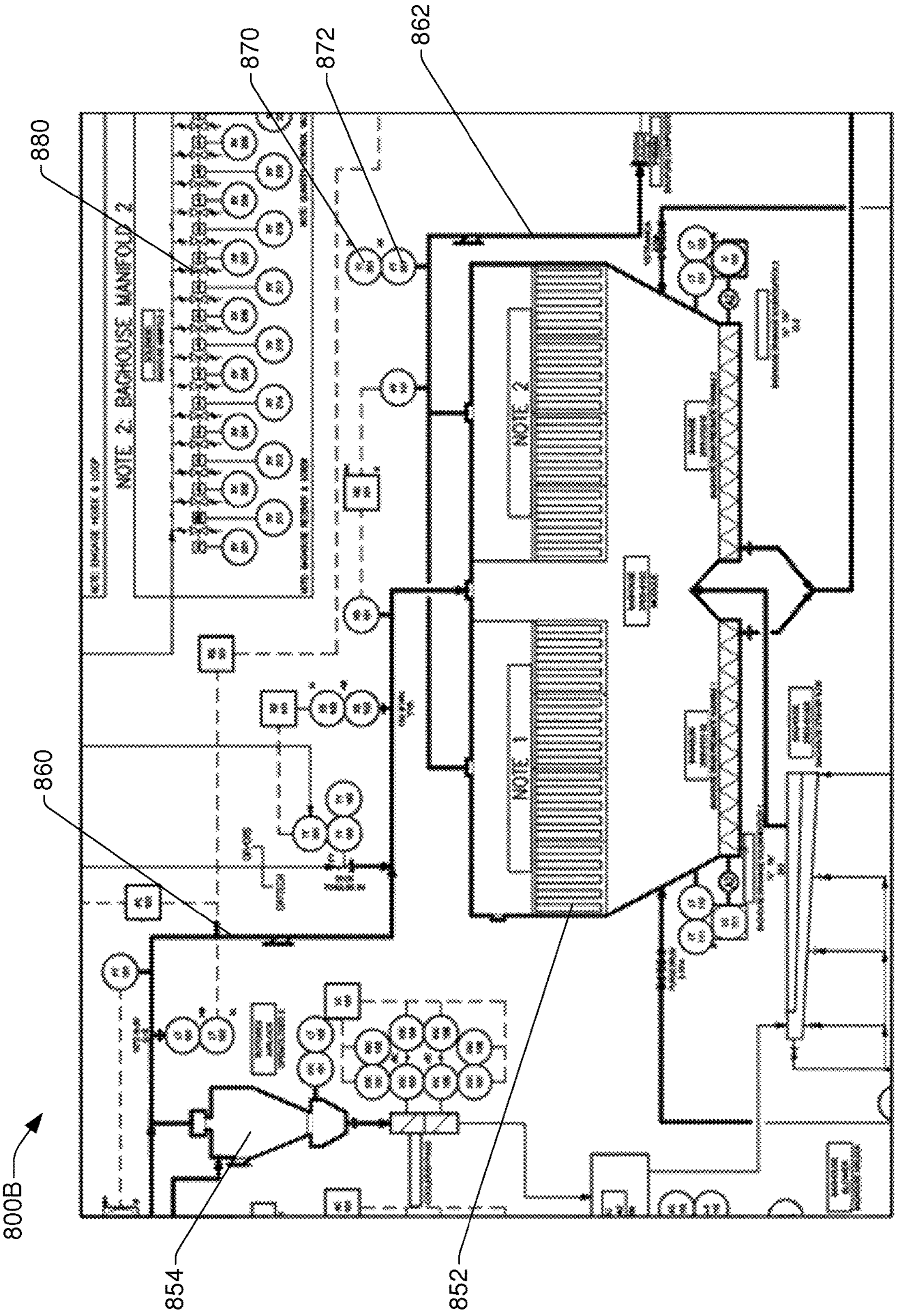
FIG. 8B is a piping and instrumentation diagram which can be utilized to construct a process, in accordance with an embodiment.

As previously mentioned, a variety of technologies and processes can be utilized in the various embodiments presented herein regarding application of AI to modeling a process 108. FIG. 8B, diagram 800B, presents a piping and instrumentation diagram which can be utilized to construct a process, in accordance with an embodiment.

In an embodiment, piping and instrumentation diagram (P&IDs) drawings can be utilized as a source of information for a process. During the design of an industrial process 108, or sub-process, P&IDs are frequently used to illustrate the piping of the process flow together with the equipment and instrumentation that make up the automation system. P&ID drawings may be provided to control engineers in the form of a print-out, a portable document format (PDF) file, an image file, another drawing file format, as well as in an electronic form whereby the respective components, devices, etc., have been identified (e.g., as graphical objects) and have sufficient information (e.g., in the form of metadata and suchlike) enabling incorporation of an electronic P&ID into any of the supermodels 138A-n, models 160A-n, nodes 165A-n. The P&IDs typically include symbols and numbers for pipes, signal lines, instruments, groups of instruments, and other equipment (e.g., tanks, mixers, etc.), whereby the symbols and/or numbers can be in accordance with industry standards or proprietary.

In an embodiment, the configuration component 131 and AI component 132 can utilize the P&ID drawing as part of a) gaining understanding of the process and components/devices included in the process, b) generating/designing any of the supermodels 138A-n, models 160A-n, nodes 165A-n, etc., a control system for the process, and suchlike. The configuration component 131 and AI component 132 can be configured to review the information provided in a P&ID drawing as part of the creation of the layout representation 157, the model representation 159, and suchlike.

FIG. 8B is an example P&ID drawing 800B that can be imported into the enterprise system 105 and provide information upon which knowledge regarding used as the basis for a new HMI application. This example P&ID drawing 800B depicts various types of equipment that make up an industrial system, including tanks 850 and 852 to which a number inlet and outlet pipes are connected, including pipe lines 860 and 862. P&ID drawing 800B also depicts a number of meters 870 of different types (e.g., temperature transmitters, pressure transmitters, level gauges, etc.), control devices 872 (e.g., temperature controllers, pressure controllers, etc.), valves 880, pumps, and other such equipment.

Once the P&ID drawing 800B has been imported, configuration component 131 and/or AI component 132 can analyze the P&ID drawing 800B to identify items of equipment represented in the drawing 800B, as well as connections or links between the items of equipment. Configuration component 131 and AI component 132 can employ any suitable method for delineating items of equipment and pipes represented in the P&ID drawing 800B, including but not limited to edge or contour detection, shape recognition, or other techniques, in conjunction with metadata previously identified in the P&ID drawing 800B. The configuration component 131 and AI component 132 can identify items of equipment (e.g., as a function of metadata assigned to the respective devices, components, etc.) depicted in the drawing 800B. Further, the configuration component 131 and AI component 132 can be configured to incorporate the P&ID drawing 800B, and the devices, equipment, etc., process 108, etc., into the layout representation 157, model representation 159, and suchlike.

Accordingly, in an example application of the various embodiments presented herein, a P&ID drawing 800B can represent a portion of the process 108 depicted in FIG. 3B. For example, a P&ID drawing 800B can represent the steam block comprising models 160A-E and associated nodes 165A-n, and connectors 168A-n. The AI component 132 can be configured to extract information from the P&ID drawing of the steam block and utilize that information to build a data-driven simplified model 160N for the steam block and insert the model 160N for the steam block in the model representation 159. As previously mentioned, the model 160N can be a higher level representation of the steam block, with the respective underlying models 160A-E available for review as an operator zooms (e.g., via HMI 118 and screen 119) into the model 160N (e.g., per FIG. 6). Further, the AI component 132 and historian component 134 can be configured to identify/review any historical data 136 previously compiled regarding implementation of the process 108 represented by the P&ID drawing. Further, the AI component 132 can utilized any current data being generated by the model 160N and the devices/components included therein. Accordingly, by utilizing the P&ID drawing 800B, historical data 136, output signals 180A-n, input signals 440, configuration data 178, and suchlike, as well as the expert driven analytics 415, and suchlike, the AI component 132 and the configuration component 131 can construct/implement supermodels 138A-n, models 160A-n, nodes 165A-n, etc., as required, e.g., to meet a requirement included in an instruction 130A-n. As further described with reference to FIGS. 9A-C, respective model(s) (e.g., parameter hybrid, empirical, parametric, etc.) in conjunction with the respective inputs and outputs, can be generated by the AI component 132 and the configuration component 131 to enable a supermodel 138A-n, model 160A-n, nodes 165A-n, etc., to be rapidly constructed in comparison with, a conventional approach of manually generating a process to meet a requirement.

A further example of technologies and processes being utilized in the various embodiments presented herein regarding application of AI to modeling a process 108 is presented in FIGS. 9A-C. FIGS. 9A, 9B, and 9C present an example systems 900A-900C depicting an example use of a parametric hybrid model to model at least a portion of process 108. FIGS. 9A-C can be read in conjunction with FIGS. 3A and 3B. Process 108 can comprise of a multiple devices, components, and equipment, 109A-n which can be operating to achieve a requirement, objective, etc., where process 108 can be an energy-producing plant with the requirement being "generate X-amount of power over a given time period". Per FIG. 3A, process 108 can comprise equipment 109A-n such as boilers 109B, burners 109U, steam generators 109S, pumps 109P, extraction systems 109E, cooling systems 109C, and suchlike. As part of modeling process 108, various outputs and parameters for the respective equipment 109A-n, etc., can be determined (e.g., in real-time, or via historical data) and submitted into a parametric hybrid model.

FIG. 9A is a block diagram 900A of exemplary components of the energy system 108, illustrating various interconnections. In particular, FIG. 9A depicts various energy loops that are typical in commercial and industrial energy systems 908, wherein the energy system 908 is an example of process 108. For example, the energy loops can include a fuel loop 40, an electric loop 42, a condenser loop 44 (e.g., cooling tower water), an evaporator loop 46 (e.g., chiller water), and a steam loop 48.

Each energy loop 40, 42, 44, 46, 48 can include a set of defining variables that function as inputs and outputs for the respective energy loop 40, 42, 44, 46, 48. For example, the fuel loop 40 includes $t^G$, $p^G$, $f^G$, and r, where $t^G$ is the fuel temperature, $p^G$ is the fuel pressure, $f^G$ is the fuel flow rate, and r is the heat factor for the fuel loop 40. The electric loop 42 includes kw, which is the amount of electricity supplied. The condenser loop 44 includes $ts_C$, $tf_C$, and $f^C$, where $ts_C$ is the temperature of the water entering the cooling tower(s), $tf_C$ is the temperature of the water exiting the cooling tower(s), and $f^C$ is the flow rate for the water in the condenser loop 44. The evaporator loop 46 includes $ts_F$, and $tf_E$, and $f^E$, where $ts_F$ is the temperature of the chilled water leaving the chillers (e.g., chillers 109C), $tf_E$ is the temperature of the chilled water returning to the chillers, and $f^E$ is the chilled water flow rate. The steam loop 48 includes $t^S$, $p^S$, and $f^S$, where $t^S$ is the steam temperature, $p^S$ is the steam pressure, and $f^S$ is the steam flow.

As further illustrated in FIG. 9A, the energy loops 40, 42, 44, 46, 48 are coupled to component blocks, which represent groups of actual energy-related equipment 109A-n (or devices) of the example energy system 908 that typically supply energy to, or consume energy from, the energy loops 40, 42, 44, 46, 48. In the example energy system for process 108, a boiler block 50 (e.g., for boiler 109B) is coupled to both the fuel loop 40 and the steam loop 48; an electrical generator block 52 is coupled to the fuel loop 40, the electric loop 42, and the steam loop 48; an evaporation chiller block 54 (e.g., for chiller 109C) is coupled to the electric loop 42, the condenser loop 44, and the evaporator loop 46; and an absorption chiller block 56 is coupled to the evaporator loop 46 and the steam loop 48. Accordingly, where a model 160A-n as previously described as pertaining to operation of a particular device (e.g., an IFLD 170A), a model 160A-n can also represent a collection/group of devices having common functionality, pertain to a common objective, and suchlike. Hence, while a model 160A may relate to a particular equipment 109A-n/device 170A-n/254A-n, in a process 108, and selection and zooming in on the model 160A reveals underlying features of the device (e.g., inputs, outputs, etc.), where the model 160A represents a collection of equipment 109A-n/device 170A-n/254A-n (e.g., as a component block), selection and zooming of the model 160A can reveal the respective equipment 109A-n/device 170A-n/254A-n in the collection of equipment 109A-n/device 170A-n/254A-n, as well the underlying features of the model 160A created from the collection of equipment 109A-n/device 170A-n/254A-n.

FIG. 9B is a block diagram 900B of an example parametric model that can be utilized for modeling the energy system 908. The energy variables $u_k$ from energy system 908 can be received by parametric hybrid model 58 (e.g., comparable to a model 160R), wherein the energy variables $u_k$ can include the variables of the energy loops 40, 42, 44, 46, and 48. An empirical model 60 (e.g., comparable to a model 160S) can use the energy variable inputs $u_k$ to generate empirical model outputs $w_k$. The empirical model outputs $w_k$ can be a function of the energy variable inputs $u_k$ and empirical model parameters $\rho$. Both the empirical model outputs $w_k$ and the energy variable inputs $u_k$ can be directed into a parameter model 62 (e.g., comparable to a model 160T) of the parametric hybrid model 58. Fundamental model parameters $\theta_k$ from the parameter model 62 can be a function of the energy variable inputs $u_k$ and the empirical model outputs $w_k$. It should be noted that both the length of the fundamental model parameters $\theta_k$ and the value of the parameter vector may vary as a function of the energy variable inputs $u_k$ and the empirical model outputs $w_k$. In certain embodiments, the fundamental model parameters $\theta_k$ can include the empirical model outputs $w_k$, or can be identical to the empirical model outputs $w_k$ in their simplest form. The fundamental model parameters $\theta_k$, can be directed into a parametric first-principles model 64 (e.g., comparable to a model 160U), which can be a steady-state or dynamic model. In addition, the parametric first-principles model 64 can receive the energy variable inputs $u_k$ from the energy system 908. The parametric first-principles model 64 can model measured or unmeasured energy state variables xx and energy variable outputs $y_k$. The energy state variables xx can be a function of the energy variable inputs $u_k$, previous energy state variables xx, and the fundamental model parameters $\theta_k$. The energy variable outputs $y_k$ can be a function of the energy variable inputs $u_k$, current energy state variables xx, and the fundamental model parameters $\theta_k$. The energy variable outputs $y_k$ can be directed from the parametric hybrid model 58 as outputs (e.g., as a node 165A-n). Hence, the general equations defining the parametric hybrid model 58 include:

$$w_k = f_1(u_k, \rho);$$

$$\theta_k = f_2(u_k, w_k);$$

$$x_k = F_k(u_k, x_{k-1}, \theta_k); \text{ and}$$

$$y_k = G_k(u_k, x_k, \theta_k),$$

where $u_k$ is a vector of energy variable inputs over time k, $\rho$ is a vector of empirical model parameters, $w_k$ is a vector of empirical model outputs over time k, $\theta_k$ is a vector of fundamental model parameters over time k, xx is a vector of measured or unmeasured energy state variables over time k, and $y_k$ is a vector of energy variable outputs over time k. The various inputs and outputs presented in FIGS. 9A-9C can be represented as nodes 165A-n, as previously described.

The parametric hybrid model 58 can be extremely efficient for real-time optimization and control computations. This computational efficiency can be critical to the successful implementation of a model-based optimization and control strategy that optimizes the performance of the energy system 908, per the various embodiments presented herein. Dynamic optimization methods can be used to calculate optimal dynamic trajectories during operation of the energy system 908 to optimize the efficiency of the energy system 908 as a whole. In particular, trajectories can be calculated for individual components of the component blocks 50, 52, 54, 56 of the energy system 908 and optimized to a target over time based on parameters that are closely related to, but may not be the same as, the input and output variables which are listed above as being associated with the various energy loops 40, 42, 44, 46, 48.

As described above with respect to FIG. 9A, each component block 50, 52, 54, 56 can be associated with energy loops 40, 42, 44, 46, 48, that contribute to operation of the respective component block 50, 52, 54, 56. In addition, each component block 50, 52, 54, 56 can include actual energy-related equipment components. Hence, each component block 50, 52, 54, 56 can be modeled by a parametric hybrid model 58 as described above with respect to FIG. 9B. For example, FIG. 9C is a block diagram 900C of an example evaporation chiller block 54 of FIG. 9A. As illustrated, the evaporation chiller block 54 can include a condenser 66, a compressor 68, an evaporator 70, and a valve 72. As such, the evaporation chiller block 54 can be associated with the condenser loop 44 (e.g., the condenser 66), the electric loop 42 (e.g., the compressor 68), and the evaporator loop 46 (e.g., the evaporator 70).

In an example, a user (e.g., a mathematical modeling expert) can select an item of interest (e.g., a model 160A-n, a node 165A-n) on a representation (e.g., a model representation 159) and zoom into the representation such that the variables, inputs, outputs, parameters, etc., (per the examples presented in FIGS. 9A-C) are presented at a readily discernible level and with context such that an adjustment to a variable, etc., can be made at such a granular level. As the adjustment is conducted, the representation can update in response to adjustment and its effect(s). For example, the graphical representation presented in FIG. 9A, the evaporation chiller block 54 can be modeled as a model 160A-n. Selection and zooming of the evaporation chiller block 54 can result in a lower, granular level of resolution being presented such that the various components included in the evaporation chiller block 54 can now be viewed, e.g., condenser 66, compressor 68, evaporator 70, and valve 72. Further, any of the components 66, 68, 70, and/or 72 can be further represented as a model 160A-n, wherein the model 160A-n is becoming device-specific, rather than representing a collection of components as a collection block.

The transparency across the various levels enabled by the various embodiments presented here enables highly focused operational review of operations across the whole process. For example, with a conventional system, review may only be available down to the control level devices as beneath that level, the data has no context, is unformatted, etc. However, with the field level devices also having onboard intelligence and ability to process/format data at the field level, drilling down beyond the control level to the field level devices 170A-n below.

Figure 10:
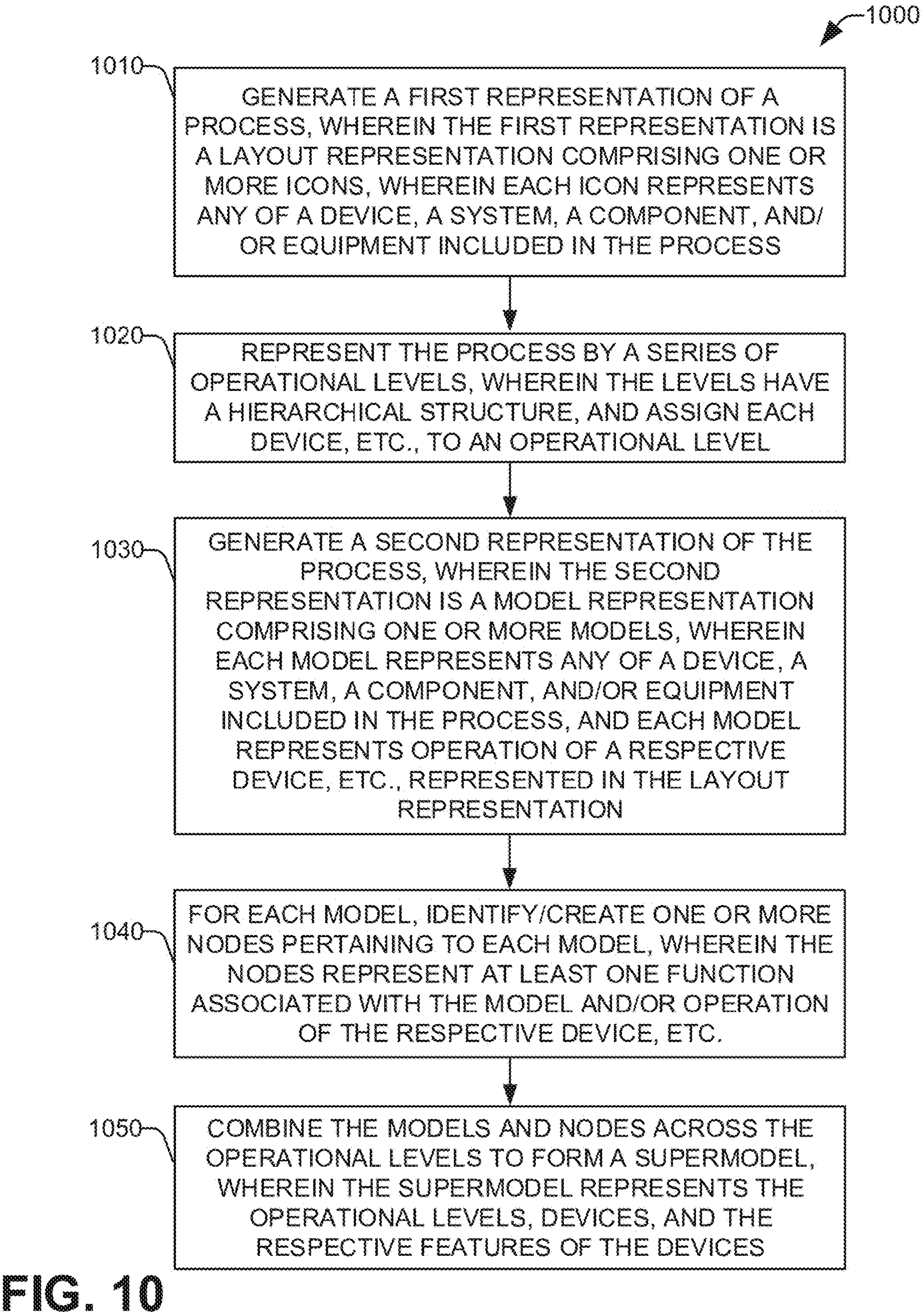
FIG. 10 illustrates a flow diagram for a computer-implemented methodology for representing a process as a layout representation and/or a model representation, in accordance with at least one embodiment presented herein.

Turning to FIG. 10, FIG. 10 illustrates a flow diagram 1000 for a computer-implemented methodology for representing a process as a layout representation and/or a model representation, in accordance with at least one embodiment.

At 1010, a first representation of a process (e.g., process 108), wherein the first representation is a layout representation (e.g., layout representation 157) comprising one or more icons (e.g., icons 158A-n), wherein each icon represents any of a device, a system, a component, and/or equipment (e.g., any of equipment 109A-n/device 170A-n/254A-n, etc.) included in the process. In an embodiment, the first representation can be presented on any of the screens (e.g., screens 119A-n) incorporated into a graphical user interface (e.g., HMI 118).

At 1020, the process can be further represented based upon hierarchical tiered and/or levels approach (e.g., per FIG. 2), for example, comprising any of a management level system(s) (e.g., management level systems 244), a planning level system(s) (e.g., planning level system 247), a supervisory level system(s) (e.g., supervisory level system 250), a control level system(s) (e.g., control level devices 253, such as PLCS 254A-n), and/or a field level systems(s) (e.g., field level devices 256, such as IFLDS 170A-n). In an embodiment, the respective devices, etc., in the process can be assigned a level in the hierarchical layered representation.

At 1030, a second representation of the process can be generated, wherein the second representation is a model representation (e.g., model representation 159) comprising one or more models (e.g., models 160A-n), wherein each model represents any of a device, a system, a component, and/or equipment (e.g., any of equipment 109A-n/device 170A-n/254A-n, etc.) included in the process, and each model represents operation of a respective device, etc., (e.g., any of equipment 109A-n/device 170A-n/254A-n, etc.) represented in the layout representation. In an embodiment, the second representation can be presented on any of the screens (e.g., screens 119A-n) incorporated into the graphical user interface (e.g., HMI 118). In an embodiment, the models (e.g., models 160A-n) in the model representation can pertain to devices, etc., that are represented by the icons (e.g., icons 158A-n) in the layout representation, enabling cross-correlation between the layout representation and the model representation.

At 1040, for each model in the model representation, one or more nodes (e.g., nodes 165A-n) pertaining to each model can be identified/created, wherein the nodes represent at least one feature, function, parameter, input, output, etc. associated with the model and/or operation of the respective device, etc. (ref. FIGS. 9A, 9B, and 9C).

At 1050, the respective models and nodes across the operational levels of the model representation can be combine to form a supermodel (e.g., any of supermodels 138A-n), wherein the supermodel represents the operational levels, devices, and the respective features of the devices, etc., as defined in the models and nodes included in the supermodel.

Figure 11:
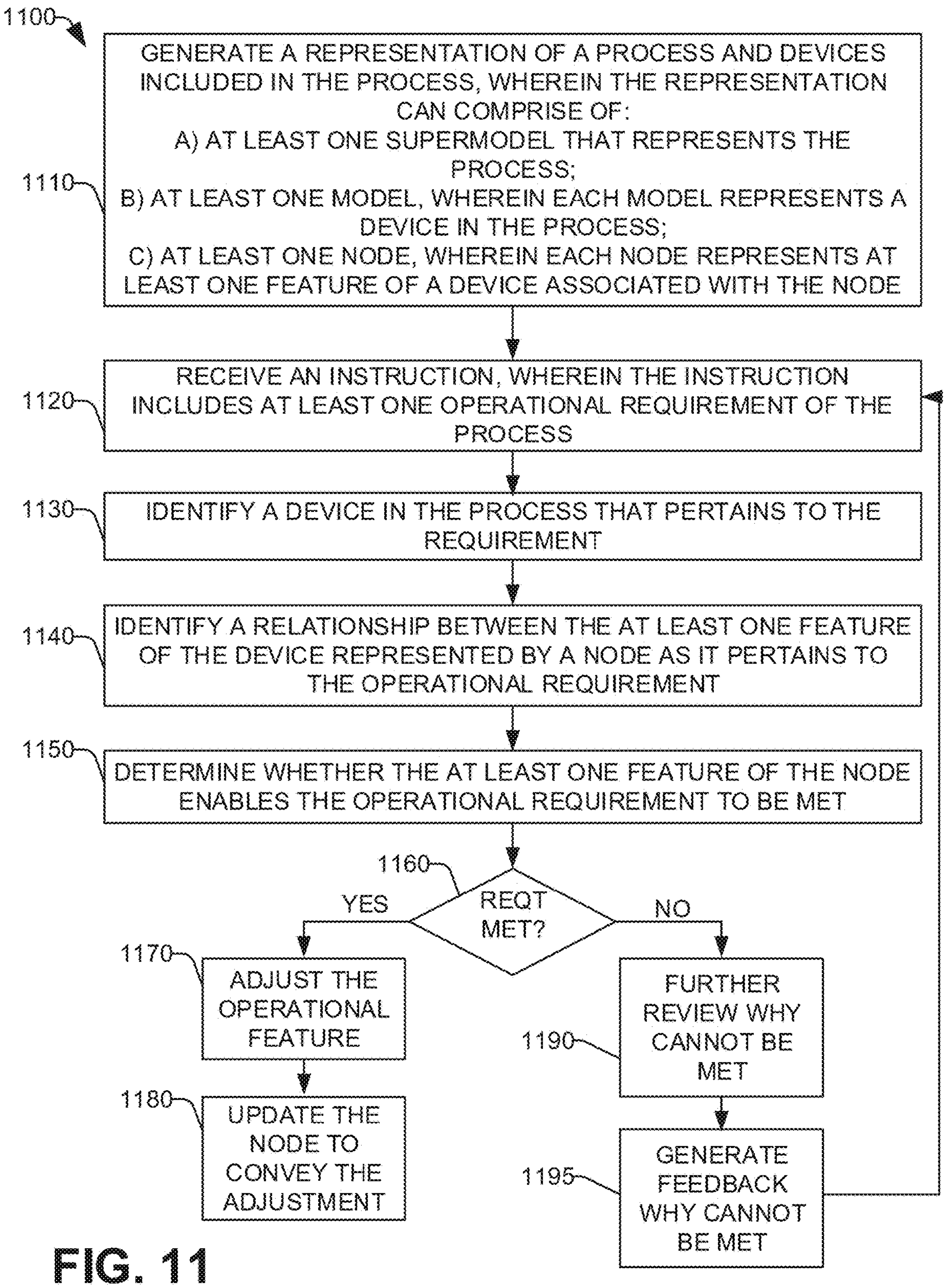
FIG. 11 illustrates a flow diagram for a computer-implemented methodology for representing a process and applying an instruction to the process, in accordance with at least one embodiment presented herein.

FIG. 11 illustrates a flow diagram 1100 for a computer-implemented methodology for representing a process and applying an instruction to the process, in accordance with at least one embodiment.

At 1110, a process (e.g., process 108) and the various equipment, systems, devices, components, etc., (e.g., any of equipment 109A-n/devices 170A-n/254A-n, etc.) located therein can be represented as an interactive graphical representation (e.g., layout representation 157). The graphical representation of the process can comprise of a supermodel (e.g., any of supermodels 138A-n), wherein the supermodel further comprises models (e.g., any of models 160A-n) and nodes (e.g., any of nodes 165A-n), wherein the respective models can represent respective equipment, etc., (e.g., any of equipment 109A-n/devices 170A-n/254A-n, etc.) included in the process, and the nodes can represent respective features, properties, etc., pertaining to the models. In an embodiment, the models can further comprise a mathematical representation (e.g., via a parametric model 58, model representation 159, and suchlike) of operation of the respective equipment (e.g., any of equipment 109A-n/devices 170A-n/254A-n, etc.). Hence, the graphical representation enables both a visual representation of equipment and also its functionality.

At 1120, an instruction (e.g., any of instructions 130A-n) can be applied to the graphical representation(s), wherein the instruction can include a requirement, objective, etc., (e.g., requirements 705, 706) directed to the overall process or a directed towards a specific device and/or equipment (e.g., any of equipment 109A-n/devices 170A-n/254A-n, etc.). For example, a global requirement applied across the process can be "reduce scrap to less than X %", wherein many devices and equipment in the process are monitored and/or controlled to enable achievement of the requirement. An example of a requirement being directed towards a specific device is a field-level device (e.g., any of IFLDs 170A-n) to process and transmit measurements in a specific format (e.g., convert raw output signals 180 into contextualized data 179) for processing by another device, such as a control-level device (e.g., any of PLCs 254A-n).

At 1130, the instruction can be parsed to identify a device (e.g., pump 109P and associated IFLD 170P) in the process to which the instruction pertains. Per the foregoing, the instruction may be directed towards a plurality of devices and equipment in the process (e.g., the instruction is global in nature), or the instruction may be directed towards a specific device in the process (e.g., the instruction is specific in nature). In an embodiment, a global instruction can be parsed and the various devices that pertain to the global instruction can be identified, such that the global instruction is broken down into as many sub-instructions/models as needed to be directed at as many devices across the process as required to enable the instruction to be satisfied. e.g., reduction in scrap is achieved.

At 1140, at least one feature/operating condition of the device can be identified as it pertains to a requirement in the instruction, wherein the feature/operating condition can be represented by a node associated with a model representing the device. For example, a pump can have a range of fluid throughput, hence, the node can represent an operating range of fluid throughput for the pump, and further, operation of the pump can be represented by a model.

At 1150, a determination can be made regarding whether the operational requirement in the instruction can be met by the operational feature of the device (e.g., the pump output).

At 1160, in response to a determination that YES the operational requirement in the instruction can be met, the flow can continue to 1170, wherein the operational feature can be adjusted (e.g., a first operating configuration 176A is adjusted to a second operating configuration 176B).

At 1180, the node representing the operational feature can be updated to indicate the change in operating condition of the device from the first operating condition to a second operating condition. As previously described (e.g., ref. FIG. 5), the foregoing implementation can be conducted on a representation of a process (e.g., FIG. 5, supermodel 138A-2), and if the implementation is satisfactory, the implementation can be incorporated (e.g., after authorization) into a monitoring and control representation of the process (e.g., FIG. 5, supermodel 138A-1), wherein the process adjusts in accordance with the requirement.

Returning to 1160, in response to a determination that NO, the operational requirement cannot be met, the flow can continue to 1190 wherein the operational feature can be further reviewed to determine why the operational requirement cannot be met. For example, a conflict may arise as a result of a first device (e.g., a pump) not being able to satisfy a requirement placed on a second device (e.g., a die spraying system requires more coolant than the pump can produce). In another example, implementing the operational requirement may void a warranty for the device.

At 1195, further review of the process can be undertaken to determine whether the operational requirement can be met, wherein feedback can be provided to a user (e.g., a process engineer), indicating what adjustments are required, or feedback can be provided indicating that it is not possible to meet the current operational requirement and further review of the operational requirement is required. Flow 1100 can return to 1120, wherein another instruction can be received.

Figure 12:
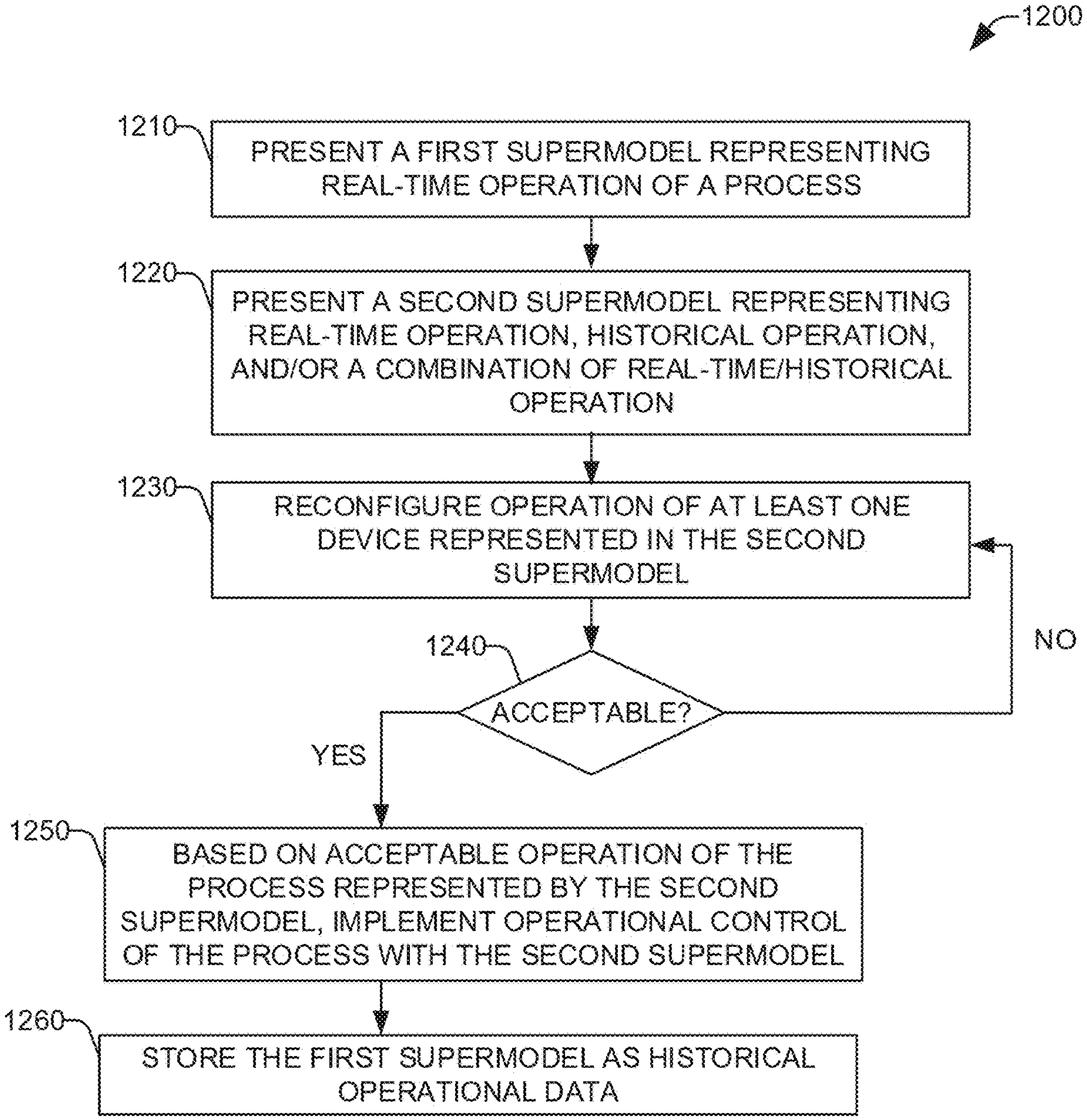
FIG. 12 illustrates a flow diagram for a computer-implemented methodology for implementing a change on an off-line implementation prior to incorporating the change into an on-line representation, in accordance with at least one embodiment presented herein.

FIG. 12 illustrates a flow diagram 1200 for a computer-implemented methodology for implementing a change on an off-line implementation prior to incorporating the change into an on-line representation, in accordance with at least one embodiment.

At 1210, a first supermodel (e.g., supermodel 138A-1 per FIG. 5) can be presented, wherein the first supermodel represents real-time operation (e.g., online) of a process (e.g., process 108). The first supermodel can be presented on a screen (e.g., any of screens 119A-n) on a graphical user interface (e.g., HMI 118).

At 1220, a second, offline supermodel (e.g., supermodel 138A-2 per FIG. 5) representing real-time operation, historical operation, and/or a combination of real-time/historical operation of the process can be presented. The first and second supermodels can be presented on a screen (e.g., any of screens 119A-n) on a graphical user interface (e.g., HMI 118). In an embodiment, the first supermodel and the second supermodel can be presented concurrently to enable interaction with the second supermodel (e.g., by a user such as a process engineer, a modeling expert, and suchlike) while the first supermodel operates in real-time monitoring and/or controlling the process, wherein the second supermodel is a digital twin of the first supermodel.

At 1230, operation of at least one device represented in the second supermodel can be reconfigured (e.g., from configuration 176A to configuration 176B). For example, interaction can be conducted on a model already presented in the second supermodel, interaction with a model already presented on the second supermodel can entail updating and/or swapping out the current model with a new model (e.g., in a plug and play manner). In an embodiment, the new model can be selected from available models (e.g., models 160A-n in repository 380).

At 1240, a determination can be made regarding whether the change(s) implemented will create an acceptable effect in operation of the process in real-time (e.g., as represented by supermodel 138A-1 per FIG. 5). The determination can be performed by any suitable approach, for example, by utilizing AI techniques (e.g., via AI component 132, configuration component 131, and suchlike), reviewing historical data (e.g., via historian component 134 reviewing historical data 136), and suchlike. The determination can be made in conjunction with whether the anticipated change(s) will/can (a) deleteriously affect the process, a sub-process, operation of equipment, device, etc. (e.g., any of equipment 109A-n/device 170A-n/254A-n, etc.); (b) will/can deleteriously affect representation of the process or a device by a model 160A-n and/or a node 165A-n; (c) and suchlike.

At 1250, in response to YES, the potential change enables acceptable operation of the process represented by the second supermodel, the one or more changes implemented in operational control and/or monitoring of the process with the second supermodel can be implemented in the first supermodel.

At 1260, in view of the one or more changes implemented in the first supermodel (e.g., at step 1250), the prior operational state of the first supermodel (e.g., the operational state prior to the one or more changes being implemented) can be saved (e.g., as a representation in historical data 136).

Returning to 1240, response to NO, the potential change does not result in an acceptable operation of the process, the flow can return to 1230, where a new change (e.g., a new configuration, a new model, a new node configuration, and suchlike) can be implemented for further review and/or acceptance.

Figure 13:
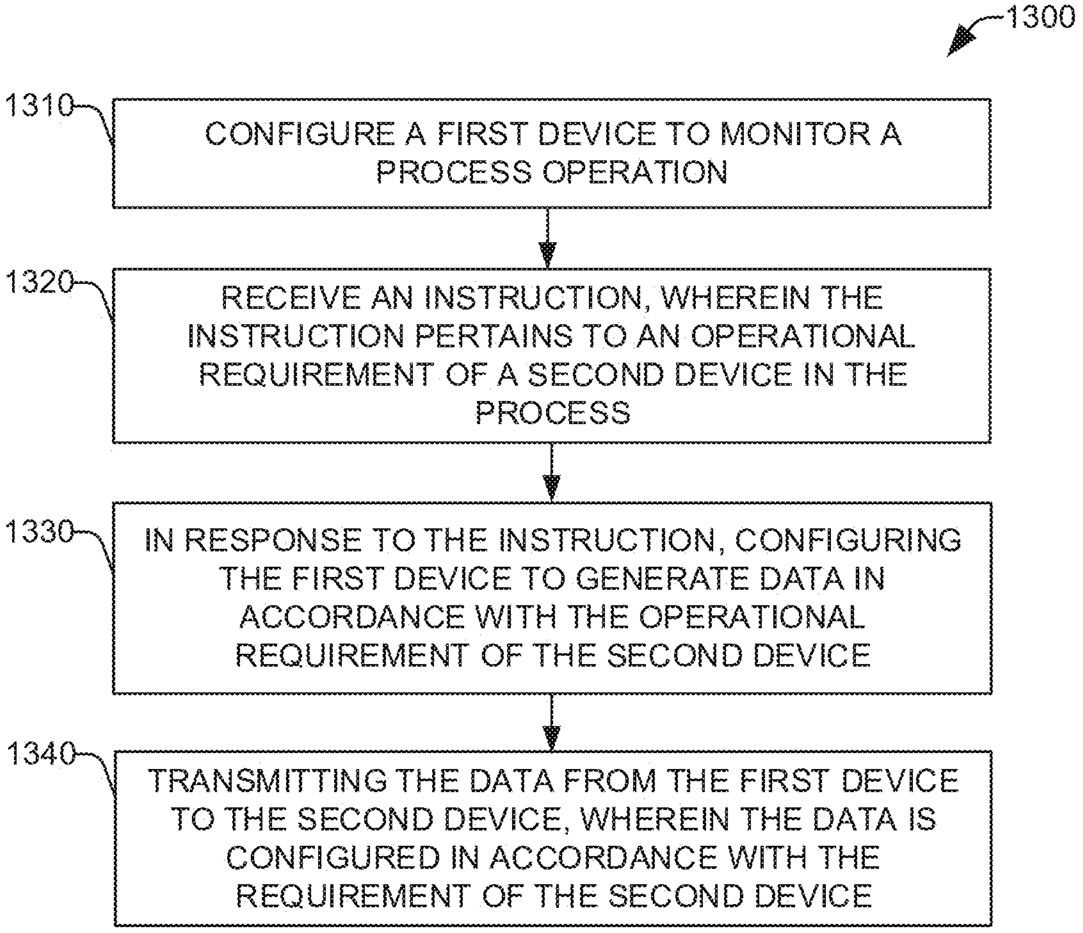
FIG. 13 illustrates a flow diagram for a computer-implemented methodology for altering a configuration of a first device monitoring a process to enable information to be sent in accordance with a requirement of a second device monitoring the process, in accordance with at least one embodiment presented herein.

FIG. 13 illustrates a flow diagram 1300 for a computer-implemented methodology for altering a configuration of a first device monitoring a process to enable information to be sent in accordance with a requirement of a second device monitoring the process, in accordance with at least one embodiment.

At 1310, a first device (e.g., any of IFLDS 170A-n) can be configured to monitor and/or control operation of a process (e.g., process 108). The first device can be operating with a first configuration (e.g., configuration 176A), wherein the first configuration can be configured to convert operating signals (e.g., signals 180) being generated by equipment (e.g., a pump 109P) into a first data format, and transmitting data (e.g., output data 179) comprising the operating signals having the first data format.

At 1320, an instruction (e.g., any of instructions 130A-n) can be received as the first device, wherein the instruction pertains to an operational requirement of a second device operating in, or associated with, the process. In an embodiment, the first device and the second device can be functioning in the same level (e.g., any of levels 244, 247, 250, 253, 256) such as both the first device and the second device are similar devices (e.g., the first and second devices are both IFLDS 170A-n), or the first and second devices can be disparate (e.g., the first device is an IFLD 170X and the second device is a PLC 254Y). In another embodiment, the instruction can include a requirement instructing the first device to generate the output data (e.g., output data 179) in a second data format, to enable the second device to process the output data according to a requirement/operation pertaining to the second device.

At 1330, in response to processing the instruction, the first device can undergo a self-configuration process wherein a second configuration (e.g., configuration 176B) can be derived by on-board logic operating at the first device, with subsequent operation of the first device being performed with the second configuration replacing the first configuration.

At 1340, the first device, having the second configuration implemented thereon, can subsequently monitor and control operation of the equipment, including capturing the operating signals generated by the equipment, processing the operating signals in accordance with the requirement(s) of the second device, and transmitting the processed operating signals as output data to the second device for processing by the second device.

Figure 14:
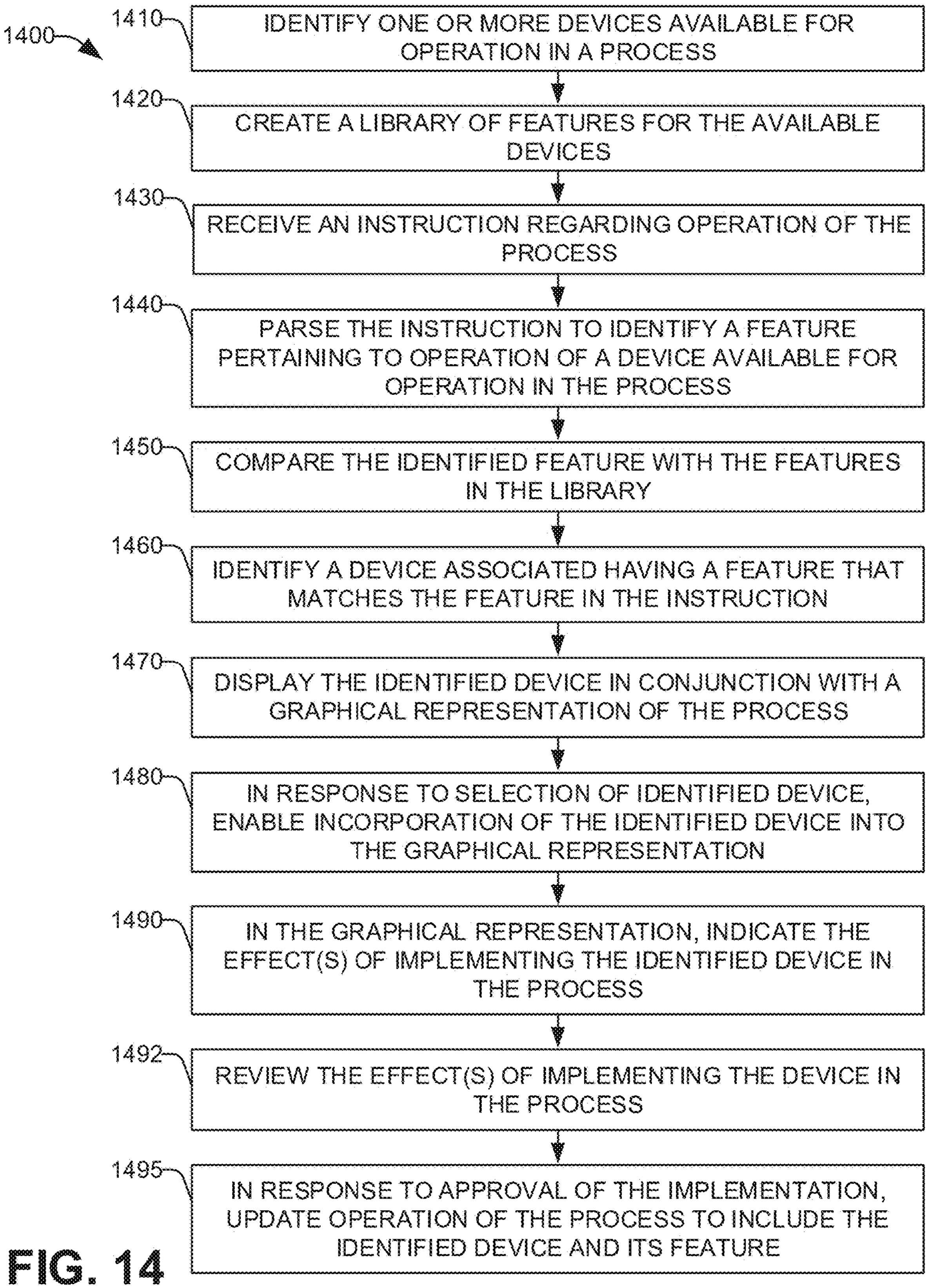
FIG. 14 illustrates a flow diagram for a computer-implemented methodology for implementing a device based upon a requirement to monitor and/or control a process, in accordance with at least one embodiment presented herein.

FIG. 14 illustrates a flow diagram 1400 for a computer-implemented methodology for implementing a device based upon a requirement to monitor and/or control a process, in accordance with at least one embodiment.

At 1410, one or more devices/equipment (e.g., any of (e.g., any of equipment 109A-n, IFLDS 170A-n. PLCS 254A-n, and suchlike) can be identified for implementation with a process (e.g., process 108).

At 1420, a library of features (e.g., repository 380) of the one or more devices/equipment can be accessed, wherein the features can be any of specifications, a feature in a mathematical model (e.g., any of models 160A-n, nodes 165A-n pertaining to models 160A-n, and suchlike) utilized to mathematically represent a device/equipment, one or more AI techniques pertaining to operation of the devices/equipment, etc.

At 1430, an instruction (e.g., any of instructions 130A-n) can be received regarding operation of the process and/or operation of equipment/device included in the process.

At 1440, the instruction can be parsed to identify a requirement, a feature, and suchlike, pertaining to operation of the process and/or operation of the equipment/device included in the process.

At 1450, the requirement/feature in the instruction can be compared with the various features available in the library.

At 1460, one or more devices/equipment can be identified from the various features listed in the library that matches the requirement/feature in the instruction.

At 1470, the one or more identified devices/equipment can be presented in a graphical representation of the process, wherein the graphical representation can be a layout representation (e.g., layout representation 157) and/or a model representation (e.g., model representation 159) of the process.

At 1480, in response to selection of a device/equipment in the one or more identified devices/equipment, the selected device/equipment can be incorporated into the graphical representation(s) of the process.

At 1490, at least one effect of incorporating the device/equipment into the graphical representation of the process can be identified. The at least one effect can include an effect upon a mathematical representation of the process such as a model configured to model one or more operations being performed in the process, processing and analysis of data by a device monitoring and/or controlling equipment in the process, and suchlike.

At 1492, the at least one effect of incorporating the device/equipment into the process can be reviewed (e.g., by AI component 132, configuration component 131, etc.) to determine whether the at least one effect is acceptable to performance of the process. In the event of the at least one effect is acceptable, the device/equipment can be incorporated into the process.

At 1495, in response to approval to incorporate the device/equipment into the process, a representation of the process (e.g., layout representation 157 and/or model representation 159) can be updated to indicate the effect of the incorporating the device/equipment into the process.

Figure 15:
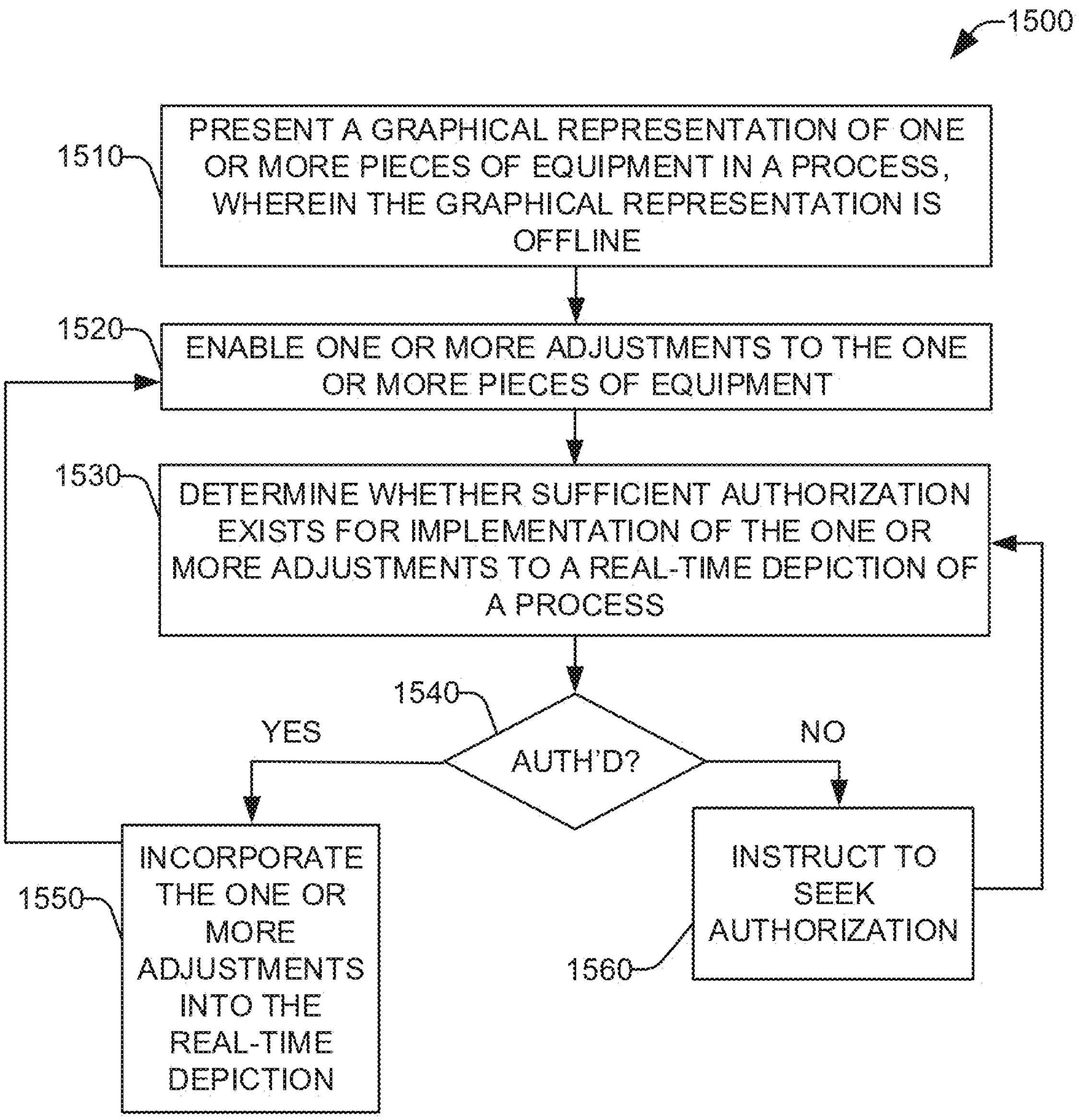
FIG. 15 illustrates a flow diagram for a computer-implemented methodology for authorizing implementing of a change into a representation, in accordance with at least one embodiment presented herein.

FIG. 15 illustrates a flow diagram 1500 for a computer-implemented methodology for authorizing implementation of a change into a representation, in accordance with at least one embodiment.

At 1510, a first graphical representation (e.g., supermodel 138A-2 shown in FIG. 5) of a process (e.g., process 108) is presented, wherein the first graphical representation includes equipment (e.g., pump 109P) operating in the process (and/or equipment available to operate in the process). The first graphical representation can be an offline representation enabling one or more prospective adjustments to be made to the process while not affecting the real-time operation of the process. The real-time operation of the process can be represented by a second graphical representation (e.g., supermodel 138A-1 shown in FIG. 5). The first and second graphical representations can be presented on screens 119A-n on a HMI 118. Further, the first and second graphical representations can include representation of the equipment/operations as interconnected icons (e.g., icons 158A-n) as well as in the form of a supermodel 138A-n representation of equipment/operations, wherein the supermodel 138A-n can include models 160A-n and/or nodes 165A-n.

At 1520, one or more adjustments can be implemented on the offline representation, such that operation of the equipment can be investigated in view of an instruction (e.g., any of instructions 130A-n) being applied regarding operation of the process. In an embodiment, the one or more adjustments can be implemented by a user (e.g., a process engineer, and suchlike) interacting with the offline representation via the screens on the HMI. In another embodiment, the one or more adjustments can be implemented by an AI component (e.g., AI component 132), wherein the AI component can be configured to review operation of the process and achievement of an objective in the instruction. Any suitable techniques can be implemented by the AI component in reviewing/representing operation of a supermodel 138A-n representation of devices/operations, models 160A-n, and/or nodes 165A-n, where such techniques include, in a non-limiting list, parametric modeling, parametric hybrid modeling, linear modeling, single value, non-linear modeling, kinetic parameters, empirical modeling, first principles reasoning, incremental prioritization, solvers, historical data mining, cost function analysis, regression cost function, binary classification cost functions, multi-class classification cost functions, MINLP, deep learning techniques, backpropagation, static backpropagation, recurrent backpropagation, gradient computation, chain rule, error determination, and suchlike. In a further embodiment, the one or more adjustments can be implemented by on-board logic implemented on a device operating within the process, wherein the device can be, for example, a field-level device (e.g., any of IFLDS 170A-n) such as a sensor monitoring operation of equipment in the process, a control-level device such as a PLC (e.g., any of PLCS 254A-n) interacting with the field-level devices, etc., wherein the device can be located at any level of the process (e.g., as depicted in FIG. 2). Continuing the example, with the device being an IFLD, the IFLD can be configured with a processor and memory (e.g., a processor coupled to the memory, wherein the memory can be configured to store executable instructions that can be executed by the processor, including AI algorithms, device configurations, and suchlike) to enable the IFLD to be self- and context-aware, wherein on-board intelligence can include operations and techniques comparable to those conducted by the aforementioned AI component (e.g., the IFLD can perform any of the operations conducted by any of the components included in the modeling component 120). Accordingly, the IFLD can automatically review operation of the process and recommend various configurations (e.g., configurations 176A-n), models and/or nodes to enable the instruction to be achieved, wherein the IFLD can automatically self-configure to engender the implementation as needed. Feedback from the IFLD can be fed back to a centralized system (e.g., enterprise system 105, field level component 156) to enable updating the various graphical representations to reflect any proposed implementation(s) generated by the IFLD.

At 1530, a determination can be made regarding whether sufficient authorization exists for the adjustments to be implemented in the real-time graphical representation. As mentioned, proposed adjustments can be implemented on the offline representation prior to incorporation into the real-time, online representation. Authorization can be role-based. e.g., a modeling expert is authorized to implement changes to a model in the offline representation, while the modeling expert may not be authorized to implement the changes into the online representation, with authorization being required from a process engineer after reviewing the proposed changes. In another embodiment, a manager may have authorization to apply one or more requirements/objectives to the offline representation to determine whether and/or how the process can accommodate the requirements, etc., but a process engineer is required to authorize any process adjustments before they can be applied to the real-time process. A process engineer can be authorized to implement changes but does not have access to the underlying models that can be accessed the modeling expert. It is to be appreciated that numerous scenarios exist regarding user role and authorization, the foregoing are non-limiting examples of such. In a scenario where the adjustments/re-configurations are implemented by AI technology (e.g., on the ILFD, on the PLC, at the centralized system, and suchlike), implementing the adjustments, etc., into the real-time operation can be pre-authorized or can require human authorization.

At 1540, a determination can be made regarding the authorization, and in response to a determination that YES the adjustment can be implemented in real-time, the flow can continue to 1550, wherein the proposed adjustment is implemented in real-time. Flow can return to step 1520 for another change to be implemented, reviewed, and/or authorized.

Returning to step 1540, in response to NO, the adjustment is not authorized, the flow can continue 1560, wherein an instruction is generated (e.g., via a notification) instructing the user and/or the device to obtain authorization. Flow can return to step 1530 for subsequent authorization to be determined.

Figure 16:
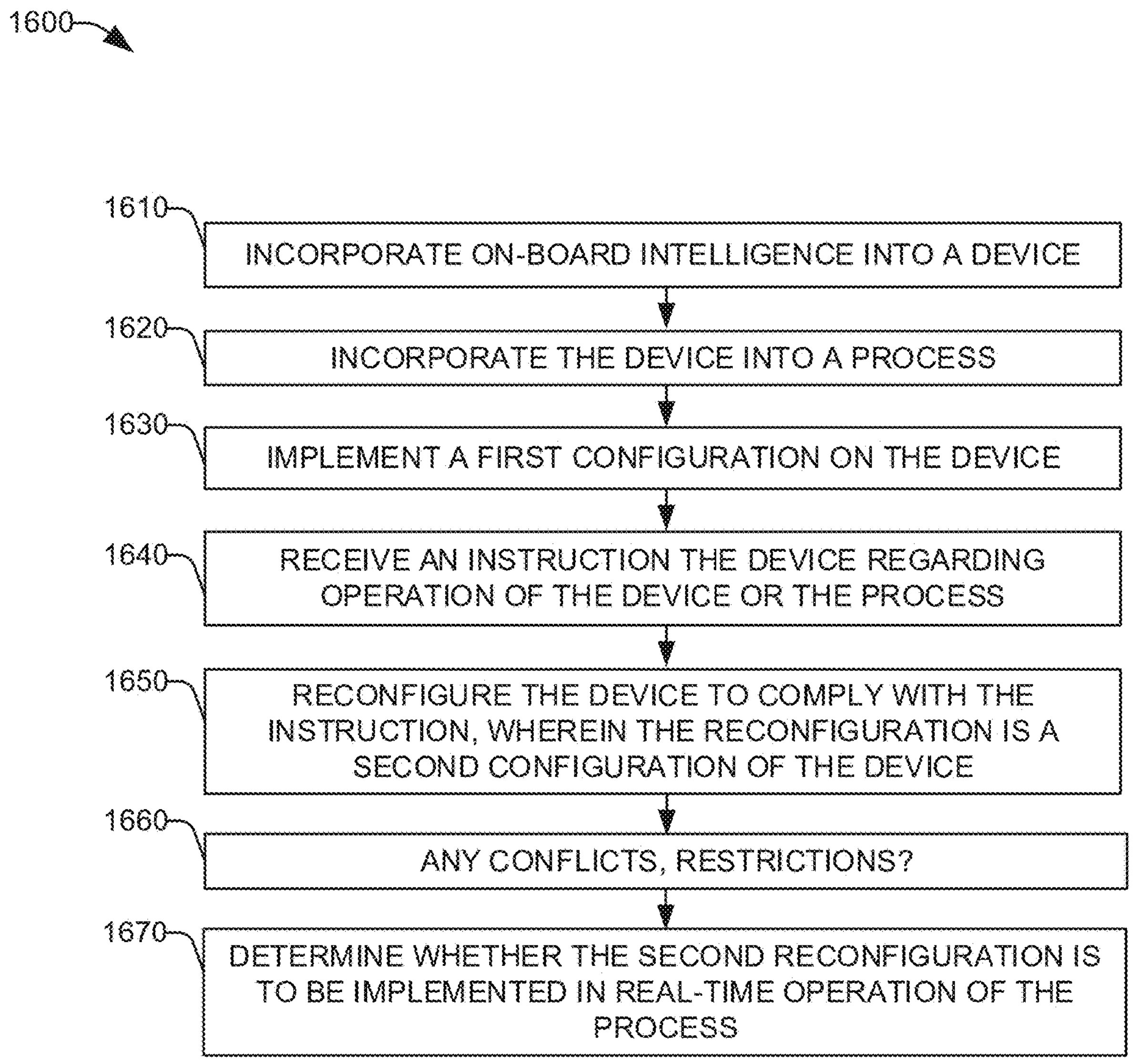
FIG. 16 illustrates a flow diagram for implementing a smart device to monitor and/or control a process, in accordance with at least one embodiment presented herein.

FIG. 16 illustrates a flow diagram 1600 for implementing a smart device to monitor and/or control a process, in accordance with at least one embodiment.

At 1610, and as previously described, on-board intelligence can be implemented in a device, wherein the device is configured to monitor and/or control operation of equipment, components, devices, etc., included in a process (e.g., process 108). The device can be a field-level device (e.g., any of IFLDS 170A-n, a sensor, actuator, valve, etc.), a control-level device (e.g., any of PLCS 254A-n), etc. Continuing the example, with the device being an IFLD, the IFLD can be configured with a processor and memory (e.g., a processor coupled to the memory, wherein the memory can be configured to store executable instructions that can be executed by the processor, including AI algorithms, device configurations, and suchlike) to enable the IFLD to be self- and context-aware, wherein on-board intelligence can include operations and techniques comparable to those conducted by a remotely located system (e.g., the IFLD can perform any of the operations conducted by any of the components included in the enterprise system 105, e.g., by the modeling component 120, OS 110, etc.). A function of the on-board intelligence is implementation of AI techniques to be executed at the device, wherein the AI techniques can be any techniques as available at other parts of the process (e.g., as available at AI component 132).

At 1620, the device (IFLD) can be incorporated into the process, e.g., the IFLD is coupled to a first piece of equipment (e.g., pump 109P), wherein the IFLD can monitor and/or control operation of the first piece of equipment and/or the role of the equipment in the process.

At 1630, the device is configured with a first configuration (e.g., in the configurations 176A-n) for monitoring and/or controlling the first piece of equipment. The first configuration can be presented on a graphical representation enabling review of operation of the device and/or the equipment at a granular level.

At 1640, an instruction (e.g., instruction 130A-n) can be received at the device regarding operation of the device and/or operation of the equipment. The on-board intelligence at the device can parse the instruction to identify one or more requirements/objectives in the instruction.

At 1650, the on-board intelligence of the device enables the device to determine a second configuration to comply with the instruction for controlling the equipment. In an embodiment, the device can auto-configure itself to implement the second configuration. The second configuration can be directed towards operation of the device (e.g., IFLD to transmit data in a particular format) or can be directed towards operation of the equipment (e.g., IFLD is to increase speed of a pump). In an embodiment, the device can reference historical data (e.g., historical data 136), previously utilized configurations (e.g., in repository 380), AI techniques, and suchlike.

At 1660, while determining a second configuration to implement, the device can also determine whether there are any conflicts, restrictions, etc., regarding implementing the second configuration. For example, the device can determine that applying the second configuration to the equipment could cause operation of the equipment to no longer be compatible with other equipment in the process. In another example, the equipment may be under warranty and coupling the equipment to another piece of equipment voids the warranty. In another example, where the device is generating a model representation (e.g., any of models 160A-n and nodes 165A-n) of operation of the equipment, the device can determine that an output (e.g., power output relates to steam) cannot be applied to any input of another model (e.g., power input relates to electrical energy). In another example, a constraint can exist regarding an output of a model (and associated equipment) being required to meet a particular value, range, etc., against which operation of the equipment can be assessed wither regard to meeting the constraint, or not.

At 1670, a determination can be made regarding whether the second configuration can be implemented in real-time operation of the process, and whether authorization exists for the real-time implementation, as previously described.

Figure 17:
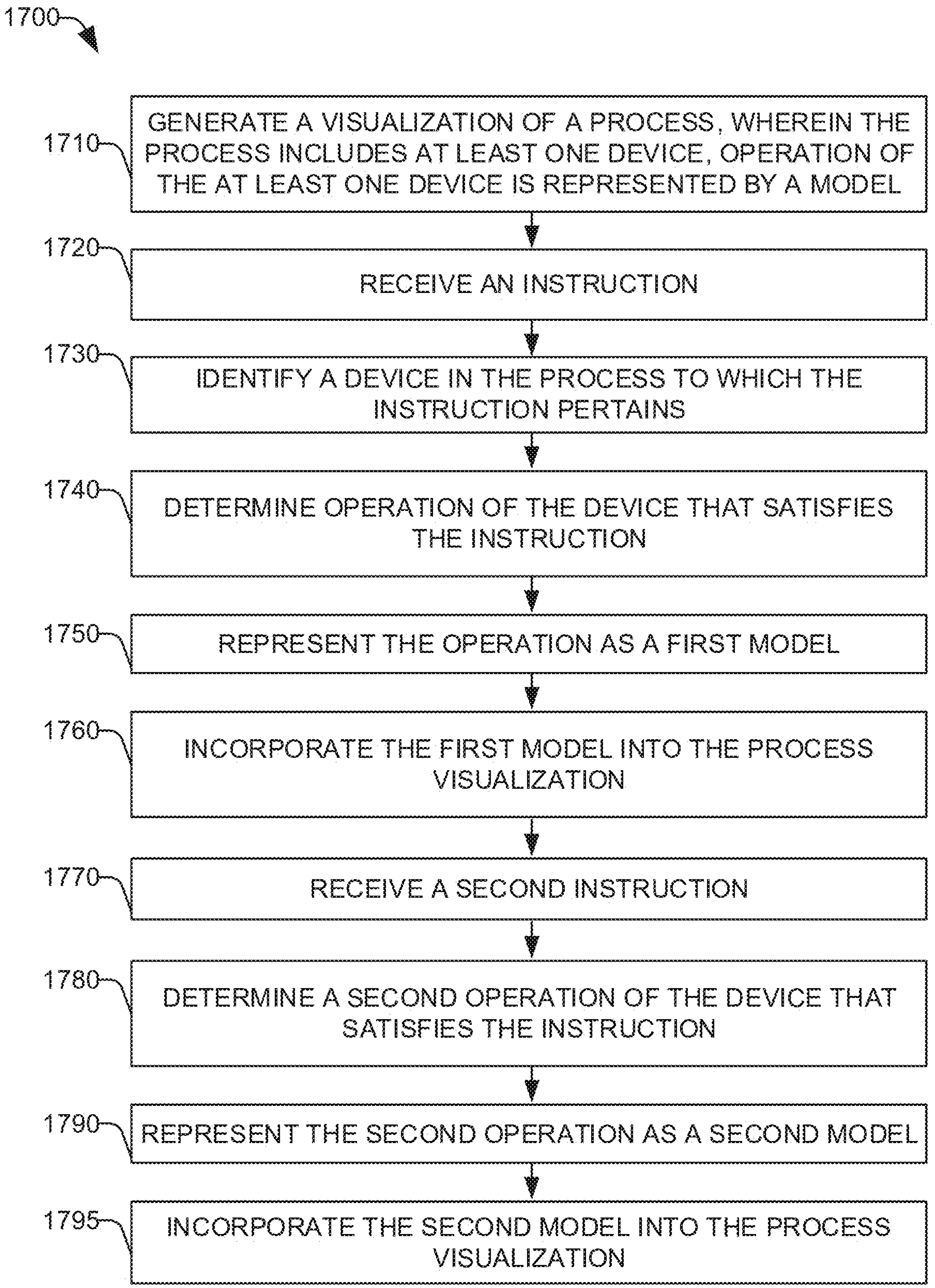
FIG. 17 illustrates a flow diagram for updating a graphical representation of a process in response to receiving various instructions at the process, in accordance with at least one embodiment presented herein.

FIG. 17 illustrates a flow diagram 1700 for updating a graphical representation of a process in response to receiving various instructions at the process, in accordance with at least one embodiment.

At 1710, a visualization (e.g., a layout representation 157, a model representation 159) of the process is generated, wherein the visualization can be a computer/graphical representation (e.g., a supermodel 138A-n) comprising at least one device (e.g., any of equipment 109A-n/devices 170A-n/254A-n, etc.), wherein operation of the at least one device is respectively represented by a model (e.g., models 160A-n, nodes 165A-n).

At 1720, an instruction (e.g., instruction 130S) can be received (e.g., at OS 110), wherein the instruction can include a requirement, an objective, and suchlike regarding operation of at least one device in the process.

At 1730, the instruction can be parsed (e.g., by configuration component 131) to identify a device in the process that pertains to the requirement, etc., included in the instruction.

At 1740, an operation of the device can be determined as it pertains/satisfies the instruction.

At 1750, the device operation that pertains/satisfies the instruction can be represented as a first model (e.g., a model 160S).

At 1760, the model can be incorporated into the graphical representation of the process.

At 1770, a second instruction (e.g., instruction 130T) can be received (e.g., at OS 110), wherein the instruction can include a second requirement, a second objective, and suchlike regarding operation of at least one device in the process.

At 1780, the second instruction can be parsed (e.g., by configuration component 131) and a second operation of the device that pertains/satisfies the second instruction can be determined.

At 1790, the second operation can be represented as a second model (e.g., a model 160T).

At 1795, the graphical representation can be updated to incorporate the second model, for example, the second model can replace the first model in the graphical representation, or the second model can be presented concurrently with the first model (e.g., where the first instruction/first operation/first model represent a feature of operation of the device that is disparate to the second instruction/second operation/second model. Accordingly, the graphical representation can update to indicate operation of the process being adjusted as various requirements and/or objectives are applied to the process.

Figure 18:
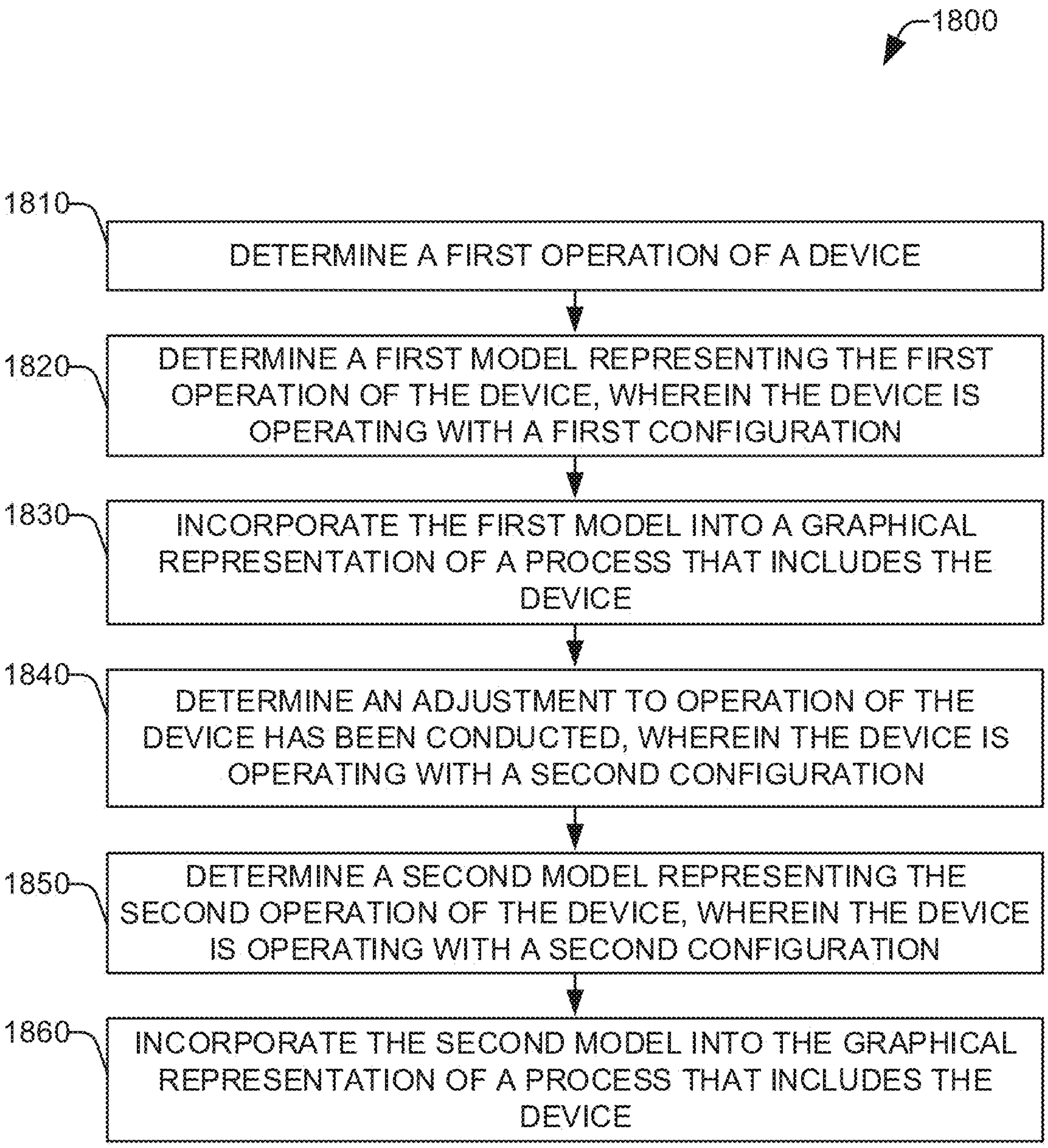
FIG. 18 illustrates a flow diagram for updating a graphical representation of a process in response to detecting a change has been made to operation of a device depicted in the graphical representation, in accordance with at least one embodiment presented herein.

FIG. 18 illustrates a flow diagram 1800 for updating a graphical representation of a process in response to detecting a change has been made to operation of a device depicted in the graphical representation, in accordance with at least one embodiment.

At 1810, a first operation of a device (e.g., any of equipment 109A-n/device 170A-n/254A-n, etc.) can be determined (e.g., by configuration component 131, by AI component 132, and suchlike). In an embodiment, the device can be included in a process (e.g., process 108) that is being monitored/controlled by one or more components in an optimizer system (e.g., OS 110).

At 1820, a first model (e.g., a model 160M) representing the first operation (e.g., a first configuration 176A) of the device can be determined and generated (e.g., by configuration component 131, by AI component 132, and suchlike).

At 1830, the first model can be incorporated into (e.g., by configuration component 131) a visualization (e.g., a layout representation 157, a model representation 159) of the process, wherein the visualization can be a computer/graphical representation (e.g., a supermodel 138A-n). For example, as a device is brought online in a process, the visualization can automatically update to represent the newly operational device.

At 1840, a determination can be made (e.g., by configuration component 131, by AI component 132, and suchlike) that operation of the device has been adjusted, e.g., a process engineer physically changed an operation setting on the device, a PLC (e.g., a PLC 254M) adjusted operation of a device (e.g., where the device is a sensor, an actuator, an IFLD, etc.). Per the adjustment, the device is now operating with a second configuration (e.g., configuration 176B). Accordingly, the adjustment was not performed by any component of the optimizer system (e.g., OS 110) and hence the optimizer system would be operationally unaware of the operational change to the device unless it had been detected by an onboard component (e.g., by configuration component 131, by AI component 132, and suchlike).

At 1850, a second model (e.g., a model 160N) can be determined/generated to represent the second operating condition (second configuration) of the device.

At 1860, the second model can be incorporated into (e.g., by configuration component 131) the visualization (e.g., layout representation 157, model representation 159) of the process. Hence, as operation of the device is adjusted within the process, the visualization can automatically update to represent operational adjustments (e.g., new configurations) of the device.

Figure 19:
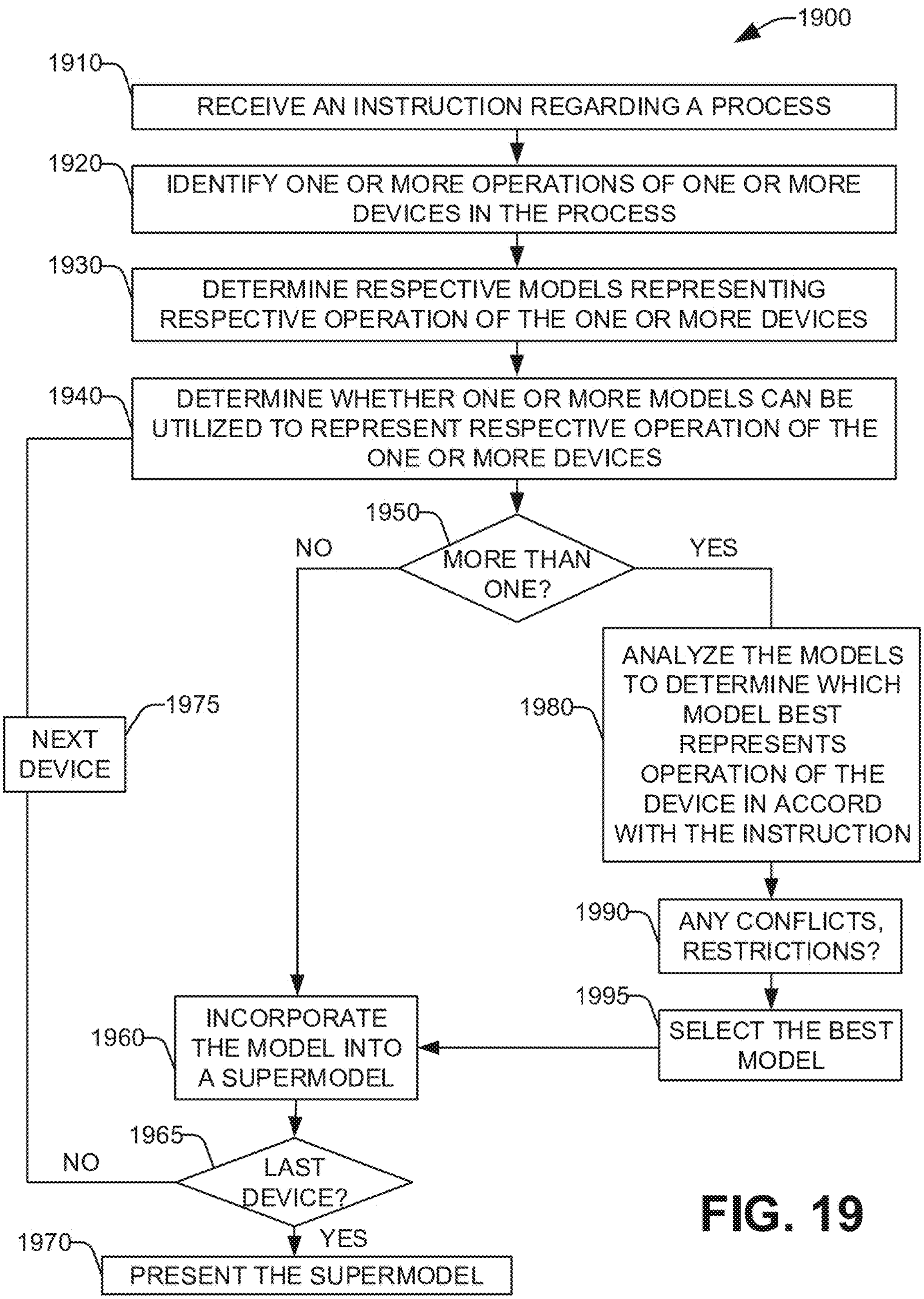
FIG. 19 illustrates a flow diagram for generating a graphical representation of a process in response to an objective being applied to the process, in accordance with at least one embodiment presented herein.

FIG. 19 illustrates a flow diagram 1900 for generating a graphical representation of a process in response to an objective being applied to the process, in accordance with at least one embodiment.

At 1910, an instruction (e.g., an instruction 130F) can be received at a system (e.g., at OS 110) regarding a process (e.g., process 108). For example, the instruction can include an objective regarding the process, wherein the objective can be "represent the process to indicate energy usage by the respective devices in the process", "represent operational history in terms of uptime/downtime for the respective devices in the process", and suchlike. It is to be appreciated that the foregoing are merely examples, and a multitude of other objectives can be applied to the respective embodiments presented herein.

At 1920, various operational states/operations of the devices (e.g., any of equipment 109A-n/device 170A-n/254A-n, etc.) in the process can be identified, wherein the operations can be current operation, past operation, future operation, and suchlike. The various operational states can be determined by respective components included in the system (e.g., by configuration component 131, by AI component 132, by historian component 134, and suchlike, reviewing current output data 179, output signals 180 as well as historical data 136).

At 1930, various models (e.g., models 160A-n, nodes 165A-n) can be generated (e.g., by configuration component 131, by AI component 132, and suchlike) regarding respective operation of the devices in the process.

At 1940, given that there are multiple ways an operation can be expressed/represented in a mathematical model, it is possible that more than one model can be generated (e.g., by configuration component 131, by AI component 132, and suchlike) to represent an operation at a device. e.g., a parametric hybrid model, a cost function analysis model, and the like. Accordingly, more than one model (e.g., prospective models) may be generated that satisfies the objective, but only one model is to be incorporated into a supermodel (e.g., supermodel 138A-n) representing the process in view of the objective.

At 1950, in response to a determination that only one model has been generated to represent operation of a first device in view of the objective, the flow can advance to 1960, wherein the single model for the first device can be incorporated into the supermodel.

At 1965, a determination (e.g., by configuration component 131, by AI component 132, and suchlike) can be made regarding whether the model being reviewed is for the last device in the devices to be incorporated into the supermodel. In response to a determination that YES, this is the last device to be reviewed, the flow can advance to 1970, wherein the supermodel can be presented. In response to a determination at 1965 that NO, this is not the last device to be reviewed, the flow can advance to step 1975, wherein the next device can be selected, and returns to 1940, for a determination of whether one or more models can be generated for the operation of the next device.

Returning to determination 1950, in response to a determination that more than one model can be utilized to express operation of the device currently being reviewed with regard to the objective, the flow can advance to step 1980, wherein a determination can be made regarding which of the various models best represent operation of the device currently being reviewed with regard to the objective. As previously mentioned, the suitability of the respective models in representing operation of a device in view of an objective can be ranked/assessed/scored, wherein a first model may meet the objective better but implementation of the first model may affect operation of a neighboring model in the supermodel.

Further, at 1990, consideration can also be made regarding whether there are any conflicts between models, as well as any restrictions (e.g., warranties, constraints, input/output conflicts, and suchlike).

At 1995, the best model in the series of available models for the device can be selected (e.g., by configuration component 131, by AI component 132, and suchlike) that best represents operation of the device in view of the objective, wherein the flow can advance to 1960, for incorporation of the best model into the supermodel. Accordingly, per the foregoing, a supermodel comprising a plurality of models and nodes can be generated in accordance with an objective.

Figure 20:
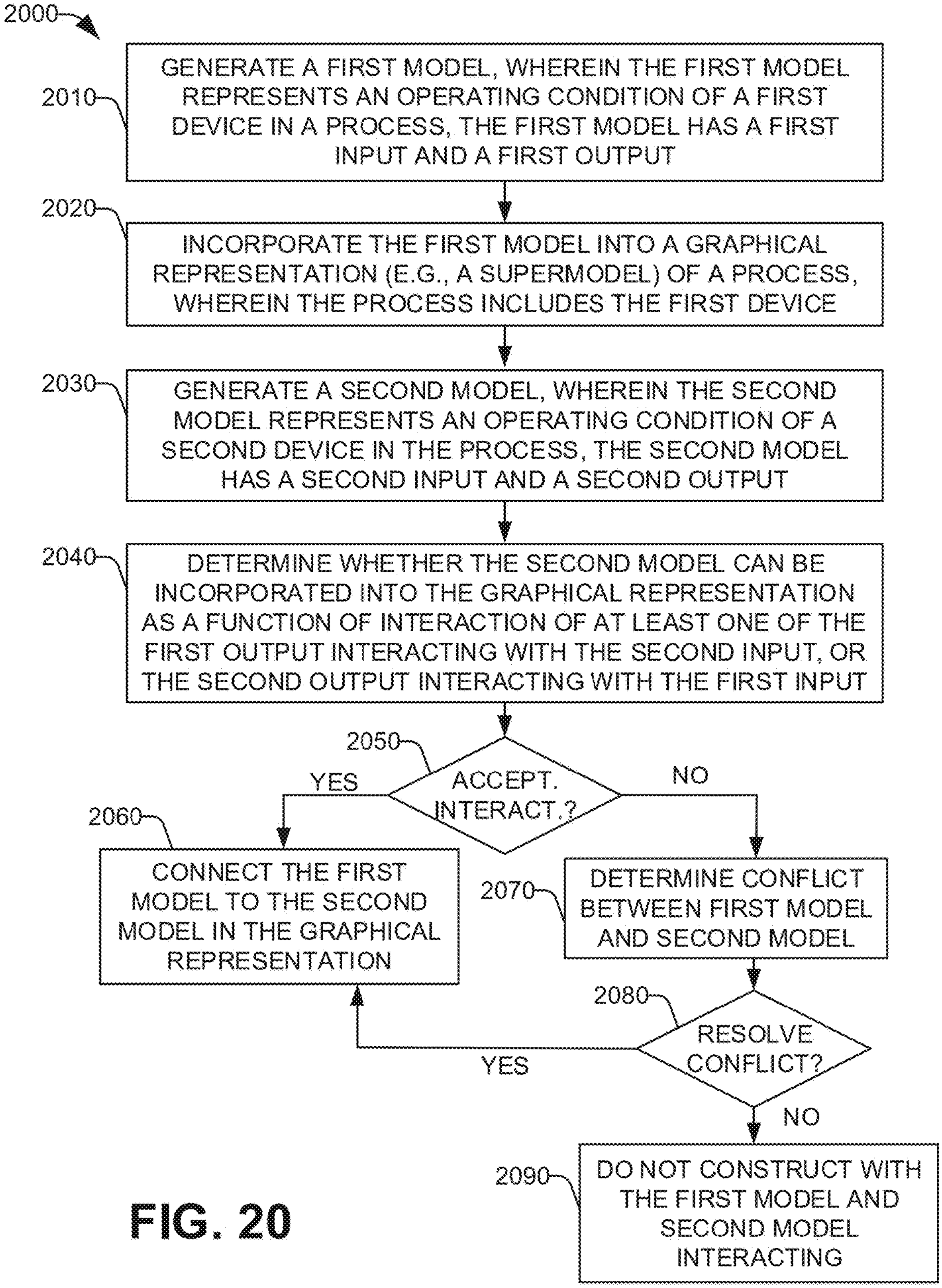
FIG. 20 illustrates a flow diagram for generating a graphical representation of a process, wherein the representation is constructed with interconnecting models representing respective operation of respective devices in the process, in accordance with at least one embodiment presented herein.

FIG. 20 illustrates a flow diagram 2000 for generating a graphical representation of a process, wherein the representation is constructed with interconnecting models representing respective operation of respective devices in the process, in accordance with at least one embodiment.

At 2010, a first model (e.g., model 160D) is generated (e.g., by modeling component 120, configuration component 131, AI component 132, and suchlike), wherein the first model represents an operating condition (e.g., configuration 176A) of a first device (e.g., any of equipment 109A-n/device 170A-n/254A-n, etc., such as a pump 109P). As previously described, the first model can have a first input and a first output, wherein the first input and first output can be utilized to connect the first model to another model in the process (e.g., as represented by any of the nodes 165A-n).

At 2020, the first model can be incorporated into a graphical representation (e.g., a layout representation 157, a model representation 159) of the process. For example, the first model can be the first device to be incorporated into the graphical representation, with subsequent devices/models being added thereto, to create an interactive array of models representing operation of the process.

At 2030, a second model (e.g., model 160E) is generated (e.g., by modeling component 120, configuration component 131. AI component 132, and suchlike), wherein the second model represents an operating condition (e.g., configuration 176B) of a second device (e.g., a second pump, a motor, a cooler, and suchlike). As previously described, the second model can have a second input and a second output, wherein the second input and second output can be utilized to connect the second model to another model (e.g., first model 160E) in the process (e.g., as represented by any of the nodes 165A-n). Interconnection of connected models and devices can be shown by connectors 168A-n, as previously described.

At 2040, a determination can be made (e.g., by modeling component 120, configuration component 131, AI component 132, and suchlike) regarding whether the first model can interact with the second model. For example, (with ref. to FIGS. 9A-C) are one or more features represented by the first output of the first model compatible with the one or more features represented by the second input of the second model? Or, for example, are one or more features represented by the second output of the second model compatible with the one or more features represented by the first input of the first model? Are there any conflicts regarding units of interest (e.g., electrical energy versus steam energy), are there warranty issues, are there capacity issues regarding an operating requirement of the first device versus the second device, and suchlike?

At 2050, in response to a determination that YES, the first model is compatible/can interact with the second model, the flow can advance to step 2060, with the first model being connected to the second model and incorporated into the graphical representation.

Returning to 2050, in response to a determination that NO, the first model is not compatible with the second model, the flow can advance to step 2070, wherein the one or more conflicts between the first model and the second model can be determined.

The flow can advance to step 2080, where a determination can be made as to whether the one or more conflicts can be resolved. For example, do either of the first model or second model require a different structure/mathematical representation? (e.g., via review by a subject matter expert), and if so, the model(s) can be updated, wherein the knowledge gained can be returned to the system (e.g., by AI component 132 monitoring interaction between the expert and the model, and the knowledge is stored at the OS 110). In response to a determination that YES, the conflict can be resolved, the flow can return to 2060, whereby the first model being connected to the second model (per the resolution) and incorporated into the graphical representation. In response to a determination that NO, the conflict cannot be resolved, either or both of the first model and the second model are not incorporated into the graphical representation, or if they are, then the first model and second model are not directly interacting. Further resolution can be conducted, including, for example, replacing one of the devices (e.g., a low capacity motor for a high capacity motor). As mentioned, a human expert can resolve the conflict, with the system (e.g., OS 110, AI component 132, and suchlike) learning from the resolution, whereby the system can implement the resolution where a similar conflict occurs in the future.

Incremental Achievement of a Requirement

As previously mentioned, an instruction (e.g., an instruction 130A-n) can be received, wherein the instruction can include a requirement regarding operation of a process (e.g., process 108). In an example scenario of operation, an instruction 130F can be received having a requirement to reduce energy consumption of the process.

Given the range of operational parameters pertaining to respective components included in a process, even a small scale process 108 comprising, for example, ten machines 109A-n, can become computationally complex to represent (e.g., mathematically) the various metrics, parameters, tags, etc., as a supermodel 138A-n, a model 160A-n, and/or nodes 165A-n. For example, wherein the supermodel 138A-n, a model 160A-n, and/or nodes 165A-n represent the various parameters represented/tagged by the various devices 170A-n, PLCs 254A-n, etc., configured to monitor operation of the respective equipment 109A-n included in process 108. Further, the complexity can reach a point that the modelling component 120 may not be able to generate a model in a timely manner to effectively achieve the instruction. Hence, rather than implementing an approach directed towards achieving the requirement in an instant, single configuration globally applied across the process 108, an incremental approach can be implemented (e.g., by configuration component 131) regarding achieving the requirement. Hence, rather than all of the respective equipment/devices (equipment 109A-n, devices 170A-n, PLCs 254A-n, etc.) being configured (e.g., with configurations 178A-n) in one instant, the various configurations can be applied incrementally.

In actuality, the requirement may be vague or it may not even be fully achievable. For example, an instruction 130R may include a requirement to reduce scrap from a current level, accordingly, operation of process 108 can monitored and controlled to improve the scrap rate from a current level, however, a situation may be reached whereby owing to various operational constraints/conflicts between respective equipment 109A-n, while say 2% scrap rate is desirable, it is not possible to achieve a scrap rate of less than 3%. Hence, with a current scrap rate of 4.5%, process 108 can be operationally adjusted to achieve 3%, whereby the operational adjustment is conducted in an incremental manner.

In an embodiment, a prior operating configuration (e.g., in historical data 136) can be identified (e.g., by historian component 134) that pertains to the requirement of an instruction 130A-n. For example, instruction 130E includes a requirement to reduce energy consumption by process 108. In an embodiment, the instruction 130E can be parsed (and converted into a mathematical representation) by the configuration component 131, to enable the requirement to be identified. The historian component 134 can be configured to identify one or more prior configurations (e.g., any of supermodels 138A-n, models 160A-n, and/or nodes 165A-n) in historical data 136 that pertain to the requirement, e.g., meeting the requirement. Accordingly, a configuration represented by a previously implemented supermodel 138A can be identified (e.g., by historian component 134), and while it does not completely satisfy the requirement, it can function as a baseline condition when applied to the equipment/devices comprising process 108. The configuration component 131 can implement (e.g., with AI component 132, historian component 134) incremental adjustments to the respective configurations (e.g., configurations 178A-n) in accordance with achieving the requirement. As the respective adjustments to the respective configurations are implemented, the historian component 134 can be configured to capture and store (e.g., in any of repository 380, library 320) the supermodels 138A-n, models 160A-n, and/or nodes 165A-n respectively depicting the configuration(s) implemented on process 108 at a particular time along with information pertaining to the operating conditions of process 108, e.g., instruction 130A-n, a requirement(s) in instruction 130A-n, an operating condition as it pertains to the requirement (e.g., current scrap rate, energy efficiency, emissions of process 108, and suchlike).

In an embodiment, the configuration component 131 can be further configured to determine a current operating condition (e.g., emissions) of the process 108 and compare the current operating condition with the condition(s) of the requirement. Accordingly, configuration component 131 can be configured to control adjustment of a configuration(s) as a function of the difference between the current operating condition(s) and the condition(s) of the requirement. Hence, as mentioned, while the requirement may not be fully realized, the configuration component 131 can be configured to adjust the process 108 to largely achieve the requirement.

Figure 21:
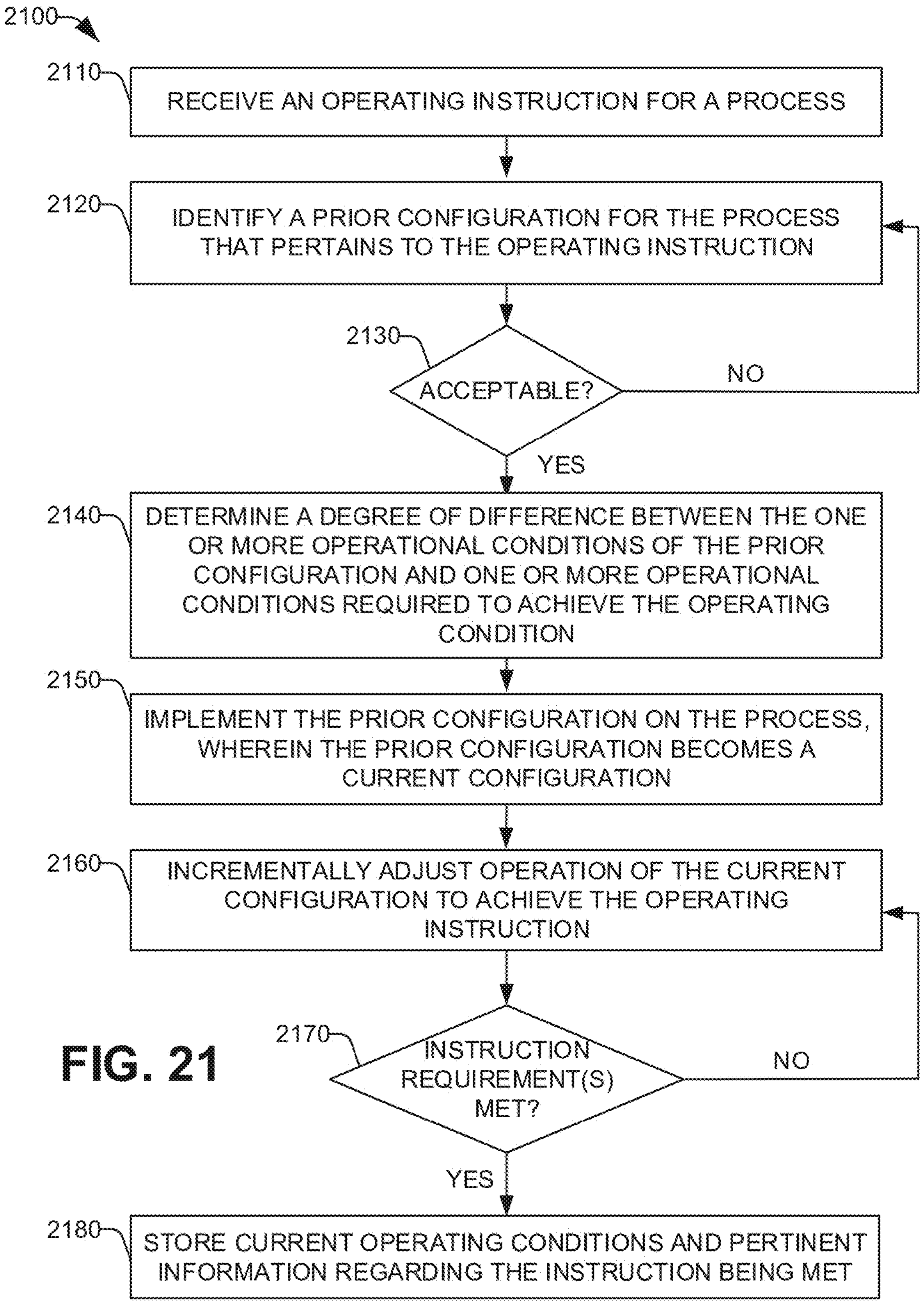
FIG. 21 illustrates a flow diagram for incrementally advancing a process toward an operational goal, in accordance with at least one embodiment.

FIG. 21 illustrates a flow diagram 2100 for incrementally advancing a process toward an operational goal, in accordance with at least one embodiment.

At 2110, an operating instruction (e.g., instruction 130A-n) can be received at a configuration component (e.g., at modelling component 120, configuration component 131), wherein the instruction can include a requirement for an operating condition(s) of a process (e.g., process 108). As previously mentioned, the instruction can be parsed by configuration component to enable the requirement(s) to be isolated/identified.

At 2120, based on the requirement, a historian component (e.g., historian component 134) can review prior configurations of the process (e.g., as represented by supermodels 138A-n, models 160A-n, nodes 165A-n) that pertain to the requirement.

At 2130, a determination can be made by the configuration component regarding whether the respective prior configuration has one or more operating conditions that are sufficiently similar to the requirement. In an embodiment, the configuration component can review a variety of information regarding each respective prior configuration. For example, while a first configuration (e.g., represented by supermodel 138A) of the process had an operating condition that pertained to the requirement, the operating condition may also have a deleterious operating condition that may negate selection of the configuration. For example, the requirement may comprise "reduce emissions", but the configuration (e.g., supermodel 138S) for the process having the least emissions, may also have an associated scrap rate that is unacceptable. Accordingly, in response to a determination that NO, the pertinent prior configuration is not acceptable (e.g., in view of other factors not included in the requirement), methodology 2100 can return to 2120 for another prior configuration to be selected/reviewed. Given the complexity of determining whether a prior configuration is acceptable, analysis/review of the prior configuration can be performed utilizing respective AI and ML technologies (e.g., by AI component 132), wherein the AI/ML technologies can be configured to weigh one or more operating conditions of the process/equipment/devices versus other factors/variables/goals/requirements not included in the present instruction/requirement but which may conflict in a direct or indirect manner. Furthermore, a variety of requirements in respective instructions 130A-n may be being concurrently pursued at any given time at the process, which can lead to operational complexity that further requires AI and ML technologies to resolve regarding one or more supermodels, models, nodes (e.g., supermodels 138A-n, models 160A-n, nodes 165A-n) to implement on the process for the respective equipment, devices, etc., in achieving the respective concurrent requirements.

At 2130, in response to a determination by the configuration component (e.g., in combination with the AI component) that a prior supermodel (e.g., supermodel 138C, or an assemblage of models 160A-n) satisfies the requirement, methodology 2100 can advance to 2140.

At 2140, a determination can be made, e.g., by any of the configuration component/the AI component/the historian component, regarding how closely the operational configuration(s) of the process/equipment/devices in the prior configuration meet the requirement in the instruction. The determination can be utilized, e.g., by the configuration component, etc., to enable incremental adjustment of the operating conditions of the process to advance toward satisfying the requirement.

At 2150, the prior configuration/prior supermodel can be implemented on the process and the respective equipment/devices, wherein the prior configuration is now the current configuration.

At 2160, as mentioned, the configuration component can be configured to incrementally adjust one or more configurations of equipment/devices in the process to advance towards achieving the requirement. As the incremental adjustments are being performed, snapshots of the configuration of the process can be captured (e.g., by historian component 134) and stored (e.g., as historical data 136).

At 2170, a determination can be made, e.g., by the configuration component, regarding whether the requirement has been met. The determination by the configuration component can be supplemented by at least the AI component and the historian component, wherein the respective components can be configured to determine whether it is possible to further incrementally adjust operation of the process or have detrimental conditions developed (e.g., scrap increase, emissions increase, increased energy costs) that limit/conflict with further incremental implementations? In response to a determination that NO, neither the requirement have been met and/or detrimental conditions have been determined, methodology 2100 can return to 2160 for further incremental adjustment of the process to be implemented.

At 2170, in response to a determination that the current configuration of the process meets (e.g., completely, substantially, sufficiently) the requirement without introducing one or more detrimental conditions, methodology 2100 can advance to 2180, whereby the current configuration(s) can be maintained in conjunction with the representation (e.g., any of supermodels 138A-n, models 160A-n, nodes 165A-n) being captured and stored by the historian component. Accordingly, per methodology 2100, operation of the process may be continuously advancing towards the instruction requirements, while discrete, incremental advancements are performed.

EXAMPLE APPLICATIONS AND USE

Figure 22:
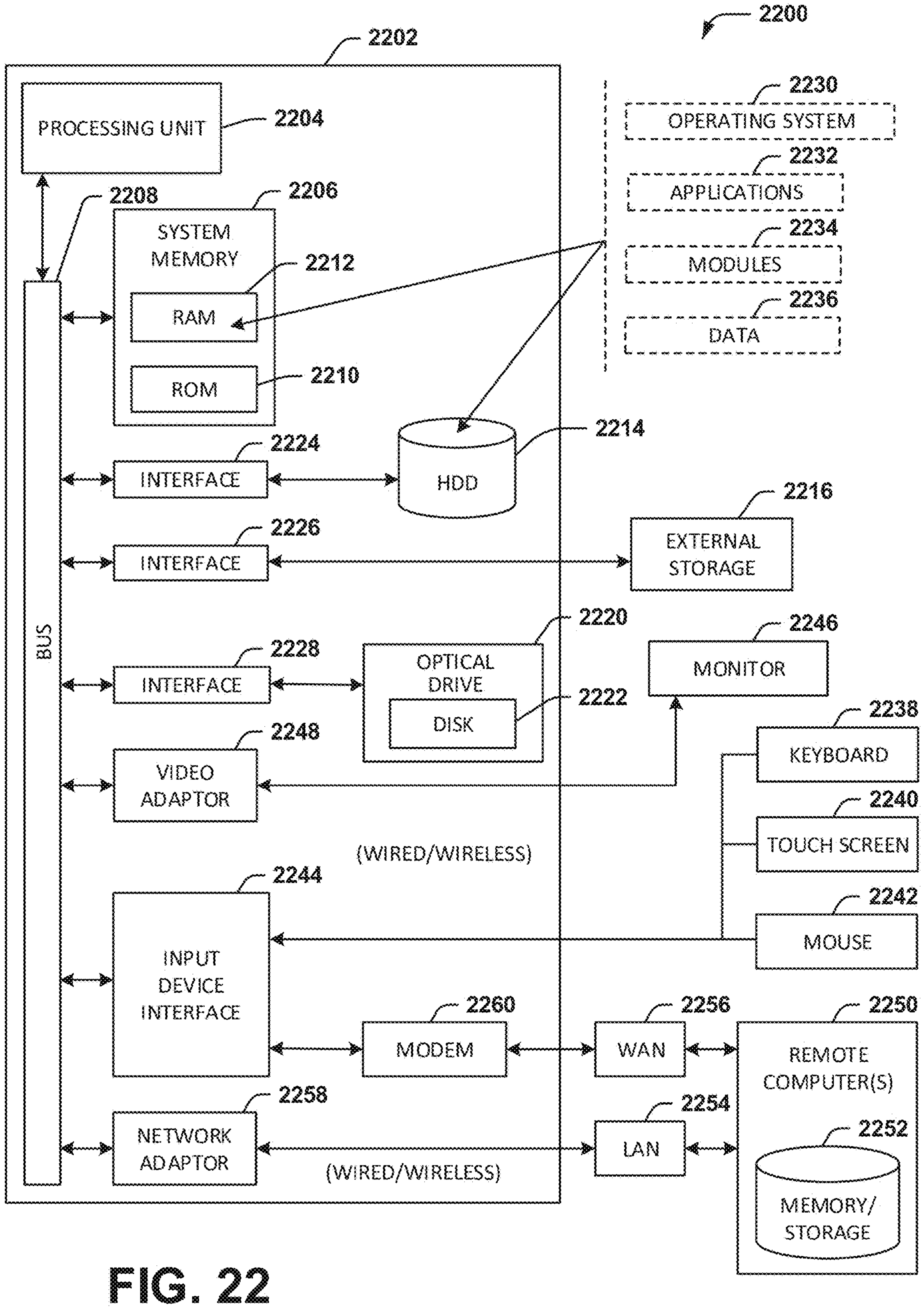
FIG. 22 is a block diagram illustrating an example computing environment in which the various embodiments described herein can be implemented.
Figure 23:
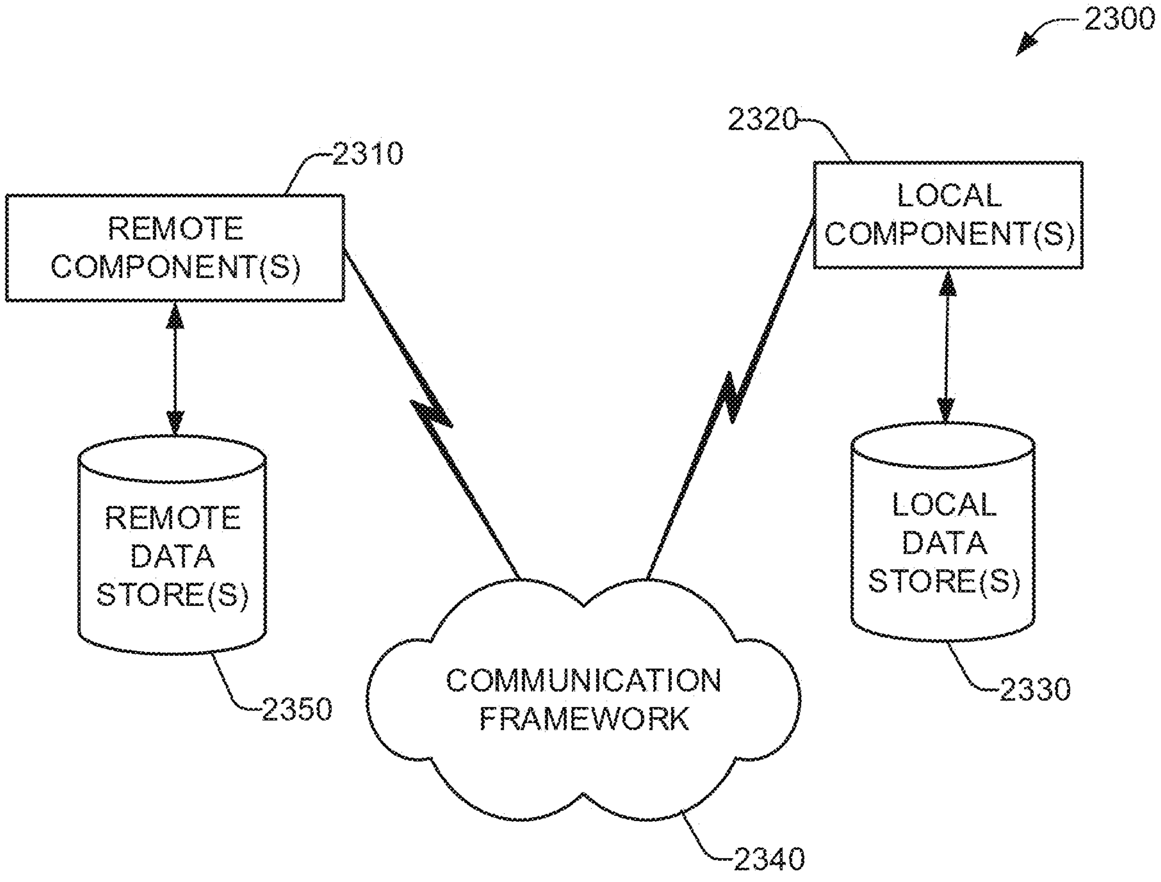
FIG. 23 is a block diagram illustrating an example computing environment with which the disclosed subject matter can interact, in accordance with an embodiment.

Turning next to FIGS. 22 and 23, a detailed description is provided of additional context for the one or more embodiments described herein with FIGS. 1-21.

In order to provide additional context for various embodiments described herein, FIG. 22 and the following discussion are intended to provide a brief, general description of a suitable computing environment 2200 in which the various embodiments described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors and may include a cache memory. Dual multi-processors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and an optical disk drive 2220 (e.g., which can read or write from a CD-ROM disc, a DVD, a BD, etc.). While the internal HDD 2214 is illustrated as located within the computer 2202, the internal HDD 2214 can also be configured for external use in a suitable chassis (not shown). Additionally, while not shown in environment 2200, a solid-state drive (SSD) could be used in addition to, or in place of, an HDD 2214. The HDD 2214, external storage device(s) 2216 and optical disk drive 2220 can be connected to the system bus 2208 by an HDD interface 2224, an external storage interface 2226 and an optical drive interface 2228, respectively. The interface 2224 for external drive implementations can include at least one or both of Universal Serial Bus (USB) and Institute of Electrical and Electronics Engineers (IEEE) 1094 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for applications 2232. Runtime environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and settings for an application.

Further, computer 2202 can comprise a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1094 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environment using logical connections via wired and/or wireless communications to one or more remote computers, such as a remote computer(s) 2250. The remote computer(s) 2250 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2252 is illustrated. The logical connections depicted include wired/wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

Referring now to details of one or more elements illustrated at FIG. 23, an illustrative cloud computing environment 2300 is depicted. FIG. 23 is a schematic block diagram of a computing environment 2300 with which the disclosed subject matter can interact. The system 2300 comprises one or more remote component(s) 2310. The remote component(s) 2310 can be hardware and/or software (e.g., threads, processes, computing devices). In some embodiments, remote component(s) 2310 can be a distributed computer system, connected to a local automatic scaling component and/or programs that use the resources of a distributed computer system, via communication framework 2340. Communication framework 2340 can comprise wired network devices, wireless network devices, mobile devices, wearable devices, radio access network devices, gateway devices, femtocell devices, servers, etc.

The system 2300 also comprises one or more local component(s) 2320. The local component(s) 2320 can be hardware and/or software (e.g., threads, processes, computing devices). In some embodiments, local component(s) 2320 can comprise an automatic scaling component and/or programs that communicate/use the remote resources 2310 and 2320, etc., connected to a remotely located distributed computing system via communication framework 2340.

One possible communication between a remote component(s) 2310 and a local component(s) 2320 can be in the form of a data packet adapted to be transmitted between two or more computer processes. Another possible communication between a remote component(s) 2310 and a local component(s) 2320 can be in the form of circuit-switched data adapted to be transmitted between two or more computer processes in radio time slots. The system 2300 comprises a communication framework 2340 that can be employed to facilitate communications between the remote component(s) 2310 and the local component(s) 2320, and can comprise an air interface, e.g., Uu interface of a UMTS network, via a long-term evolution (LTE) network, etc. Remote component(s) 2310 can be operably connected to one or more remote data store(s) 2350, such as a hard drive, solid state drive, SIM card, device memory, etc., that can be employed to store information on the remote component(s) 2310 side of communication framework 2340. Similarly, local component(s) 2320 can be operably connected to one or more local data store(s) 2330, that can be employed to store information on the local component(s) 2320 side of communication framework 2340.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware, or any combination thereof to control a computer to implement the disclosed subject matter. The term “article of manufacture” as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as “mobile device equipment,” “mobile station,” “mobile,” “subscriber station,” “access terminal,” “terminal,” “handset,” “communication device,” “mobile device” (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms “access point (AP),” “Base Station (BS),” “BS transceiver,” “BS device,” “cell site,” “cell site device,” “gNode B (gNB),” “evolved Node B (eNode B, eNB),” “home Node B (HNB)” and the like, refer to wireless network components or appliances that transmit and/or receive data, control, voice, video, sound, gaming or substantially any data-stream or signaling-stream from one or more subscriber stations. Data and signaling streams can be packetized or frame-based flows.

Furthermore, the terms “device,” “communication device,” “mobile device,” “subscriber,” “client entity,” “consumer,” “client entity,” “entity” and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

It should be noted that although various aspects and embodiments are described herein in the context of 5G or other next generation networks, the disclosed aspects are not limited to a 5G implementation, and can be applied in other network next generation implementations, such as sixth generation (6G), or other wireless systems. In this regard, aspects or features of the disclosed embodiments can be exploited in substantially any wireless communication technology. Such wireless communication technologies can include universal mobile telecommunications system (UMTS), global system for mobile communication (GSM), code division multiple access (CDMA), wideband CDMA (WCMDA), CDMA2000, time division multiple access (TDMA), frequency division multiple access (FDMA), multi-carrier CDMA (MC-CDMA), single-carrier CDMA (SC-CDMA), single-carrier FDMA (SC-FDMA), orthogonal frequency division multiplexing (OFDM), discrete Fourier transform spread OFDM (DFT-spread OFDM), filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM (CP-OFDM), resource-block-filtered OFDM, wireless fidelity (Wi-Fi), worldwide interoperability for microwave access (WiMAX), wireless local area network (WLAN), general packet radio service (GPRS), enhanced GPRS, third generation partnership project (3GPP), long term evolution (LTE), 5G, third generation partnership project 2 (3GPP2), ultra-mobile broadband (UMB), high speed packet access (HSPA), evolved high speed packet access (HSPA+), high-speed downlink packet access (HSDPA), high-speed uplink packet access (HSUPA), Zigbee, or another institute of electrical and electronics engineers (IEEE) 802.12 technology.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system comprising:

a memory that stores computer executable components; and a processor that executes the computer executable components stored in the memory, wherein the computer executable components comprise:

a configuration component configured to:

construct a graphical representation of an industrial process, wherein the graphical representation comprises:

a first model representing a first configuration of a first device in the industrial process, the first model having an output;

a second model representing a first configuration of a second device in the industrial process, the second model having an input, whereby the first model and second model are connected by a node representing the output connected to the input;

a visualization component configured to present the graphical representation of the industrial process on a human-machine interface (HMI); and an artificial intelligence (AI) component configured to, in response to determining that the output of the first model does not satisfy an input constraint defined for the second model;

identify, from among multiple models stored in a model repository, a third model representing a second configuration of the first device and capable of generating an output that satisfies the input constraint, and replace the first model with the third model in the graphical representation.

2. The system of claim 1, wherein:

the configuration component is further configured to:

detect a change in an operating condition of the first device that causes the first device to operate with a third configuration; and update the first model to represent the first device operating with the third configuration.

3. The system of claim 1, wherein:

the configuration component is further configured to:

determine whether the second configuration of the first device has caused a change in the output of the first model; and in response to determining that the change in the output has occurred, update a representation of the node in the graphical representation to reflect the change.

4. The system of claim 3, wherein the first configuration of the first device generates a first parameter and the second configuration of the first device generates a second parameter, and updating of the representation of the node comprises replacing the first parameter with the second parameter.

5. The system of claim 2, wherein the configuration component is further configured to:

in response to a determination that a fourth model represents operation of the first device with the third configuration with a level of accuracy that is greater than a level of accuracy with which the third model represents the operation of the first device with the third configuration, replace the third model with the fourth model in the graphical representation.

6. The system of claim 1, wherein the first device is a device configured to:

at least one of monitor or control operation of equipment in the industrial process; and transmit operational data from the equipment to the second device.

7. The system of claim 6, wherein the first device is a field-level device and the second device is a control-level device.

8. The system of claim 7, wherein the first device is one of a sensor, an actuator, a valve, an industrial controller, a motor drive, a telemetry device, a meter, a device configured to monitor operation of equipment included in the industrial process, or a device configured to control operation of a component/equipment included in the industrial process, and the second device is a programmable logic controller (PLC).

9. The system of claim 1, wherein the configuration component is further configured to:

receive objective data describing an objective regarding operation of the first device;

determine a third configuration for operation of the first device that satisfies the objective; and determine a fourth model that represents the third configuration for operation of the first device.

10. The system of claim 9, wherein the configuration component is further configured to:

instruct the first device to operate with the third configuration; and replace the first model with the fourth model in the graphical representation.

11. A computer-implemented method for visualizing an industrial process, comprising:

constructing a graphical representation of the industrial process, wherein the graphical representation comprises:

a first model representing a first configuration of a first device in the industrial process, the first model having a first output;

a second model representing a first configuration of a second device in the industrial process, the second model having an input, whereby the first model and second model are connected by a node representing the first output connected to the input; and presenting the graphical representation of the industrial process on a human-machine interface (HMI); and in response to determining that the output of the first model does not satisfy an input requirement defined for the second model:

identifying a third model, from among multiple models stored in a model repository, representing a second configuration of the first device and capable of generating a second output that satisfies the input requirement, and updating the graphical representation to replace the first model with the third model.

12. The computer-implemented method of claim 11, further comprising:

in response to detecting a change in an operating condition of the first device that results in the first device operating with a third configuration:

updating the first model to represent the first device operating with the third configuration; and updating the graphical representation in accordance with the updating.

13. The computer-implemented method of claim 11, further comprising:

in response to determining that the second configuration of the first device has caused a change in the first output of the first device:

updating a representation of the node in the graphical representation to reflect the change.

14. The computer-implemented method of claim 13, wherein the first configuration of the first device generates a first parameter and the second configuration of the first device generates a second parameter, and the updating of the representation of the node comprises replacing the first parameter with the second parameter.

15. The computer-implemented method of claim 12, further comprising:

in response to determining that a fourth model represents operation of the first device with the third configuration with a level of accuracy that is greater than a level of accuracy with which the operation of the first device with the third configuration is represented by the third model, replacing the third model with the fourth model in the graphical representation.

16. The computer-implemented method of claim 12, wherein the first device is a device configured to:

at least one of monitor or control operation of equipment in the process; and transmit operational data from the equipment to the second device.

17. A computer program product comprising a non-transitory computer readable storage medium having program instructions embodied therewith, the program instructions executable by a process to cause the processor to:

construct a graphical representation of an industrial process, wherein the graphical representation comprises:

a first model representing a first configuration of a first device in the industrial process, the first model having an output; and a second model representing a first configuration of a second device in the industrial process, the second model having an input, wherein the first model and second model are connected by a node representing the output connected to the input;

present the graphical representation of the industrial process on a human-machine interface (HMI); and in response to a determination that the output of the first model does not satisfy an input constraint defined by the second model:

identify a third model, from among multiple models stored in a model repository, representing a second configuration of the first device and capable of generating an output that satisfies the input constraint, and update the graphical representation to replace the first model with the third model.

18. The computer program product of claim 17, wherein the program instructions are further executable by the processor to cause the processor to:

detect a change in operating condition of the first device that causes the first device to operate with a third configuration; and update the first model to represent the first device operating with the third configuration.

19. The computer program product of claim 17, wherein the program instructions are further executable by the processor to cause the processor to:

in response to a determination that the second configuration of the first device has caused a change in the output of the first device:

update a representation of the node in the graphical representation to reflect the change; and update the graphical representation to reflect the change.

20. The computer program product of claim 17, wherein the first device is a smart sensor and the second device is a programmable logic controller.

* * * * *